(12) United States Patent
King et al.

(10) Patent No.: US 8,146,156 B2
(45) Date of Patent: Mar. 27, 2012

(54) ARCHIVE OF TEXT CAPTURES FROM RENDERED DOCUMENTS

(75) Inventors: Martin King, Vashon Island, WA (US); Dale Grover, Ann Arbor, MI (US); Clifford Kushler, Lynnwood, WA (US); James Stafford-Fraser, Cambridge (GB); Claes-Fredrik Mannby, Issaquah, WA (US)

(73) Assignee: Google Inc., Mountain View, CA (US)

( * ) Notice: Subject to any disclaimer, the term of this patent is extended or adjusted under 35 U.S.C. 154(b) by 711 days.

(21) Appl. No.: 12/203,103

(22) Filed: Sep. 2, 2008

(65) Prior Publication Data
US 2009/0077658 A1   Mar. 19, 2009

Related U.S. Application Data

(63) Continuation-in-part of application No. 11/098,016, filed on Apr. 1, 2005, now Pat. No. 7,421,155, which is a continuation-in-part of application No. 11/097,961, filed on Apr. 1, 2005, now abandoned, and a continuation-in-part of application No. 11/097,093, filed on Apr. 1, 2005, now abandoned, and a continuation-in-part of application No. 11/098,038, filed on Apr. 1, 2005, now Pat. No. 7,599,844, and a continuation-in-part of application No. 11/098,014, filed on Apr. 1, 2005, and a continuation-in-part of application No. 11/097,103, filed on Apr. 1, 2005, now Pat. No. 7,596,269, and a continuation-in-part of application No. 11/098,043, filed on Apr. 1, 2005, now abandoned, and a continuation-in-part of application (Continued)

(51) Int. Cl.
*H04L 9/32* (2006.01)
*G06K 9/72* (2006.01)
*G06F 12/14* (2006.01)
(52) U.S. Cl. .................... 726/21; 382/229; 705/26.1
(58) Field of Classification Search .............. 726/21
See application file for complete search history.

(56) References Cited

U.S. PATENT DOCUMENTS
3,899,687 A   8/1975   Jones
(Continued)

FOREIGN PATENT DOCUMENTS
JP   2004-050722   2/2004
(Continued)

OTHER PUBLICATIONS

Bagley et al., "Editing Images of Text", Communications of the ACM, Dec. 1994, 37(12):63-72.

(Continued)

*Primary Examiner* — Matthew Smithers
(74) *Attorney, Agent, or Firm* — McDonnell Boehnen Hulbert & Berghoff LLP

(57) ABSTRACT

A facility for storing a text capture data structure for a particular user is described. The data structure comprises a number of entries. Each entry corresponds to a text capture operation performed by the user from a rendered document. Each entry contains information specifying the text captured in the text capture operation.

58 Claims, 11 Drawing Sheets

Related U.S. Application Data

No. 11/097,981, filed on Apr. 1, 2005, now Pat. No. 7,606,741, and a continuation-in-part of application No. 11/097,089, filed on Apr. 1, 2005, and a continuation-in-part of application No. 11/097,835, filed on Apr. 1, 2005, now Pat. No. 7,831,912, and a continuation-in-part of application No. 11/097,828, filed on Apr. 1, 2005, now Pat. No. 7,742,953, and a continuation-in-part of application No. 11/097,833, filed on Apr. 1, 2005, and a continuation-in-part of application No. 11/097,836, filed on Apr. 1, 2005, now abandoned, and a continuation-in-part of application No. 11/098,042, filed on Apr. 1, 2005, now Pat. No. 7,593,605, which is a continuation-in-part of application No. 11/096,704, filed on Apr. 1, 2005, now Pat. No. 7,599,580, application No. 12/203,103, which is a continuation-in-part of application No. 11/547,835, filed on Oct. 26, 2007, and a continuation-in-part of application No. 11/110,353, filed on Apr. 19, 2005, now Pat. No. 7,702,624, and a continuation-in-part of application No. 11/131,945, filed on May 17, 2005, now Pat. No. 7,818,215, and a continuation-in-part of application No. 11/185,908, filed on Jul. 19, 2005, now abandoned, and a continuation-in-part of application No. 11/208,408, filed on Aug. 18, 2005, now abandoned, and a continuation-in-part of application No. 11/208,458, filed on Aug. 18, 2005, now Pat. No. 7,437,023, and a continuation-in-part of application No. 11/208,461, filed on Aug. 18, 2005, and a continuation-in-part of application No. 11/209,333, filed on Aug. 23, 2005, now abandoned, and a continuation-in-part of application No. 11/236,440, filed on Sep. 27, 2005, now abandoned, and a continuation-in-part of application No. 11/236,330, filed on Sep. 27, 2005, now Pat. No. 7,812,860.

(60) Provisional application No. 60/633,452, filed on Dec. 6, 2004, provisional application No. 60/633,678, filed on Dec. 6, 2004, provisional application No. 60/633,486, filed on Dec. 6, 2004, provisional application No. 60/633,453, filed on Dec. 6, 2004, provisional application No. 60/634,627, filed on Dec. 9, 2004, provisional application No. 60/634,739, filed on Dec. 9, 2004, provisional application No. 60/647,684, filed on Jan. 26, 2005, provisional application No. 60/648,746, filed on Jan. 31, 2005, provisional application No. 60/653,372, filed on Feb. 15, 2005, provisional application No. 60/653,663, filed on Feb. 16, 2005, provisional application No. 60/653,669, filed on Feb. 16, 2005, provisional application No. 60/653,899, filed on Feb. 16, 2005, provisional application No. 60/653,679, filed on Feb. 16, 2005, provisional application No. 60/653,847, filed on Feb. 16, 2005, provisional application No. 60/654,379, filed on Feb. 17, 2005, provisional application No. 60/654,368, filed on Feb. 18, 2005, provisional application No. 60/654,326, filed on Feb. 18, 2005, provisional application No. 60/654,196, filed on Feb. 18, 2005, provisional application No. 60/559,226, filed on Apr. 1, 2004, provisional application No. 60/558,893, filed on Apr. 1, 2004, provisional application No. 60/558,968, filed on Apr. 1, 2004, provisional application No. 60/558,867, filed on Apr. 1, 2004, provisional application No. 60/559,278, filed on Apr. 1, 2004, provisional application No. 60/559,279, filed on Apr. 1, 2004, provisional application No. 60/559,265, filed on Apr. 1, 2004, provisional application No. 60/559,277, filed on Apr. 1, 2004, provisional application No. 60/558,969, filed on Apr. 1, 2004, provisional application No. 60/558,892, filed on Apr. 1, 2004, provisional application No. 60/558,760, filed on Apr. 1, 2004, provisional application No. 60/558,717, filed on Apr. 1, 2004, provisional application No. 60/558,499, filed on Apr. 1, 2004, provisional application No. 60/558,370, filed on Apr. 1, 2004, provisional application No. 60/558,789, filed on Apr. 1, 2004, provisional application No. 60/558,791, filed on Apr. 1, 2004, provisional application No. 60/558,527, filed on Apr. 1, 2004, provisional application No. 60/559,125, filed on Apr. 2, 2004, provisional application No. 60/558,909, filed on Apr. 2, 2004, provisional application No. 60/559,033, filed on Apr. 2, 2004, provisional application No. 60/559,127, filed on Apr. 2, 2004, provisional application No. 60/559,131, filed on Apr. 2, 2004, provisional application No. 60/559,087, filed on Apr. 2, 2004, provisional application No. 60/559,766, filed on Apr. 6, 2004, provisional application No. 60/561,768, filed on Apr. 12, 2004, provisional application No. 60/563,520, filed on Apr. 19, 2004, provisional application No. 60/563,485, filed on Apr. 19, 2004, provisional application No. 60/564,688, filed on Apr. 23, 2004, provisional application No. 60/564,846, filed on Apr. 23, 2004, provisional application No. 60/556,667, filed on Apr. 30, 2004, provisional application No. 60/571,381, filed on May 14, 2004, provisional application No. 60/571,560, filed on May 14, 2004, provisional application No. 60/571,715, filed on May 17, 2004, provisional application No. 60/589,203, filed on Jul. 19, 2004, provisional application No. 60/589,201, filed on Jul. 19, 2004, provisional application No. 60/589,202, filed on Jul. 19, 2004, provisional application No. 60/598,821, filed on Aug. 2, 2004, provisional application No. 60/602,956, filed on Aug. 18, 2004, provisional application No. 60/602,925, filed on Aug. 18, 2004, provisional application No. 60/602,947, filed on Aug. 18, 2004, provisional application No. 60/602,897, filed on Aug. 18, 2004, provisional application No. 60/602,896, filed on Aug. 18, 2004, provisional application No. 60/602,930, filed on Aug. 18, 2004, provisional application No. 60/602,898, filed on Aug. 18, 2004, provisional application No. 60/603,466, filed on Aug. 19, 2004, provisional application No. 60/603,082, filed on Aug. 19, 2004, provisional application No. 60/603,081, filed on Aug. 19, 2004, provisional application No. 60/603,498, filed on Aug. 20, 2004, provisional application No. 60/603,358, filed on Aug. 20, 2004, provisional application No. 60/604,103, filed on Aug. 23, 2004, provisional application No. 60/604,098, filed on Aug. 23, 2004, provisional application No. 60/604,100, filed on Aug. 23, 2004, provisional application No. 60/604,102, filed on Aug. 23, 2004, provisional application No. 60/605,229, filed on Aug. 27, 2004, provisional application No. 60/605,105, filed on Aug. 27, 2004, provisional application No. 60/613,243, filed on Sep. 27, 2004, provisional application No.

60/613,628, filed on Sep. 27, 2004, provisional application No. 60/613,632, filed on Sep. 27, 2004, provisional application No. 60/613,589, filed on Sep. 27, 2004, provisional application No. 60/613,242, filed on Sep. 27, 2004, provisional application No. 60/613,602, filed on Sep. 27, 2004, provisional application No. 60/613,340, filed on Sep. 27, 2004, provisional application No. 60/613,634, filed on Sep. 27, 2004, provisional application No. 60/613,461, filed on Sep. 27, 2004, provisional application No. 60/613,455, filed on Sep. 27, 2004, provisional application No. 60/613,460, filed on Sep. 27, 2004, provisional application No. 60/613,400, filed on Sep. 27, 2004, provisional application No. 60/613,456, filed on Sep. 27, 2004, provisional application No. 60/613,341, filed on Sep. 27, 2004, provisional application No. 60/613,361, filed on Sep. 27, 2004, provisional application No. 60/613,454, filed on Sep. 27, 2004, provisional application No. 60/613,339, filed on Sep. 27, 2004, provisional application No. 60/613,633, filed on Sep. 27, 2004, provisional application No. 60/615,378, filed on Oct. 1, 2004, provisional application No. 60/615,112, filed on Oct. 1, 2004, provisional application No. 60/615,538, filed on Oct. 1, 2004, provisional application No. 60/617,122, filed on Oct. 7, 2004, provisional application No. 60/622,906, filed on Oct. 28, 2004, provisional application No. 60/655,279, filed on Feb. 22, 2005, provisional application No. 60/655,280, filed on Feb. 22, 2005, provisional application No. 60/655,987, filed on Feb. 22, 2005, provisional application No. 60/655,697, filed on Feb. 22, 2005, provisional application No. 60/655,281, filed on Feb. 22, 2005, provisional application No. 60/657,309, filed on Feb. 28, 2005.

(56) References Cited

U.S. PATENT DOCUMENTS

| | | | |
|---|---|---|---|
| 4,633,507 | A | 12/1986 | Cannistra et al. |
| 4,914,709 | A | 4/1990 | Rudak |
| 5,107,256 | A | 4/1992 | Ueno et al. |
| 5,142,161 | A | 8/1992 | Brackmann |
| 5,159,668 | A | 10/1992 | Kaasila |
| 5,168,147 | A | 12/1992 | Bloomberg |
| 5,212,739 | A | 5/1993 | Johnson |
| 5,272,324 | A | 12/1993 | Blevins |
| 5,371,348 | A | 12/1994 | Kumar et al. |
| 5,532,469 | A | 7/1996 | Shepard et al. |
| 5,541,419 | A | 7/1996 | Arackellian |
| 5,684,891 | A | 11/1997 | Tanaka et al. |
| 5,724,521 | A | 3/1998 | Dedrick |
| 5,748,805 | A | 5/1998 | Withgott et al. |
| 5,756,981 | A | 5/1998 | Roustaei et al. |
| 5,818,965 | A | 10/1998 | Davies |
| 5,862,260 | A | 1/1999 | Rhoads |
| 5,889,896 | A | 3/1999 | Meshinsky et al. |
| 5,913,185 | A | 6/1999 | Martino et al. |
| 5,949,921 | A | 9/1999 | Kojima et al. |
| 5,963,966 | A | 10/1999 | Mitchell et al. |
| 6,036,086 | A | 3/2000 | Sizer, II et al. |
| 6,044,378 | A * | 3/2000 | Gladney ..................... 1/1 |
| 6,053,413 | A | 4/2000 | Swift et al. |
| 6,081,621 | A | 6/2000 | Ackner |
| 6,134,532 | A | 10/2000 | Lazarus et al. |
| 6,178,261 | B1 | 1/2001 | Williams et al. |
| 6,178,263 | B1 | 1/2001 | Fan et al. |
| 6,201,903 | B1 | 3/2001 | Wolff et al. |
| 6,226,631 | B1 | 5/2001 | Evans |
| 6,229,137 | B1 | 5/2001 | Bohn |
| 6,292,274 | B1 | 9/2001 | Bohn |
| 6,310,988 | B1 | 10/2001 | Flores et al. |
| 6,314,406 | B1 | 11/2001 | O'Hagan et al. |
| 6,330,976 | B1 | 12/2001 | Dymetman et al. |
| 6,341,290 | B1 | 1/2002 | Lombardo et al. |
| 6,360,951 | B1 | 3/2002 | Swinehart |
| 6,409,401 | B1 | 6/2002 | Petteruti et al. |
| 6,427,032 | B1 * | 7/2002 | Irons et al. ............... 382/306 |
| 6,429,899 | B1 | 8/2002 | Nio et al. |
| 6,459,823 | B2 | 10/2002 | Altunbasak et al. |
| 6,466,336 | B1 | 10/2002 | Sturgeon et al. |
| 6,520,407 | B1 | 2/2003 | Nieswand et al. |
| 6,640,145 | B2 | 10/2003 | Hoffberg et al. |
| 6,678,075 | B1 | 1/2004 | Tsai et al. |
| 6,714,677 | B1 | 3/2004 | Stearns et al. |
| 6,714,969 | B1 | 3/2004 | Klein |
| 6,738,519 | B1 | 5/2004 | Nishiwaki |
| 6,745,937 | B2 | 6/2004 | Walsh et al. |
| 6,748,306 | B2 | 6/2004 | Lipowicz |
| 6,757,783 | B2 | 6/2004 | Koh |
| 6,783,071 | B2 | 8/2004 | Levine et al. |
| 6,785,421 | B1 | 8/2004 | Gindele et al. |
| 6,823,075 | B2 | 11/2004 | Perry |
| 6,845,913 | B2 | 1/2005 | Madding et al. |
| 6,850,252 | B1 | 2/2005 | Hoffberg |
| 6,862,046 | B2 | 3/2005 | Ko |
| 6,922,725 | B2 | 7/2005 | Lamming et al. |
| 6,957,384 | B2 | 10/2005 | Jeffery et al. |
| 6,978,297 | B1 | 12/2005 | Piersol |
| 6,985,169 | B1 | 1/2006 | Deng et al. |
| 6,991,158 | B2 | 1/2006 | Munte |
| 6,992,655 | B2 | 1/2006 | Ericson et al. |
| 7,001,681 | B2 | 2/2006 | Wood |
| 7,006,881 | B1 | 2/2006 | Hoffberg et al. |
| 7,020,663 | B2 * | 3/2006 | Hay et al. ............... 434/317 |
| 7,043,489 | B1 * | 5/2006 | Kelley .................... 1/1 |
| 7,069,240 | B2 | 6/2006 | Spero |
| 7,093,759 | B2 | 8/2006 | Walsh |
| 7,111,787 | B2 | 9/2006 | Ehrhart |
| 7,117,374 | B2 | 10/2006 | Hill et al. |
| 7,131,061 | B2 | 10/2006 | MacLean et al. |
| 7,137,077 | B2 | 11/2006 | Iwema et al. |
| 7,139,445 | B2 | 11/2006 | Pilu et al. |
| 7,151,864 | B2 | 12/2006 | Henry |
| 7,197,716 | B2 | 3/2007 | Newell et al. |
| 7,203,158 | B2 | 4/2007 | Oshima et al. |
| 7,224,480 | B2 | 5/2007 | Tanaka et al. |
| 7,225,979 | B2 | 6/2007 | Silverbrook et al. |
| 7,234,645 | B2 | 6/2007 | Silverbrook et al. |
| 7,242,492 | B2 | 7/2007 | Currans et al. |
| 7,284,192 | B2 | 10/2007 | Kashi et al. |
| 7,289,806 | B2 | 10/2007 | Morris et al. |
| 7,331,523 | B2 | 2/2008 | Meier et al. |
| 7,339,467 | B2 | 3/2008 | Lamb |
| 7,383,263 | B2 * | 6/2008 | Goger ..................... 715/741 |
| 7,392,287 | B2 | 6/2008 | Ratcliff, III |
| 7,404,520 | B2 | 7/2008 | Vesuna |
| 7,409,434 | B2 | 8/2008 | Lamming et al. |
| 7,421,155 | B2 | 9/2008 | King et al. |
| 7,424,543 | B2 | 9/2008 | Rice, III |
| 7,433,068 | B2 | 10/2008 | Stevens et al. |
| 7,433,893 | B2 * | 10/2008 | Lowry .................... 1/1 |
| 7,437,023 | B2 | 10/2008 | King et al. |
| 7,487,112 | B2 | 2/2009 | Barnes, Jr. |
| 7,493,487 | B2 | 2/2009 | Phillips et al. |
| 7,496,638 | B2 | 2/2009 | Philyaw |
| 7,505,785 | B2 | 3/2009 | Callaghan et al. |
| 7,523,067 | B1 | 4/2009 | Nakajima |
| 7,533,040 | B2 | 5/2009 | Perkowski |
| 7,536,547 | B2 | 5/2009 | Van Den Tillaart |
| 7,593,605 | B2 | 9/2009 | King et al. |
| 7,596,269 | B2 | 9/2009 | King et al. |
| 7,599,580 | B2 | 10/2009 | King et al. |
| 7,599,844 | B2 | 10/2009 | King et al. |
| 7,606,741 | B2 | 10/2009 | King et al. |
| 7,613,634 | B2 | 11/2009 | Siegel et al. |
| 7,660,813 | B2 | 2/2010 | Milic-Frayling et al. |
| 7,672,543 | B2 | 3/2010 | Hull et al. |
| 7,680,067 | B2 | 3/2010 | Prasad et al. |
| 7,689,712 | B2 | 3/2010 | Lee et al. |

| Patent No. | Date | Assignee |
|---|---|---|
| 7,689,832 B2 | 3/2010 | Talmor et al. |
| 7,702,624 B2 | 4/2010 | King et al. |
| 7,706,611 B2 | 4/2010 | King et al. |
| 7,707,039 B2 | 4/2010 | King et al. |
| 7,710,598 B2 | 5/2010 | Harrison, Jr. |
| 7,742,953 B2 | 6/2010 | King et al. |
| 7,812,860 B2 | 10/2010 | King et al. |
| 7,818,215 B2 | 10/2010 | King et al. |
| 7,831,912 B2 | 11/2010 | King et al. |
| 7,872,669 B2 | 1/2011 | Darrell et al. |
| 7,894,670 B2 | 2/2011 | King et al. |
| 2001/0034237 A1 | 10/2001 | Garahi |
| 2002/0023957 A1 | 2/2002 | Michaelis et al. |
| 2002/0049781 A1 | 4/2002 | Bengtson |
| 2002/0055919 A1* | 5/2002 | Mikheev .......................... 707/3 |
| 2002/0069230 A1* | 6/2002 | Schubert et al. ............. 707/530 |
| 2002/0073000 A1 | 6/2002 | Sage |
| 2002/0082922 A1* | 6/2002 | Van Zoest et al. .............. 705/14 |
| 2002/0191847 A1 | 12/2002 | Newman et al. |
| 2002/0199198 A1 | 12/2002 | Stonedahl |
| 2003/0019939 A1 | 1/2003 | Sellen |
| 2003/0043042 A1 | 3/2003 | Moores, Jr. et al. |
| 2003/0093400 A1 | 5/2003 | Santosuosso |
| 2003/0093545 A1 | 5/2003 | Liu et al. |
| 2003/0173405 A1 | 9/2003 | Wilz, Sr. et al. |
| 2003/0187751 A1* | 10/2003 | Watson et al. .................. 705/26 |
| 2003/0223637 A1* | 12/2003 | Simske et al. ................ 382/176 |
| 2003/0225547 A1 | 12/2003 | Paradies |
| 2004/0001217 A1 | 1/2004 | Wu |
| 2004/0068483 A1 | 4/2004 | Sakurai et al. |
| 2004/0098165 A1 | 5/2004 | Butikofer |
| 2004/0186766 A1 | 9/2004 | Fellenstein et al. |
| 2004/0193488 A1 | 9/2004 | Khoo et al. |
| 2004/0258274 A1 | 12/2004 | Brundage et al. |
| 2005/0097335 A1 | 5/2005 | Shenoy et al. |
| 2005/0136949 A1 | 6/2005 | Barnes, Jr. |
| 2005/0154760 A1* | 7/2005 | Bhakta et al. ............. 707/104.1 |
| 2005/0222801 A1 | 10/2005 | Wulff et al. |
| 2005/0288954 A1 | 12/2005 | McCarthy et al. |
| 2006/0023945 A1 | 2/2006 | King et al. |
| 2006/0036462 A1 | 2/2006 | King et al. |
| 2006/0041484 A1 | 2/2006 | King et al. |
| 2006/0041538 A1 | 2/2006 | King et al. |
| 2006/0041590 A1 | 2/2006 | King et al. |
| 2006/0041605 A1 | 2/2006 | King et al. |
| 2006/0053097 A1 | 3/2006 | King et al. |
| 2006/0075327 A1 | 4/2006 | Sriver |
| 2006/0081714 A1 | 4/2006 | King et al. |
| 2006/0085477 A1 | 4/2006 | Phillips et al. |
| 2006/0098900 A1 | 5/2006 | King et al. |
| 2006/0104515 A1 | 5/2006 | King et al. |
| 2006/0119900 A1 | 6/2006 | King et al. |
| 2006/0122983 A1 | 6/2006 | King et al. |
| 2006/0136629 A1 | 6/2006 | King et al. |
| 2006/0138219 A1 | 6/2006 | Brzezniak et al. |
| 2006/0173859 A1 | 8/2006 | Kim et al. |
| 2006/0195695 A1 | 8/2006 | Keys |
| 2006/0224895 A1 | 10/2006 | Mayer |
| 2006/0256371 A1 | 11/2006 | King et al. |
| 2007/0279711 A1 | 12/2007 | King et al. |
| 2007/0300142 A1 | 12/2007 | King et al. |
| 2008/0046417 A1 | 2/2008 | Jeffery et al. |
| 2008/0082903 A1* | 4/2008 | McCurdy et al. ............. 715/200 |
| 2008/0137971 A1 | 6/2008 | King et al. |
| 2008/0141117 A1 | 6/2008 | King et al. |
| 2008/0177825 A1 | 7/2008 | Dubinko et al. |
| 2008/0235093 A1 | 9/2008 | Uland |
| 2008/0313172 A1 | 12/2008 | King et al. |
| 2009/0012806 A1 | 1/2009 | Ricordi et al. |
| 2010/0092095 A1 | 4/2010 | King et al. |
| 2010/0177970 A1 | 7/2010 | King et al. |
| 2010/0182631 A1 | 7/2010 | King et al. |
| 2010/0183246 A1 | 7/2010 | King et al. |
| 2010/0185538 A1 | 7/2010 | King et al. |
| 2010/0278453 A1 | 11/2010 | King et al. |
| 2010/0318797 A1 | 12/2010 | King et al. |
| 2011/0019020 A1 | 1/2011 | King et al. |
| 2011/0019919 A1 | 1/2011 | King et al. |
| 2011/0022940 A1 | 1/2011 | King et al. |
| 2011/0025842 A1 | 2/2011 | King et al. |
| 2011/0026838 A1 | 2/2011 | King et al. |
| 2011/0029443 A1 | 2/2011 | King et al. |
| 2011/0029504 A1 | 2/2011 | King et al. |
| 2011/0033080 A1 | 2/2011 | King et al. |
| 2011/0035289 A1 | 2/2011 | King et al. |
| 2011/0035656 A1 | 2/2011 | King et al. |
| 2011/0035662 A1 | 2/2011 | King et al. |
| 2011/0043652 A1 | 2/2011 | King et al. |
| 2011/0044547 A1 | 2/2011 | King et al. |
| 2011/0072395 A1 | 3/2011 | King et al. |
| 2011/0075228 A1 | 3/2011 | King et al. |
| 2011/0078585 A1 | 3/2011 | King et al. |
| 2011/0085211 A1 | 4/2011 | King et al. |
| 2011/0096174 A1 | 4/2011 | King et al. |

FOREIGN PATENT DOCUMENTS

| | | |
|---|---|---|
| KR | 10-2000-0054268 | 9/2000 |
| KR | 10-2000-0054339 | 9/2000 |
| KR | 10-2004-0029895 | 4/2004 |
| KR | 10-2007-0051217 | 5/2007 |
| KR | 10-0741368 | 7/2007 |
| KR | 10-0761912 | 9/2007 |
| WO | 94/19766 | 9/1994 |
| WO | 01/24051 | 4/2001 |
| WO | 01/33553 | 5/2001 |
| WO | 2005/096750 | 10/2005 |
| WO | 2005/096755 | 10/2005 |
| WO | 2005/098596 | 10/2005 |
| WO | 2005/098597 | 10/2005 |
| WO | 2005/098598 | 10/2005 |
| WO | 2005/098599 | 10/2005 |
| WO | 2005/098600 | 10/2005 |
| WO | 2005/098601 | 10/2005 |
| WO | 2005/098602 | 10/2005 |
| WO | 2005/098603 | 10/2005 |
| WO | 2005/098604 | 10/2005 |
| WO | 2005/098605 | 10/2005 |
| WO | 2005/098606 | 10/2005 |
| WO | 2005/098607 | 10/2005 |
| WO | 2005/098609 | 10/2005 |
| WO | 2005/098610 | 10/2005 |
| WO | 2005/101192 | 10/2005 |
| WO | 2005/101193 | 10/2005 |
| WO | 2005/106643 | 11/2005 |
| WO | 2005/114380 | 12/2005 |
| WO | 2006/014727 | 2/2006 |
| WO | 2006/023715 | 3/2006 |
| WO | 2006/023717 | 3/2006 |
| WO | 2006/023718 | 3/2006 |
| WO | 2006/023806 | 3/2006 |
| WO | 2006/023937 | 3/2006 |
| WO | 2006/026188 | 3/2006 |
| WO | 2006/029259 | 3/2006 |
| WO | 2006/036853 | 4/2006 |
| WO | 2006/037011 | 4/2006 |
| WO | 2006/093971 | 9/2006 |
| WO | 2006/124496 | 11/2006 |
| WO | 2007/141020 | 12/2007 |
| WO | 2008/014255 | 1/2008 |
| WO | 2008/028674 | 3/2008 |
| WO | 2008/031625 | 3/2008 |
| WO | 2008/072874 | 6/2008 |
| WO | 2010/096191 | 8/2010 |
| WO | 2010/096192 | 8/2010 |
| WO | 2010/096193 | 8/2010 |
| WO | 2010/105244 | 9/2010 |
| WO | 2010/105245 | 9/2010 |
| WO | 2010/105246 | 9/2010 |
| WO | 2010/108159 | 9/2010 |

OTHER PUBLICATIONS

Brickman et al., "Word Autocorrelation Redundancy Match (WARM) Technology," IBM J. Res. Develop., 26 (6):681-686 (Nov. 1982).

Casey et al., "An Autonomous Reading Machine," IEEE Transactions on Computers, V. C-17, No. 5, pp. 492-503, May 1968.

European Search Report for EP Application No. 05731509 dated Apr. 23, 2009.
European Search Report for EP Application No. 05732913 dated Mar. 31, 2009.
European Search Report for EP Application No. 05733191 dated Apr. 23, 2009.
European Search Report for EP Application No. 05733819 dated Mar. 31, 2009.
European Search Report for EP Application No. 05733851 dated Sep. 2, 2009.
European Search Report for EP Application No. 05733915 dated Dec. 30, 2009.
European Search Report for EP Application No. 05734996 dated Mar. 23, 2009.
European Search Report for EP Application No. 05737714 dated Mar. 31, 2009.
European Search Report for EP Application No. 05734796 dated Apr. 22, 2009.
European Search Report for EP Application No. 05734947 dated Mar. 20, 2009.
European Search Report for EP Application No. 05742065 dated Mar. 23, 2009.
European Search Report for EP Application No. 05745611 dated Mar. 23, 2009.
European Search Report for EP Application No. 05746428 dated Mar. 24, 2009.
European Search Report for EP Application No. 05746830 dated Mar. 23, 2009.
European Search Report for EP Application No. 05753019 dated Mar. 31, 2009.
European Search Report for EP Application No. 05789280 dated Mar. 23, 2009.
European Search Report for EP Application No. 05812073 dated Mar. 23, 2009.
European Search Report for EP Application No. 07813283 dated Dec. 10, 2010.
Feldman, Susan, "The Answer Machine," The Magazine for Database Professional, 8(1):58 (Jan. 2000).
International Search Report for PCT/EP2007/005038 dated Sep. 17, 2007.
International Search Report for PCT/EP2007/007824 dated May 25, 2009.
International Search Report for PCT/EP2007/008075 dated Oct. 10, 2008.
International Search Report for PCT/US2005/011012 dated Sep. 29, 2006.
International Search Report for PCT/US2005/011013 dated Oct. 19, 2007.
International Search Report for PCT/US2005/011014 dated May 16, 2007.
International Search Report for PCT/US2005/011015 dated Dec. 1, 2006.
International Search Report for PCT/US2005/011016 dated May 29, 2007.
International Search Report for PCT/US2005/011026 dated Jun. 11, 2007.
International Search Report for PCT/US2005/011042 dated Sep. 10, 2007.
International Search Report for PCT/US2005/011043 dated Sep. 20, 2007.
International Search Report for PCT/US2005/011084 dated Aug. 8, 2008.
International Search Report for PCT/US2005/011085 dated Sep. 14, 2006.
International Search Report for PCT/US2005/011088 dated Aug. 29, 2008.
International Search Report for PCT/US2005/011090 dated Sep. 27, 2006.
International Search Report for PCT/US2005/011533 dated Jun. 4, 2007.
International Search Report for PCT/US2005/011534 dated Nov. 9, 2006.
International Search Report for PCT/US2005/012510 dated Jan. 6, 2011.
International Search Report for PCT/US2005/013297 dated Aug. 14, 2007.
International Search Report for PCT/US2005/013586 dated Aug. 7, 2009.
International Search Report for PCT/US2005/017333 dated Jun. 4, 2007.
International Search Report for PCT/US2005/025732 dated Dec. 5, 2005.
International Search Report for PCT/US2005/029536 dated Apr. 19, 2007.
International Search Report for PCT/US2005/029537 dated Sep. 28, 2007.
International Search Report for PCT/US2005/029539 dated Sep. 29, 2008.
International Search Report for PCT/US2005/029680 dated Jul. 13, 2010.
International Search Report for PCT/US2005/030007 dated Mar. 11, 2008.
International Search Report for PCT/US2005/029534 dated May 15, 2007.
International Search Report for PCT/US2005/034319 dated Apr. 17, 2006.
International Search Report for PCT/US2005/034734 dated Apr. 4, 2006.
International Search Report for PCT/US2006/007108 dated Oct. 30, 2007.
International Search Report for PCT/US2006/018198 dated Sep. 25, 2007.
International Search Report for PCT/US2007/074214 dated Sep. 9, 2008.
International Search Report for PCT/US2010/000497 dated Sep. 27, 2010.
International Search Report for PCT/US2010/000498 dated Aug. 2, 2010.
International Search Report for PCT/US2010/000499 dated Aug. 31, 2010.
International Search Report for PCT/US2010/027254 dated Oct. 22, 2010.
International Search Report for PCT/US2010/027255 dated Nov. 16, 2010.
International Search Report for PCT/US2010/027256 dated Nov. 15, 2010.
International Search Report for PCT/US2010/028066 dated Oct. 26, 2010.
Ghaly et al., Sams Teach Yourself EJB in 21 days, Sams Publishing, 2002-2003 (pp. 1-2, 123 and 135).
Non-Final Office Action for U.S. Appl. No. 11/004,637 dated Apr. 2, 2009.
Notice of Allowance for U.S. Appl. No. 11/004,637 dated Dec. 11, 2009.
Notice of Allowance for U.S. Appl. No. 11/096,704 dated Jun. 5, 2009.
Final Office Action for U.S. Appl. No. 11/097,089 dated Mar. 17, 2009.
Non-Final Office Action for U.S. Appl. No. 11/097,089 dated Dec. 23, 2009.
Final Office Action for U.S. Appl. No. 11/097,089 dated Sep. 23, 2010.
Non-Final Office Action for U.S. Appl. No. 11/097,089 dated Apr. 7, 2011.
Notice of Allowance for U.S. Appl. No. 11/097,103 dated May 14, 2009.
Notice of Allowance for U.S. Appl. No. 11/097,828 dated Feb. 5, 2010.
Final Office Action for U.S. Appl. No. 11/097,833 dated Jul. 7, 2009.
Notice of Allowance for U.S. Appl. No. 11/097,833 dated Jan. 10, 2011.
Final Office Action for U.S. Appl. No. 11/097,835 dated Dec. 29, 2009.
Notice of Allowance for U.S. Appl. No. 11/097,835 dated Sep. 1, 2010.

Non-Final Office Action for U.S. Appl. No. 11/097,836 dated Jul. 30, 2009.
Final Office Action for U.S. Appl. No. 11/097,836 dated May 13, 2010.
Non-Final Office Action for U.S. Appl. No. 11/097,961 dated Mar. 5, 2009.
Final Office Action for U.S. Appl. No. 11/097,961 dated Dec. 9, 2009.
Non-Final Office Action for U.S. Appl. No. 11/097,961 dated Jul. 9, 2010.
Notice of Allowance for U.S. Appl. No. 11/097,981 dated Jul. 31, 2009.
Non-Final Office Action for U.S. Appl. No. 11/098,014 dated Jun. 30, 2009.
Final Office Action for U.S. Appl. No. 11/098,014 dated Mar. 26, 2010.
Non-Final Office Action for U.S. Appl. No. 11/098,014 dated Nov. 3, 2010.
Notice of Allowance for U.S. Appl. No. 11/098,014 dated Mar. 16, 2011.
Notice of Allowance for U.S. Appl. No. 11/098,016 dated Apr. 22, 2008.
Notice of Allowance for U.S. Appl. No. 11/098,038 dated May 29, 2009.
Final Office Action for U.S. Appl. No. 11/098,043 dated Jul. 21, 2009.
Non-Final Office Action for U.S. Appl. No. 11/110,353 dated Sep. 15, 2009.
Notice of Allowance for U.S. Appl. No. 11/110,353 dated Dec. 2, 2009.
Notice of Allowance for U.S. Appl. No. 11/131,945 dated Oct. 30, 2009.
Non-Final Office Action for U.S. Appl. No. 11/185,908 dated Dec. 14, 2009 (as revised Feb. 5, 2010).
Final Office Action for U.S. Appl. No. 11/185,908 dated Jun. 28, 2010.
Non-Final Office Action for U.S. Appl. No. 11/208,408 dated Apr. 23, 2010.
Notice of Allowance for U.S. Appl. No. 11/208,458 dated Jun. 2, 2008.
Non-Final Office Action for U.S. Appl. No. 11/208,461 dated Sep. 29, 2009.
Non-Final Office Action for U.S. Appl. No. 11/208,461 dated Nov. 3, 2010.
Notice of Allowance for U.S. Appl. No. 11/208,461 dated Mar. 15, 2011.
Non-Final Office Action for U.S. Appl. No. 11/209,333 dated Apr. 29, 2010.
Notice of Allowance for U.S. Appl. No. 11/210,260 dated Jan. 13, 2010.
Non-Final Office Action for U.S. Appl. No. 11/236,330 dated Dec. 2, 2009.
Notice of Allowance for U.S. Appl. No. 11/236,330 dated Jun. 22, 2010.
Final Office Action for U.S. Appl. No. 11/236,440 dated Jul. 22, 2009.
Non-Final Office Action for U.S. Appl. No. 11/365,983 dated Jan. 26, 2010.
Final Office Action for U.S. Appl. No. 11/365,983 dated Sep. 14, 2010.
Non-Final Office Action for U.S. Appl. No. 11/547,835 dated Dec. 29, 2010.
Non-Final Office Action for U.S. Appl. No. 11/672,014 dated May 6, 2010.
Notice of Allowance for U.S. Appl. No. 11/672,014 dated Feb. 28, 2011.
Non-Final Office Action for U.S. Appl. No. 11/758,866 dated Jun. 14, 2010.
Non-Final Office Action for U.S. Appl. No. 11/972,562 dated Apr. 21, 2010.
Non-Final Office Action for U.S. Appl. No. 12/538,731 dated Jun. 28, 2010.
Notice of Allowance for U.S. Appl. No. 12/538,731 dated Oct. 18, 2010.
Non-Final Office Action for U.S. Appl. No. 12/541,891 dated Dec. 9, 2010.
Non-Final Office Action for U.S. Appl. No. 12/542,816 dated Jun. 18, 2010.
Notice of Allowance for U.S. Appl. No. 12/542,816 dated Jan. 3, 2011.
Notice of Allowance for U.S. Appl. No. 12/542,816 dated Apr. 27, 2011.
Non-Final Office Action for U.S. Appl. No. 12/721,456 dated Mar. 1, 2011.
Non-Final Office Action for U.S. Appl. No. 12/887,473 dated Feb. 4, 2011.
Non-Final Office Action for U.S. Appl. No. 12/889,321 dated Mar. 31, 2011.
Non-Final Office Action for U.S. Appl. No. 12/904,064 dated Mar. 30, 2011.
D.P. Curtain, "Image Sensors—Capturing the Photograph," 2006, available at http://www.shortcourses.com/how/sensors/sensors.htm, (last visited Sep. 4, 2006).
King et al., U.S. Appl. No. 11/432,731, filed May 11, 2006.
King et al., U.S. Appl. No. 11/933,204, filed Oct. 21, 2007.
King et al., U.S. Appl. No. 11/952,885, filed Dec. 7, 2007.
King et al., U.S. Appl. No. 12/517,352, filed Jun. 2, 2009.
King et al., U.S. Appl. No. 12/517,541, filed Jun. 3, 2009.
King et al., U.S. Appl. No. 12/728,144, filed Mar. 19, 2010.
King et al., U.S. Appl. No. 12/831,213, filed Jul. 6, 2010.
King et al., U.S. Appl. No. 12/884,139, filed Sep. 6, 2010.
King et al., U.S. Appl. No. 12/894,059, filed Sep. 29, 2010.
King et al., U.S. Appl. No. 12/902,081, filed Oct. 11, 2010.
King et al., U.S. Appl. No. 12/904,064, filed Oct. 13, 2010.
King et al., U.S. Appl. No. 12/961,407, filed Dec. 6, 2010.
King et al., U.S. Appl. No. 12/964,662, filed Dec. 9, 2010.
King et al., U.S. Appl. No. 13/031,316, filed Feb. 21, 2011.
Non-Final Office Action for U.S. Appl. No. 11/236,440 dated Jan. 22, 2009.

* cited by examiner

800

3/26/05 8:10a
1 match:
  "and buying a pastry or cookie naturally follows"
  Eric Tyson, Ray Brown, *Homebuying for Dummies*, p. 1

3/26/05 2:23p
no matches
  "over a cerulean pastiche"

3/26/05 2:23p
223 matches:
  "hamburgers on the grill"
  Debbie Dadey, Marcia T. Jones, *Cupid Doesn't Flip Hamburgers*, p. 40
  Zig Ziglar, *Zig Ziglar's Secrets of Closing the Sale*, p. 73
  Janet Evanovich, *The Rocky Road to Romance*, p. 101
  ...

*FIG. 8*

| | |
|---|---|
| 3/26/05 8:10a | "and buying a pastry or cookie naturally follows" |
| 1 match: | Eric Tyson, Ray Brown, *Homebuying for Dummies*, p. 1 |
| | and buying a pastry or cookie naturally follows — 940 |
| 3/26/05 2:23p | "over a cerulean pastiche" |
| no matches | |
| 3/26/05 2:23p | "hamburgers on the grill" |
| 223 matches: | Debbie Dadey, Marcia T. Jones, *Cupid Doesn't Flip Hamburgers*, p. 40 |
| | Zig Ziglar, *Zig Ziglar's Secrets of Closing the Sale*, p. 73 |
| | Janet Evanovich, *The Rocky Road to Romance*, p. 101 |
| | ... |

3/26/05 8:10a    "and buying a pastry or cookie naturally follows"

1 match:    Eric Tyson, Ray Brown, *Homebuying for Dummies*, p. 1

"You get coffee, for instance, and buying a pastry or cookie naturally follows. By the same token, you buy a home, and before long you have a pet and gardening gloves."

3/26/05 2:23p    "over a cerulean pastiche"

no matches

3/26/05 2:23p    "hamburgers on the grill"

223 matches:    Debbie Dadey, Marcia T. Jones, *Cupid Doesn't Flip Hamburgers*, p. 40

Zig Ziglar, *Zig Ziglar's Secrets of Closing the Sale*, p. 73

Janet Evanovich, *The Rocky Road to Romance*, p. 101

...

ARCHIVE OF TEXT CAPTURES FROM
RENDERED DOCUMENTS

CROSS-REFERENCE TO RELATED
APPLICATIONS

This application is a Continuation-In-Part of U.S. patent application Ser. No. 11/098,016, filed on Apr. 1, 2005 now U.S. Pat. No. 7,421,155, which is hereby incorporated by reference in its entirety. U.S. patent application Ser. No. 11/098,016 is a Continuation-In-Part of the following applications, all of which are hereby incorporated by reference in their entireties:

U.S. patent application Ser. No. 11/097,961, filed Apr. 1, 2005 now abandoned, entitled METHODS AND SYSTEMS FOR INITIATING APPLICATION PROCESSES BY DATA CAPTURE FROM RENDERED DOCUMENTS;

U.S. patent application Ser. No. 11/097,093, filed Apr. 1, 2005 now abandoned, entitled DETERMINING ACTIONS INVOLVING CAPTURED INFORMATION AND ELECTRONIC CONTENT ASSOCIATED WITH RENDERED DOCUMENTS;

U.S. patent application Ser. No. 11/098,038, filed Apr. 1, 2005 now U.S. Pat. No. 7,599,844, entitled CONTENT ACCESS WITH HANDHELD DOCUMENT DATA CAPTURE DEVICES;

U.S. patent application Ser. No. 11/098,014, filed Apr. 1, 2005, entitled SEARCH ENGINES AND SYSTEMS WITH HANDHELD DOCUMENT DATA CAPTURE DEVICES;

U.S. patent application Ser. No. 11/097,103, filed Apr. 1, 2005 now U.S. Pat. No. 7,596,269, entitled TRIGGERING ACTIONS IN RESPONSE TO OPTICALLY OR ACOUSTICALLY CAPTURING KEYWORDS FROM A RENDERED DOCUMENT;

U.S. patent application Ser. No. 11/098,043, filed Apr. 1, 2005 now abandoned, entitled SEARCHING AND ACCESSING DOCUMENTS ON PRIVATE NETWORKS FOR USE WITH CAPTURES FROM RENDERED DOCUMENTS;

U.S. patent application Ser. No. 11/097,981, filed Apr. 1, 2005 now U.S. Pat. No. 7,606,741, entitled INFORMATION GATHERING SYSTEM AND METHOD;

U.S. patent application Ser. No. 11/097,089, filed Apr. 1, 2005, entitled DOCUMENT ENHANCEMENT SYSTEM AND METHOD;

U.S. patent application Ser. No. 11/097,835, filed Apr. 1, 2005 now U.S. Pat. No. 7,831,912, entitled PUBLISHING TECHNIQUES FOR ADDING VALUE TO A RENDERED DOCUMENT;

U.S. patent application Ser. No. 11/097,828, filed Apr. 1, 2005 now U.S. Pat. No. 7,742,953, entitled ADDING INFORMATION OR FUNCTIONALITY TO A RENDERED DOCUMENT VIA ASSOCIATION WITH AN ELECTRONIC COUNTERPART;

U.S. patent application Ser. No. 11/097,833, filed Apr. 1, 2005, entitled AGGREGATE ANALYSIS OF TEXT CAPTURES PERFORMED BY MULTIPLE USERS FROM RENDERED DOCUMENTS;

U.S. patent application Ser. No. 11/097,836, filed Apr. 1, 2005 now abandoned, entitled ESTABLISHING AN INTERACTIVE ENVIRONMENT FOR RENDERED DOCUMENTS;

U.S. patent application Ser. No. 11/098,042, filed Apr. 1, 2005 now U.S. Pat. No. 7,593,605, entitled DATA CAPTURE FROM RENDERED DOCUMENTS USING HANDHELD DEVICE; and U.S. patent application Ser. No. 11/096,704, filed Apr. 1, 2005 now U.S. Pat. No. 7,599,580, entitled CAPTURING TEXT FROM RENDERED DOCUMENTS USING SUPPLEMENTAL INFORMATION.

U.S. patent application Ser. No. 11/098,016 also claims priority to the following U.S. Provisional Patent Applications, which are hereby incorporated by reference in their entireties: Application No. 60/559,226 filed on Apr. 1, 2004, Application No. 60/558,893 filed on Apr. 1, 2004, Application No. 60/558,968 filed on Apr. 1, 2004, Application No. 60/558,867 filed on Apr. 1, 2004, Application No. 60/559,278 filed on Apr. 1, 2004, Application No. 60/559,279 filed on Apr. 1, 2004, Application No. 60/559,265 filed on Apr. 1, 2004, Application No. 60/559,277 filed on Apr. 1, 2004, Application No. 60/558,969 filed on Apr. 1, 2004, Application No. 60/558,892 filed on Apr. 1, 2004, Application No. 60/558,760 filed on Apr. 1, 2004, Application No. 60/558,717 filed on Apr. 1, 2004, Application No. 60/558,499 filed on Apr. 1, 2004, Application No. 60/558,370 filed on Apr. 1, 2004, Application No. 60/558,789 filed on Apr. 1, 2004, Application No. 60/558,791 filed on Apr. 1, 2004, Application No. 60/558,527 filed on Apr. 1, 2004, Application No. 60/559,125 filed on Apr. 2, 2004, Application No. 60/558,909 filed on Apr. 2, 2004, Application No. 60/559,033 filed on Apr. 2, 2004, Application No. 60/559,127 filed on Apr. 2, 2004, Application No. 60/559,087 filed on Apr. 2, 2004, Application No. 60/559,131 filed on Apr. 2, 2004, Application No. 60/559,766 filed on Apr. 6, 2004, Application No. 60/561,768 filed on Apr. 12, 2004, Application No. 60/563,520 filed on Apr. 19, 2004, Application No. 60/563,485 filed on Apr. 19, 2004, Application No. 60/564,688 filed on Apr. 23, 2004, Application No. 60/564,846 filed on Apr. 23, 2004, Application No. 60/566,667 filed on Apr. 30, 2004, Application No. 60/571,381 filed on May 14, 2004, Application No. 60/571,560 filed on May 14, 2004, Application No. 60/571,715 filed on May 17, 2004, Application No. 60/589,203 filed on Jul. 19, 2004, Application No. 60/589,201 filed on Jul. 19, 2004, Application No. 60/589,202 filed on Jul. 19, 2004, Application No. 60/598,821 filed on Aug. 2, 2004, Application No. 60/602,956 filed on Aug. 18, 2004, Application No. 60/602,925 filed on Aug. 18, 2004, Application No. 60/602,947 filed on Aug. 18, 2004, Application No. 60/602,897 filed on Aug. 18, 2004, Application No. 60/602,896 filed on Aug. 18, 2004, Application No. 60/602,930 filed on Aug. 18, 2004, Application No. 60/602,898 filed on Aug. 18, 2004, Application No. 60/603,466 filed on Aug. 19, 2004, Application No. 60/603,082 filed on Aug. 19, 2004, Application No. 60/603,081 filed on Aug. 19, 2004, Application No. 60/603,498 filed on Aug. 20, 2004, Application No. 60/603,358 filed on Aug. 20, 2004, Application No. 60/604,103 filed on Aug. 23, 2004, Application No. 60/604,098 filed on Aug. 23, 2004, Application No. 60/604,100 filed on Aug. 23, 2004, Application No. 60/604,102 filed on Aug. 23, 2004, Application No. 60/605,229 filed on Aug. 27, 2004, Application No. 60/605,105 filed on Aug. 27, 2004, Application No. 60/613,243 filed on Sep. 27, 2004, Application No. 60/613,628 filed on Sep. 27, 2004, Application No. 60/613,632 filed on Sep. 27, 2004, Application No. 60/613,589 filed on Sep. 27, 2004, Application No. 60/613,242 filed on Sep. 27, 2004, Application No. 60/613,602 filed on Sep. 27, 2004, Application No. 60/613,340 filed on Sep. 27, 2004, Application No. 60/613,634 filed on Sep. 27, 2004, Application No. 60/613,461 filed on Sep. 27, 2004, Application No. 60/613,455 filed on Sep. 27, 2004, Application No. 60/613,460 filed on Sep. 27, 2004, Application No. 60/613,400 filed on Sep. 27, 2004, Application No. 60/613, 456 filed on Sep. 27, 2004, Application No. 60/613,341 filed on Sep. 27, 2004, Application No. 60/613,361 filed on Sep. 27, 2004, Application No. 60/613,454 filed on Sep. 27, 2004, Application No. 60/613,339 filed on Sep. 27, 2004, Application No. 60/613,633 filed on Sep. 27, 2004, Application No. 60/615,378 filed on Oct. 1, 2004, Application No. 60/615,112 filed on Oct. 1, 2004, Application No. 60/615,538 filed on Oct. 1, 2004, Application No. 60/617,122 filed on Oct. 7, 2004, Application No. 60/622,906 filed on Oct. 28, 2004, Application No. 60/633,452 filed on Dec. 6, 2004, Application No. 60/633,678 filed on Dec. 6, 2004, Application No. 60/633,486 filed on Dec. 6, 2004, Application No. 60/633,453 filed on Dec. 6, 2004, Application No. 60/634,627 filed on Dec. 9, 2004, Application No. 60/634,739 filed on Dec. 9, 2004, Application No. 60/647,684 filed on Jan. 26, 2005, Application No. 60/648,746 filed on Jan. 31, 2005, Application No. 60/653,372 filed on Feb. 15, 2005, Application No. 60/653,663 filed on Feb. 16, 2005, Application No. 60/653,669 filed on Feb. 16, 2005, Application No. 60/653,899 filed on Feb. 16, 2005, Application No. 60/653,679 filed on Feb. 16, 2005, Application No. 60/653,847 filed on Feb. 16, 2005, Application No. 60/654,379 filed on Feb. 17, 2005, Application No. 60/654,368 filed on Feb. 18, 2005, Application No. 60/654,326 filed on Feb. 18, 2005, Application No. 60/654,196 filed on Feb. 18, 2005, Application No. 60/655,279 filed on Feb. 22, 2005, Application No. 60/655,280 filed on Feb. 22, 2005, Application No. 60/655,987 filed on Feb. 22, 2005, Application No. 60/655,697 filed on Feb. 22, 2005, Application No. 60/655,281 filed on Feb. 22, 2005, and Application No. 60/657,309 filed on Feb. 28, 2005.

This application is also a Continuation-In-Part of the following additional applications, all of which are hereby incorporated by reference in their entireties:

U.S. patent application Ser. No. 11/547,835, filed Apr. 12, 2005, entitled ADDING VALUE TO A RENDERED DOCUMENT;

U.S. patent application Ser. No. 11/110,353, filed Apr. 19, 2005 now U.S. Pat. No. 7,702,624, entitled PROCESSING TECHNIQUES FOR VISUAL CAPTURE DATA FROM A RENDERED DOCUMENT;

U.S. patent application Ser. No. 11/131,945, filed May 17, 2005 now U.S. Pat. No. 7,818,215, entitled PROCESSING TECHNIQUES FOR TEXT CAPTURE FROM A RENDERED DOCUMENT;

U.S. patent application Ser. No. 11/185,908, filed Jul. 19, 2005 now abandoned, entitled AUTOMATIC MODIFICATION OF WEB PAGES;

U.S. patent application Ser. No. 11/208,408, filed Aug. 18, 2005 now abandoned, entitled SCANNER HAVING CONNECTED AND UNCONNECTED OPERATIONAL BEHAVIORS;

U.S. patent application Ser. No. 11/208,458, filed Aug. 18, 2005 now U.S. Pat. No. 7,437,023, entitled METHODS, SYSTEMS AND COMPUTER PROGRAM PRODUCTS FOR DATA GATHERING IN A DIGITAL AND HARD COPY DOCUMENT ENVIRONMENT;

U.S. patent application Ser. No. 11/208,461, filed Aug. 18, 2005, entitled APPLYING SCANNED INFORMATION TO IDENTIFY CONTENT;

U.S. patent application Ser. No. 11/209,333, filed Aug. 23, 2005 now abandoned, entitled PORTABLE SCANNING DEVICE;

U.S. patent application Ser. No. 11/236,440, filed Sep. 27, 2005 now abandoned, entitled SECURE DATA GATHERING FROM RENDERED DOCUMENTS;

U.S. patent application Ser. No. 11/236,330, filed Sep. 27, 2005 now U.S. Pat. No. 7,812,860, entitled HAND-HELD DEVICE FOR CAPTURING TEXT FROM BOTH A DOCUMENT PRINTED ON PAPER AND A DOCUMENT DISPLAYED ON A DYNAMIC DISPLAY DEVICE;

U.S. patent application Ser. No. 11/365,983, filed Feb. 28, 2006, entitled ASSOCIATION OF A PORTABLE SCANNER WITH INPUT/OUTPUT AND STORAGE DEVICES;

U.S. patent application Ser. No. 11/672,014, filed Feb. 6, 2007, entitled A PORTABLE SCANNING AND MEMORY DEVICE;

U.S. patent application Ser. No. 11/758,866, filed Jun. 6, 2007, entitled CONTEXTUAL DYNAMIC ADVERTISING BASED UPON CAPTURED RENDERED TEXT;

U.S. patent application Ser. No. 11/933,204, filed Oct. 31, 2007, entitled METHODS, SYSTEMS AND COMPUTER PROGRAM PRODUCTS FOR DATA GATHERING IN A DIGITAL AND HARD COPY DOCUMENT ENVIRONMENT;

U.S. patent application Ser. No. 11/952,885, filed Dec. 7, 2007, entitled CONTENT ACCESS WITH HANDHELD DOCUMENT DATA CAPTURE DEVICES; and U.S. patent application Ser. No. 11/972,562, filed Jan. 10, 2008, entitled DETERMINING ACTIONS INVOLVING CAPTURED INFORMATION AND ELECTRONIC CONTENT ASSOCIATED WITH RENDERED DOCUMENTS.

TECHNICAL FIELD

The described technology is directed to the field of document processing.

BACKGROUND

People read for a variety of reasons: for enjoyment, for education, to research a particular topic, for business-related information-gathering, for reference purposes or to keep in touch with current affairs, to name but a few. Every day around the world, a vast amount of human time, effort and mental energy goes into reading.

Most of this effort is lost. Even those with good memories will remember only a small proportion of the content that they read. A larger proportion may be remembered in a vague way, but finding previously read material again is a difficult task and conveying that vague knowledge to others even harder.

Over the centuries, various attempts to tackle this problem have been made. People annotate books by writing in the margins, they insert bookmarks or use Post-It™ notes to identify favorite passages, they take clippings from newspapers and they photocopy pages. Others transcribe passages onto note cards or compose bibliographies.

These solutions, though, all have limitations. No one solution is appropriate for recording items of interest in all situations. Writing annotations in the margin, for example, is only appropriate for the owner of the book. Many of the solutions employ a physical medium that is not always available, such as post-it notes. Others are inconvenient in other ways. Photocopying requires large expensive machines, and handwritten transcriptions are time-consuming.

Lastly, none of the aforementioned methods of recording afford users the convenience and flexibility we have come to associate with electronic data; the ability to copy, edit, search, classify, annotate and distribute information with ease. The digital solutions that come closest to capturing printed content of interest have been scanning combined with traditional OCR techniques, which is inconvenient and unreliable, and manual transcription by re-typing, which is time-consuming.

BRIEF DESCRIPTION OF THE DRAWINGS

FIGS. 8-11 are display diagrams showing typical displays presented by the system when a user accesses his or her Life Library.

DETAILED DESCRIPTION

Overview

Figure 1:
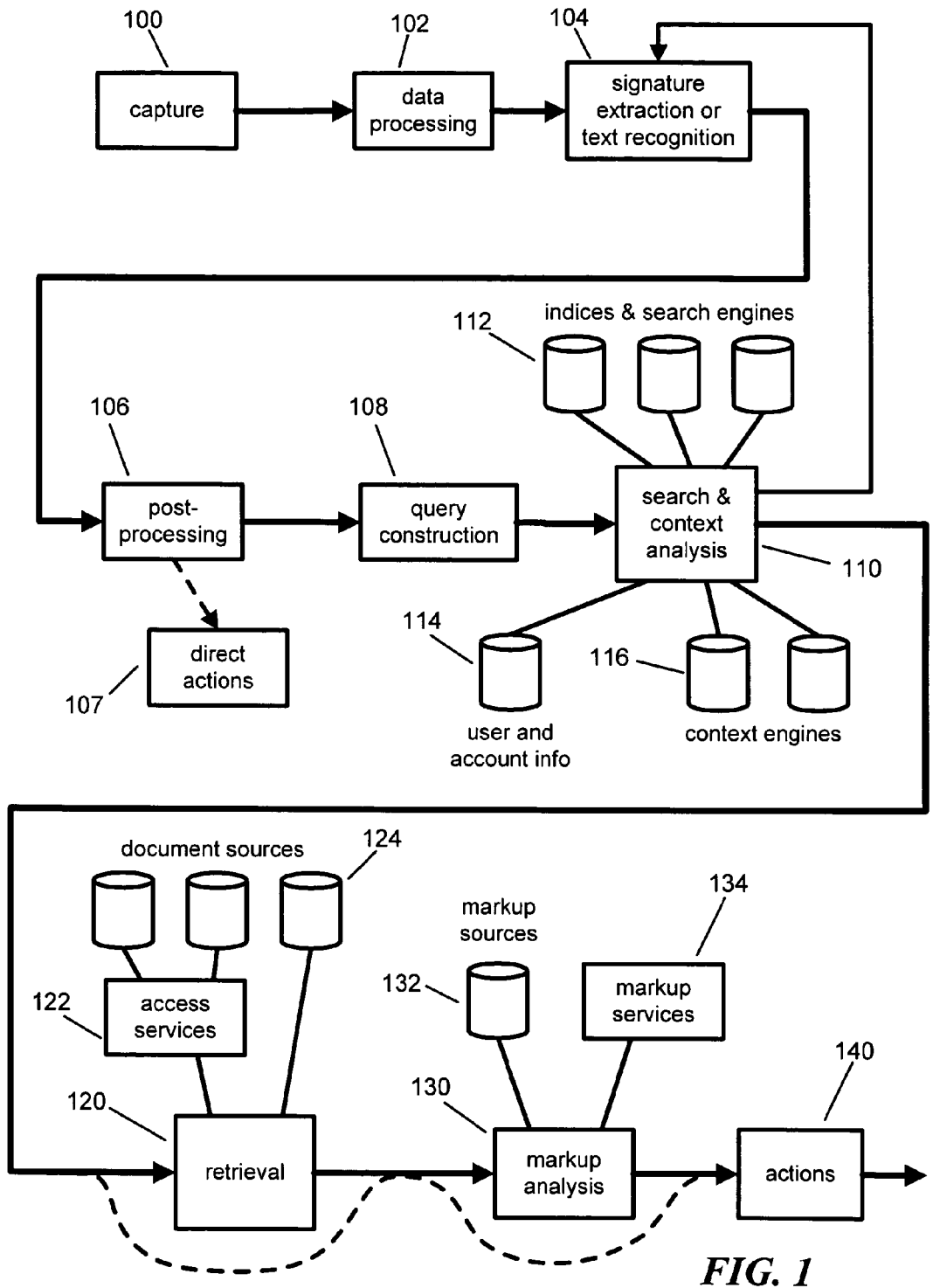
FIG. 1 is a data flow diagram that illustrates the flow of information in one embodiment of the core system.

A system is described that allows a reader to capture, with minimal effort and maximum utility, information in a document that interests the reader ("the system").

Part I—Introduction

1. Nature of the System

For every paper document that has an electronic counterpart, there exists a discrete amount of information in the paper document that can identify the electronic counterpart. In some embodiments, the system uses a sample of text captured from a paper document, for example using a handheld scanner, to identify and locate an electronic counterpart of the document. In most cases, the amount of text needed by the facility is very small in that a few words of text from a document can often function as an identifier for the paper document and as a link to its electronic counterpart. In addition, the system may use those few words to identify not only the document, but also a location within the document.

Thus, paper documents and their digital counterparts can be associated in many useful ways using the system discussed herein.

1.1. A Quick Overview of the Future

Once the system has associated a piece of text in a paper document with a particular digital entity has been established, the system is able to build a huge amount of functionality on that association.

It is increasingly the case that most paper documents have an electronic counterpart that is accessible on the World Wide Web or from some other online database or document corpus, or can be made accessible, such as in response to the payment of a fee or subscription. At the simplest level, then, when a user scans a few words in a paper document, the system can retrieve that electronic document or some part of it, or display it, email it to somebody, purchase it, print it or post it to a web page. As additional examples, scanning a few words of a book that a person is reading over breakfast could cause the audiobook version in the person's car to begin reading from that point when s/he starts driving to work, or scanning the serial number on a printer cartridge could begin the process of ordering a replacement.

The system implements these and many other examples of "paper/digital integration" without requiring changes to the current processes of writing, printing and publishing documents, giving such conventional rendered documents a whole new layer of digital functionality.

1.2. Terminology

A typical use of the system begins with using an optical scanner to scan text from a paper document, but it is important to note that other methods of capture from other types of document are equally applicable. The system is therefore sometimes described as scanning or capturing text from a rendered document, where those terms are defined as follows:

A rendered document is a printed document or a document shown on a display or monitor, such as on a personal computer, mobile phone, electronic book ("e-book") reader (e.g., the Kindle, made by Amazon.com, Inc. of Seattle, Wash.) personal digital assistant ("PDA") and the like. It is a document that is perceptible to a human, whether in permanent form or on a transitory display. Herein, the phrase "paper document" is used for the sake of convenience as a substitute for "rendered document." Therefore, all statements regarding "paper documents" should be interpreted to apply to all "rendered documents," as defined in this paragraph.

Scanning or capturing is the process of systematic examination to obtain information from a rendered document. The process may involve optical capture using a scanner or camera (for example a camera in a cellphone), or it may involve reading aloud from the document into an audio capture device or typing it on a keypad or keyboard. For more examples, see Section 15.

2. Introduction to the System

This section describes some of the devices, processes and systems that constitute a system for paper/digital integration. In various embodiments, the system builds a wide variety of services and applications on this underlying core that provides the basic functionality.

2.1. The Processes

FIG. 1 is a data flow diagram that illustrates the flow of information in one embodiment of the core system. Other embodiments may not use all of the stages or elements illustrated here, while some will use many more.

Text from a rendered document is captured 100, typically in optical form by an optical scanner or audio form by a voice recorder, and this image or sound data is then processed 102, for example to remove artifacts of the capture process or to improve the signal-to-noise ratio. A recognition process 104 such as OCR, speech recognition, or autocorrelation then converts the data into a signature, comprised in some embodiments of text, text offsets, or other symbols. Alternatively, the system performs an alternate form of extracting document signature from the rendered document. The signature represents a set of possible text transcriptions in some embodiments. This process may be influenced by feedback from other stages, subsequent captures, or other information, such as location, weather conditions, real-world events, and the like. For example, if the search process and context analysis 110 have identified some candidate documents from which the capture may originate, thus narrowing the possible interpretations of the original capture.

A post-processing 106 stage may take the output of the recognition process and filter it or perform such other operations upon it as may be useful. Depending upon the embodiment implemented, it may be possible at this stage to deduce some direct actions 107 to be taken immediately without reference to the later stages, such as where a phrase or symbol has been captured which contains sufficient information in itself to convey the user's intent. In these cases no digital counterpart document need be referenced, or even known to the system.

Typically, however, the next stage will be to construct a query 108 or a set of queries for use in searching. Some aspects of the query construction may depend on the search process used and so cannot be performed until the next stage, but there will typically be some operations, such as the removal of obviously misrecognized or irrelevant characters, which can be performed in advance.

The query or queries are then passed to the search and context analysis stage 110. Here, the system optionally attempts to identify the document from which the original data was captured. To do so, the system typically uses search indices and search engines 112, knowledge about the user 114 and knowledge about the user's context or the context in which the capture occurred 116. Search engine 112 may employ and/or index information specifically about rendered documents, about their digital counterpart documents, and about documents that have a web (internet) presence). It may write to, as well as read from, many of these sources and, as has been mentioned, it may feed information into other stages of the process, for example by giving the recognition system 104 information about the language, font, rendering and likely next words based on its knowledge of the candidate documents.

In some circumstances the next stage will be to retrieve 120 a copy of the document or documents that have been identified. The sources of the documents 124 may be directly accessible, for example from a local filing system or database or a web server, or they may need to be contacted via some access service 122 which might enforce authentication, security or payment or may provide other services such as conversion of the document into a desired format.

Applications of the system may take advantage of the association of extra functionality or data with part or all of a document. For example, advertising applications discussed in Section 10.4 may use an association of particular advertising messages or subjects with portions of a document. This extra associated functionality or data can be thought of as one or more overlays on the document, and is referred to herein as "markup". The next stage of the process 130, then, is to identify any markup relevant to the captured data. Such markup may be provided by the user, the originator, or publisher of the document, or some other party, and may be directly accessible from some source 132 or may be generated by some service 134. In various embodiments, markup can be associated with, and apply to, a rendered document and/or the digital counterpart to a rendered document, or to groups of either or both of these documents.

Lastly, as a result of the earlier stages, some actions may be taken 140. These may be default actions such as simply recording the information found, they may be dependent on the data or document, or they may be derived from the markup analysis. Sometimes the action will simply be to pass the data to another system. In some cases the various possible actions appropriate to a capture at a specific point in a rendered document will be presented to the user as a menu on an associated display, for example on a local display 332, on a computer display 212 or a mobile phone or PDA display 216. If the user doesn't respond to the menu, the default actions can be taken.

2.2. The Components

Figure 2:
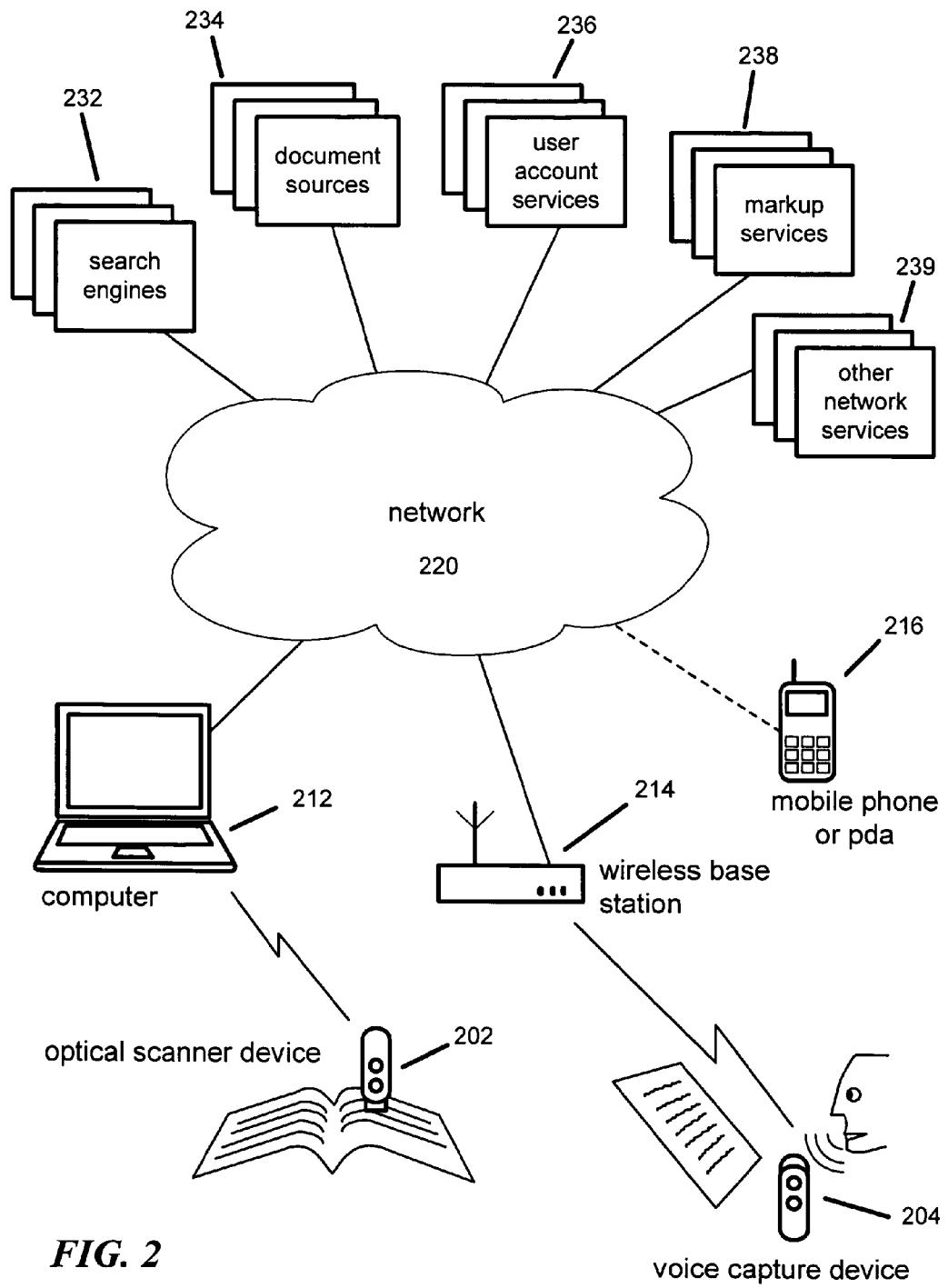
FIG. 2 is a component diagram of components included in a typical implementation of the system in the context of a typical operating environment.

FIG. 2 is a component diagram of components included in a typical implementation of the system in the context of a typical operating environment. As illustrated, the operating environment includes one or more optical scanning capture devices 202 or voice capture devices 204. In some embodiments, the same device performs both functions. Each capture device is able to communicate with other parts of the system such as a computer 212 and a mobile station 216 (e.g., a mobile phone or PDA) using either a direct wired or wireless connection, or through the network 220, with which it can communicate using a wired or wireless connection, the latter typically involving a wireless base station 214. In some embodiments, the capture device is integrated in the mobile station, and optionally shares some of the audio and/or optical components used in the device for voice communications and picture-taking.

Computer 212 may include a memory containing computer executable instructions for processing an order from scanning devices 202 and 204. As an example, an order can include an identifier (such as a serial number of the scanning device 202/204 or an identifier that partially or uniquely identifies the user of the scanner), scanning context information (e.g., time of scan, location of scan, etc.) and/or scanned information (such as a text string) that is used to uniquely identify the document being scanned. In alternative embodiments, the operating environment may include more or less components.

Also available on the network 220 are search engines 232, document sources 234, user account services 236, markup services 238 and other network services 239. The network 220 may be a corporate intranet, the public Internet, a mobile phone network or some other network, or any interconnection of the above, e.g., a Voice over IP (VOIP) network.

Regardless of the manner by which the devices are coupled to each other, they may all may be operable in accordance with well-known commercial transaction and communication protocols (e.g., Internet Protocol (IP)). In various embodiments, the functions and capabilities of scanning device 202, computer 212, and mobile station 216 may be wholly or partially integrated into one device. Thus, the terms scanning device, computer, and mobile station can refer to the same device depending upon whether the device incorporates functions or capabilities of the scanning device 202, computer 212 and mobile station 216. In addition, some or all of the functions of the search engines 232, document sources 234, user account services 236, markup services 238 and other network services 239 may be implemented on any of the devices and/or other devices not shown.

2.3. The Capture Device

As described above, the capture device may capture text using an optical scanner or camera that captures image data from the rendered document, or using an audio recording device that captures a user's spoken reading of the text, or other methods. Some embodiments of the capture device may also capture images, graphical symbols and icons, etc., including machine readable codes such as barcodes. The device may be exceedingly simple, consisting of little more than the transducer, some storage, and a data interface, relying on other functionality residing elsewhere in the system, or it may be a more full-featured device. In some embodiments, the functions of a capture device may be incorporated into a mobile phone (whether connected to a mobile phone network, VOIP network, or other network), portable media player, Personal Digital Assistant (PDA), or other portable device. For example, a mobile camera-phone running capture software may act as a capture device. Alternately, a mobile phone or other portable device may incorporate a special purpose text scanner. For illustration, this section describes a device based around an optical scanner and with a reasonable number of features.

Scanners are well known devices that capture and digitize images. An offshoot of the photocopier industry, the first scanners were relatively large devices that captured an entire document page at once. Recently, portable optical scanners have been introduced in convenient form factors, such as a pen-shaped handheld device.

In some embodiments, the portable scanner is used to scan text, graphics, or symbols from rendered documents. The portable scanner has a scanning element that captures text, symbols, graphics, etc, from rendered documents. In addition to documents that have been printed on paper, in some embodiments, rendered documents include documents that have been displayed on a screen such as a CRT monitor or LCD display.

Figure 3:
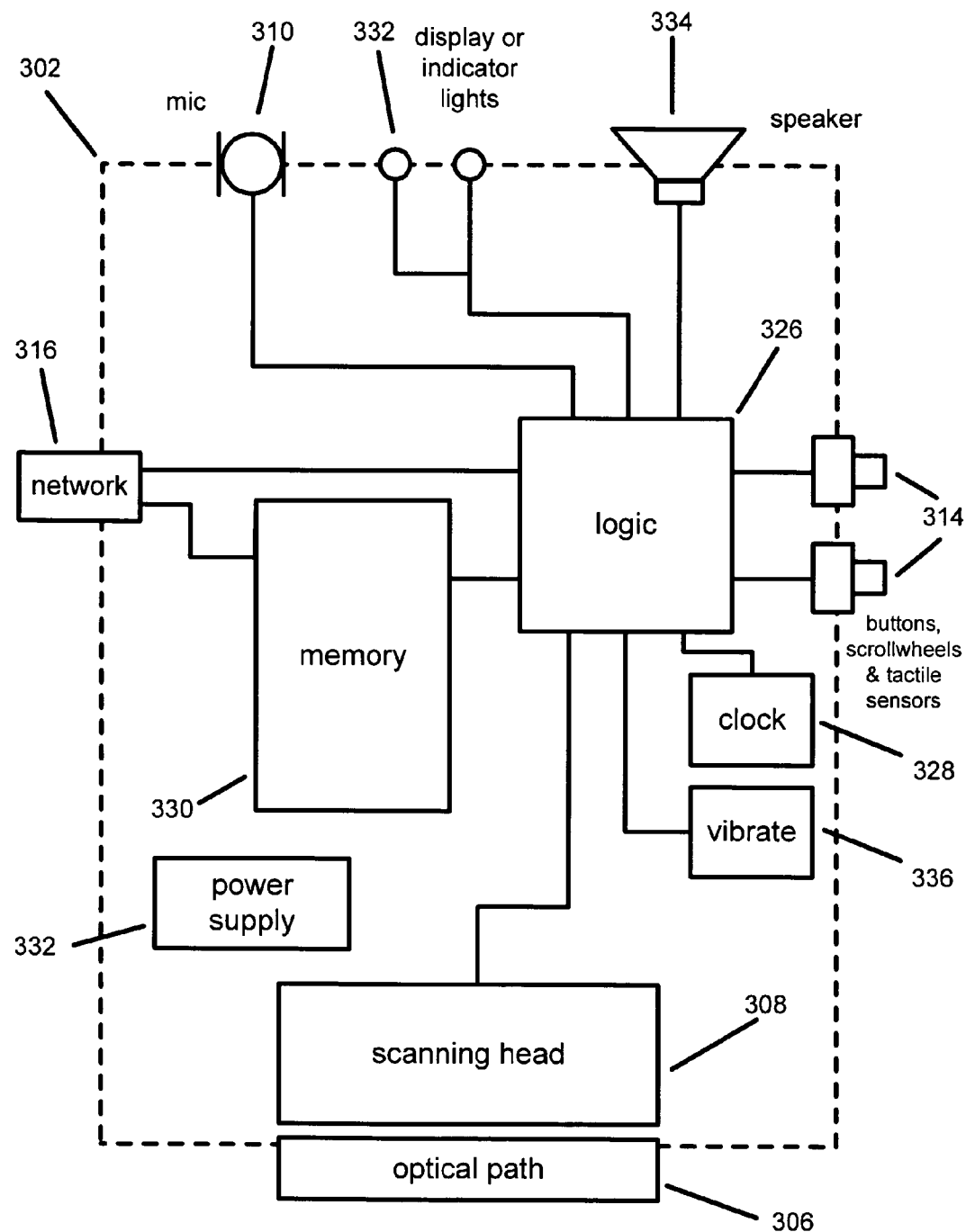
FIG. 3 is a block diagram of an embodiment of a scanner.

FIG. 3 is a block diagram of an embodiment of a scanner 302. The scanner 302 comprises an optical scanning head 308 to scan information from rendered documents and convert it to machine-compatible data, and an optical path 306, typically a lens, an aperture or an image conduit to convey the image from the rendered document to the scanning head. The scanning head 308 may incorporate a Charge-Coupled Device (CCD), a Complementary Metal Oxide Semiconductor (CMOS) imaging device, or an optical sensor of another type.

A microphone 310 and associated circuitry convert the sound of the environment (including spoken words) into machine-compatible signals, and other input facilities exist in the form of buttons, scroll-wheels or other tactile sensors such as touch-pads 314.

Feedback to the user is possible through a visual display or indicator lights 332, through a loudspeaker or other audio transducer 334 and through a vibrate module 336.

The scanner 302 comprises logic 326 to interact with the various other components, possibly processing the received signals into different formats and/or interpretations. Logic 326 may be operable to read and write data and program instructions stored in associated storage 330 such as RAM, ROM, flash, or other suitable memory. It may read a time signal from the clock unit 328. The scanner 302 also includes an interface 316 to communicate scanned information and other signals to a network and/or an associated computing device. In some embodiments, the scanner 302 may have an on-board power supply 332. In other embodiments, the scanner 302 may be powered from a tethered connection to another device, such as a Universal Serial Bus (USB) connection.

As an example of one use of scanner 302, a reader may scan some text from a newspaper article with scanner 302. The text is scanned as a bit-mapped image via the scanning head 308. Logic 326 causes the bit-mapped image to be stored in memory 330 with an associated time-stamp read from the clock unit 328. Logic 326 may also perform optical character recognition (OCR) or other post-scan processing on the bit-mapped image to convert it to text. Logic 326 may optionally extract a signature from the image, for example by performing a convolution-like process to locate repeating occurrences of characters, symbols or objects, and determine the distance or number of other characters, symbols, or objects between these repeated elements. The reader may then upload the bit-mapped image (or text or other signature, if post-scan processing has been performed by logic 326) to an associated computer via interface 316.

As an example of another use of scanner 302, a reader may capture some text from an article as an audio file by using microphone 310 as an acoustic capture port. Logic 326 causes audio file to be stored in memory 328. Logic 326 may also perform voice recognition or other post-scan processing on the audio file to convert it to text. As above, the reader may then upload the audio file (or text produced by post-scan processing performed by logic 326) to an associated computer via interface 316.

Part II—Overview of the Areas of the Core System

As paper-digital integration becomes more common, there are many aspects of existing technologies that can be changed to take better advantage of this integration, or to enable it to be implemented more effectively. This section highlights some of those issues.

3. Search

Searching a corpus of documents, even so large a corpus as the World Wide Web, has become commonplace for ordinary users, who use a keyboard to construct a search query which is sent to a search engine. This section and the next discuss the aspects of both the construction of a query originated by a capture from a rendered document, and the search engine that handles such a query.

3.1. Scan/Speak/Type as Search Query

Use of the described system typically starts with a few words being captured from a rendered document using any of several methods, including those mentioned in Section 1.2 above. Where the input needs some interpretation to convert it to text, for example in the case of OCR or speech input, there may be end-to-end feedback in the system so that the document corpus can be used to enhance the recognition process. End-to-end feedback can be applied by performing an approximation of the recognition or interpretation, identifying a set of one or more candidate matching documents, and then using information from the possible matches in the candidate documents to further refine or restrict the recognition or interpretation. Candidate documents can be weighted according to their probable relevance (for example, based on then number of other users who have scanned in these documents, or their popularity on the Internet), and these weights can be applied in this iterative recognition process.

3.2. Short Phrase Searching

Because the selective power of a search query based on a few words is greatly enhanced when the relative positions of these words are known, only a small amount of text need be captured for the system to identify the text's location in a corpus. Most commonly, the input text will be a contiguous sequence of words, such as a short phrase.

3.2.1. Finding Document and Location in Document from Short Capture

In addition to locating the document from which a phrase originates, the system can identify the location in that document and can take action based on this knowledge.

3.2.2. Other Methods of Finding Location

The system may also employ other methods of discovering the document and location, such as by using watermarks or other special markings on the rendered document.

3.3. Incorporation of Other Factors in Search Query

In addition to the captured text, other factors (i.e., information about user identity, profile, and context) may form part of the search query, such as the time of the capture, the identity and geographical location of the user, knowledge of the user's habits and recent activities, etc.

The document identity and other information related to previous captures, especially if they were quite recent, may form part of a search query.

The identity of the user may be determined from a unique identifier associated with a capturing device, and/or biometric or other supplemental information (speech patterns, fingerprints, etc.).

3.4. Knowledge of Nature of Unreliability in Search Query (OCR Errors Etc)

The search query can be constructed taking into account the types of errors likely to occur in the particular capture method used. One example of this is an indication of suspected errors in the recognition of specific characters; in this instance a search engine may treat these characters as wildcards, or assign them a lower priority.

3.5. Local Caching of Index for Performance/Offline Use

Sometimes the capturing device may not be in communication with the search engine or corpus at the time of the data capture. For this reason, information helpful to the offline use of the device may be downloaded to the device in advance, or to some entity with which the device can communicate. In some cases, all or a substantial part of an index associated with a corpus may be downloaded. This topic is discussed further in Section 15.3.

3.6. Queries, in Whatever Form, May be Recorded and Acted on Later

If there are likely to be delays or cost associated with communicating a query or receiving the results, this pre-loaded information can improve the performance of the local device, reduce communication costs, and provide helpful and timely user feedback.

In the situation where no communication is available (the local device is "offline"), the queries may be saved and transmitted to the rest of the system at such a time as communication is restored.

In these cases it may be important to transmit a timestamp with each query. The time of the capture can be a significant factor in the interpretation of the query. For example, Section 13.1 discusses the importance of the time of capture in relation to earlier captures. It is important to note that the time of capture will not always be the same as the time that the query is executed.

3.7. Parallel Searching

For performance reasons, multiple queries may be launched in response to a single capture, either in sequence or in parallel. Several queries may be sent in response to a single capture, for example as new words are added to the capture, or to query multiple search engines in parallel.

For example, in some embodiments, the system sends queries to a special index for the current document, to a search engine on a local machine, to a search engine on the corporate network, and to remote search engines on the Internet.

The results of particular searches may be given higher priority than those from others.

The response to a given query may indicate that other pending queries are superfluous; these may be cancelled before completion.

4. Paper and Search Engines

Often it is desirable for a search engine that handles traditional online queries also to handle those originating from rendered documents. Conventional search engines may be enhanced or modified in a number of ways to make them more suitable for use with the described system.

The search engine and/or other components of the system may create and maintain indices that have different or extra features. The system may modify an incoming paper-originated query or change the way the query is handled in the resulting search, thus distinguishing these paper-originated queries from those coming from queries typed into web browsers and other sources. And the system may take different actions or offer different options when the results are returned by the searches originated from paper as compared to those from other sources. Each of these approaches is discussed below.

4.1 Indexing

Often, the same index can be searched using either paper-originated or traditional queries, but the index may be enhanced for use in the current system in a variety of ways.

4.1.1. Knowledge about the Paper Form

Extra fields can be added to such an index that will help in the case of a paper-based search.

Index Entry Indicating Document Availability in Paper Form

The first example is a field indicating that the document is known to exist or be distributed in paper form. The system may give such documents higher priority if the query comes from paper.

Knowledge of Popularity Paper Form

In this example statistical data concerning the popularity of paper documents (and, optionally, concerning sub-regions within these documents)—for example the amount of scanning activity, circulation numbers provided by the publisher or other sources, etc—is used to give such documents higher priority, to boost the priority of digital counterpart documents (for example, for browser-based queries or web searches), etc.

Knowledge of Rendered Format

Another important example may be recording information about the layout of a specific rendering of a document.

For a particular edition of a book, for example, the index may include information about where the line breaks and page breaks occur, which fonts were used, any unusual capitalization.

The index may also include information about the proximity of other items on the page, such as images, text boxes, tables and advertisements.

Use of Semantic Information in Original

Lastly, semantic information that can be deduced from the source markup but is not apparent in the paper document, such as the fact that a particular piece of text refers to an item offered for sale, or that a certain paragraph contains program code, may also be recorded in the index.

4.1.2. Indexing in the Knowledge of the Capture Method

A second factor that may modify the nature of the index is the knowledge of the type of capture likely to be used. A search initiated by an optical scan may benefit if the index takes into account characters that are easily confused in the OCR process, or includes some knowledge of the fonts used in the document. Similarly, if the query is from speech recognition, an index based on similar-sounding phonemes may be much more efficiently searched. An additional factor that may affect the use of the index in the described model is the importance of iterative feedback during the recognition process. If the search engine is able to provide feedback from the index as the text is being captured, it can greatly increase the accuracy of the capture.

Indexing Using Offsets

If the index is likely to be searched using the offset-based/autocorrelation OCR methods described in Section 9, in some embodiments, the system stores the appropriate offset or signature information in an index.

4.1.3. Multiple Indices

Lastly, in the described system, it may be common to conduct searches on many indices. Indices may be maintained on several machines on a corporate network. Partial indices may be downloaded to the capture device, or to a machine close to the capture device. Separate indices may be created for users or groups of users with particular interests, habits or permissions. An index may exist for each filesystem, each directory, and even each file on a user's hard disk. Indexes are published and subscribed to by users and by systems. It will be important, then, to construct indices that can be distributed, updated, merged and separated efficiently.

4.2. Handling the Queries 4.2. Knowing the Capture is from Paper

A search engine may take different actions when it recognizes that a search query originated from a paper document. The engine might handle the query in a way that is more tolerant to the types of errors likely to appear in certain capture methods, for example.

It may be able to deduce this from some indicator included in the query (for example a flag indicating the nature of the capture), or it may deduce this from the query itself (for example, it may recognize errors or uncertainties typical of the OCR process).

Alternatively, queries from a capture device can reach the engine by a different channel or port or type of connection than those from other sources, and can be distinguished in that way. For example, some embodiments of the system will route queries to the search engine by way of a dedicated gateway. Thus, the search engine knows that all queries passing through the dedicated gateway were originated from a paper document.

4.2.2. Use of Context

Section 13 below describes a variety of different factors which are external to the captured text itself, yet which can be a significant aid in identifying a document. These include such things as the history of recent scans, the longer-term reading habits of a particular user, the geographic location of a user and the user's recent use of particular electronic documents. Such factors are referred to herein as "context".

Some of the context may be handled by the search engine itself, and be reflected in the search results. For example, the search engine may keep track of a user's scanning history, and may also cross-reference this scanning history to conventional keyboard-based queries. In such cases, the search engine maintains and uses more state information about each individual user than do most conventional search engines, and each interaction with a search engine may be considered to extend over several searches and a longer period of time than is typical today.

Some of the context may be transmitted to the search engine in the search query (Section 3.3), and may possibly be stored at the engine so as to play a part in future queries. Lastly, some of the context will best be handled elsewhere, and so becomes a filter or secondary search applied to the results from the search engine.

Data-Stream Input to Search

An important input into the search process is the broader context of how the community of users is interacting with the rendered version of the document—for example, which documents are most widely read and by whom. There are analogies with a web search returning the pages that are most frequently linked to, or those that are most frequently selected from past search results. For further discussion of this topic, see Sections 13.4 and 14.2.

4.2.3. Document Sub-Regions

The described system can emit and use not only information about documents as a whole, but also information about sub-regions of documents, even down to individual words. Many existing search engines concentrate simply on locating a document or file that is relevant to a particular query. Those that can work on a finer grain and identify a location within a document will provide a significant benefit for the described system.

4.3. Returning the Results

The search engine may use some of the further information it now maintains to affect the results returned.

The system may also return certain documents to which the user has access only as a result of being in possession of the paper copy (Section 7.4).

The search engine may also offer new actions or options appropriate to the described system, beyond simple retrieval of the text.

5. Markup Annotations and Metadata

In addition to performing the capture-search-retrieve process, the described system also associates extra functionality with a document, and in particular with specific locations or segments of text within a document. This extra functionality is often, though not exclusively, associated with the rendered document by being associated with its electronic counterpart. As an example, hyperlinks in a web page could have the same functionality when a printout of that web page is scanned. In some cases, the functionality is not defined in the electronic document, but is stored or generated elsewhere.

This layer of added functionality is referred to herein as "markup".

5.1. Overlays, Static and Dynamic

One way to think of the markup is as an "overlay" on the document, which provides further information about—and may specify actions associated with—the document or some portion of it. The markup may include human-readable content, but is often invisible to a user and/or intended for machine use. Examples include options to be displayed in a popup-menu on a nearby display when a user captures text from a particular area in a rendered document, or audio samples that illustrate the pronunciation of a particular phrase.

5.1.1. Several Layers, Possibly from Several Sources

Any document may have multiple overlays simultaneously, and these may be sourced from a variety of locations. Markup data may be created or supplied by the author of the document, or by the user, or by some other party.

Markup data may be attached to the electronic document or embedded in it. It may be found in a conventional location (for example, in the same place as the document but with a different filename suffix). Markup data may be included in the search results of the query that located the original document, or may be found by a separate query to the same or another search engine. Markup data may be found using the original captured text and other capture information or contextual information, or it may be found using already-deduced information about the document and location of the capture. Markup data may be found in a location specified in the document, even if the markup itself is not included in the document.

The markup may be largely static and specific to the document, similar to the way links on a traditional html web page are often embedded as static data within the html document, but markup may also be dynamically generated and/or applied to a large number of documents. An example of dynamic markup is information attached to a document that includes the up-to-date share price of companies mentioned in that document. An example of broadly applied markup is translation information that is automatically available on multiple documents or sections of documents in a particular language.

5.1.2. Personal "Plug-in" Layers

Users may also install, or subscribe to particular sources of, markup data, thus personalizing the system's response to particular captures.

5.2. Keywords and Phrases, Trademarks and Logos

Some elements in documents may have particular "markup" or functionality associated with them based on their own characteristics rather than their location in a particular document. Examples include special marks that are printed in the document purely for the purpose of being scanned, as well as logos and trademarks that can link the user to further information about the organization concerned. The same applies to "keywords" or "key phrases" in the text. Organizations might register particular phrases with which they are associated, or with which they would like to be associated, and attach certain markup to them that would be available wherever that phrase was scanned.

Any word, phrase, etc. may have associated markup. For example, the system may add certain items to a pop-up menu (e.g., a link to an online bookstore) whenever the user captures the word "book," or the title of a book, or a topic related to books. In some embodiments, of the system, digital counterpart documents or indices are consulted to determine whether a capture occurred near the word "book," or the title of a book, or a topic related to books—and the system behavior is modified in accordance with this proximity to keyword elements. In the preceding example, note that markup enables data captured from non-commercial text or documents to trigger a commercial transaction.

5.3. User-Supplied Content

5.3.1. User Comments and Annotations Including Multimedia

Annotations are another type of electronic information that may be associated with a document. For example, a user can attach an audio file of his/her thoughts about a particular document for later retrieval as voice annotations. As another example of a multimedia annotation, a user may attach photographs of places referred to in the document. The user generally supplies annotations for the document but the system can associate annotations from other sources (for example, other users in a work group may share annotations).

5.3.2. Notes from Proof-Reading

An important example of user-sourced markup is the annotation of paper documents as part of a proofreading, editing or reviewing process.

5.4. Third-Party Content

As mentioned earlier, markup data may often be supplied by third parties, such as by other readers of the document. Online discussions and reviews are a good example, as are community-managed information relating to particular works, volunteer-contributed translations and explanations.

Another example of third-party markup is that provided by advertisers.

5.5. Dynamic Markup Based on Other Users' Data Streams

By analyzing the data captured from documents by several or all users of the system, markup can be generated based on the activities and interests of a community. An example might be an online bookstore that creates markup or annotations that tell the user, in effect, "People who enjoyed this book also enjoyed . . . ". The markup may be less anonymous, and may tell the user which of the people in his/her contact list have also read this document recently. Other examples of datastream analysis are included in Section 14.

5.6. Markup Based on External Events and Data Sources

Markup will often be based on external events and data sources, such as input from a corporate database, information from the public Internet, or statistics gathered by the local operating system.

Data sources may also be more local, and in particular may provide information about the user's context—his/her identity, location and activities. For example, the system might communicate with the user's mobile phone and offer a markup layer that gives the user the option to send a document to somebody that the user has recently spoken to on the phone.

6. Authentication, Personalization and Security

In many situations, the identity of the user will be known. Sometimes this will be an "anonymous identity", where the user is identified only by the serial number of the capture device, for example. Typically, however, it is expected that the system will have a much more detailed knowledge of the user, which can be used for personalizing the system and to allow activities and transactions to be performed in the user's name.

6.1 User History and "Life Library"

One of the simplest and yet most useful functions that the system can perform is to keep a record for a user of the text that s/he has captured and any further information "related to" that capture, including the details of any documents found, the location within that document and any actions taken as a result. This stored history is beneficial for both the user and the system. In this context, the term "related to" is used as follows.

Objects and information can be either explicitly or implicitly "related to" a capture made by the user. For example, goods, services, people, text, images, movies, places, phone numbers, etc., can be related to or associated with a user's capture because they are specifically named or referenced in the captured content itself, because they appear proximate to the capture location in the digital source document (or in the rendered versions of the document), or because they are semantically related to the content of the user's capture or to proximate content. In some embodiments of the system the content of advertisements appearing near the user's capture are considered to be related to that capture. Many other relationships are possible—for example associating one system user with another user because they have captured at the same location in a document, or at a nearby location.

Relationships and associations between a user's capture and other objects or information can be established by various means. In some embodiments of the described system regular expression algorithms are used to establish that a capture contains, or is proximate to, text directly or indirectly referring to particular types of objects. For example, references to products can be established by identifying occurrences of the terms "model number" or "product number" in close proximity to an alphanumeric sequence (typically, one containing digits and/or not recognized as a word). Similarly, any mention of a price (e.g., "$23.95", "£23.95", "¥2300") in or near a capture can be recognized via regular expression algorithms and can cause the described system to search (e.g., in a local database of items for sale, or on e-commerce sites on the internet) for the terms that appear adjacent to the price. If these terms are found, the item they refer to can be offered for sale to the user—i.e., purchasing the item can be one of the actions associated with the capture and presented to the user. When no matching items are found, some embodiments of the described system maintain an "open query" for the various terms in or near the captured content—that is, from to time the database search or internet search is repeated at later times to determine if the referenced item has been newly added.

In some embodiments of the described system explicit "markup" is used to establish that certain locations or ranges of text in a document are to be associated with specific products, services, or other objects or information. For example, in the described system a digital source document may have a companion XML-formatted markup document, where the XML markup specifies various ranges of text in the source document, and identifies specific objects or information to be associated with these ranges. In some cases the XML markup specifies actions to be taken by the system when a user captures in or near a range of text in the source document.

6.1.1. For the User

The user can be presented with a "Life Library", a record of everything s/he has read and captured. This may be simply for personal interest, but may be used, for example, in a library by an academic who is gathering material for the bibliography of his next paper.

In some circumstances, the user may wish to make the library public, such as by publishing it on the web in a similar manner to a weblog, so that others may see what s/he is reading and finds of interest. In other circumstances, the user may wish to restrict access to the library to a distinguished group or otherwise enable selective access to one or more library entries.

Lastly, in situations where the user captures some text and the system cannot immediately act upon the capture (for example, because an electronic version of the document is not yet available) the capture can be stored in the library and can be processed later, either automatically or in response to a user request. A user can also subscribe to new markup services and apply them to previously captured scans.

6.1.2. For the System

A record of a user's past captures is also useful for the system. Many aspects of the system operation can be enhanced by knowing the user's reading habits and history. The simplest example is that any scan made by a user is more likely to come from a document that the user has scanned in the recent past, and in particular if the previous scan was within the last few minutes it is very likely to be from the same document. Similarly, it is more likely that a document is being read in start-to-finish order. Thus, for English documents, it is also more likely that later scans will occur farther down in the document. Such factors can help the system establish the location of the capture in cases of ambiguity, and can also reduce the amount of text that needs to be captured.

6.2. Scanner as Payment, Identity and Authentication Device

Because the capture process generally begins with a device of some sort, typically an optical scanner or voice recorder, this device may be used as a key that identifies the user and authorizes certain actions. In some embodiments, a user's identify may be stored on or associated with a Subscriber Identity Module (SIM or SIM card) or other removable smart card.

6.2. Associate Scanner with Phone or Other Account

The device may be embedded in a mobile phone or in some other way associated with a mobile phone account. For example, a scanner may be associated with a mobile phone account by inserting a SIM card associated with the account into the scanner. Similarly, the device may be embedded in a credit card or other payment card, or have the facility for such a card to be connected to it. The device may therefore be used as a payment token, and financial transactions may be initiated by the capture from the rendered document.

6.2.2. Using Scanner Input for Authentication

The scanner may also be associated with a particular user or account through the process of scanning some token, symbol or text associated with that user or account. In addition, scanner may be used for biometric identification, for example by scanning the fingerprint of the user. In the case of an audio-based capture device, the system may identify the user by matching the voice pattern of the user or by requiring the user to speak a certain password or phrase.

For example, where a user scans a quote from a book and is offered the option to buy the book from an online retailer, the user can select this option, and is then prompted to scan his/her fingerprint to confirm the transaction.

See also Sections 15.5 and 15.6.

6.2.3. Secure Scanning Device

When the capture device is used to identify and authenticate the user, and to initiate transactions on behalf of the user, it is important that communications between the device and other parts of the system are secure. It is also important to guard against such situations as another device impersonating a scanner, and so-called "man in the middle" attacks where communications between the device and other components are intercepted.

Techniques for providing such security are well understood in the art; in various embodiments, the hardware and software in the device and elsewhere in the system are configured to implement such techniques.

7. Publishing Models and Elements

An advantage of the described system is that there is no need to alter the traditional processes of creating, printing or publishing documents in order to gain many of the system's benefits. There are reasons, though, that the creators or publishers of a document—hereafter simply referred to as the "publishers"—may wish to create functionality to support the described system.

This section is primarily concerned with the published documents themselves. For information about other related commercial transactions, such as advertising, see Section 10 entitled "P-Commerce".

7.1. Electronic Companions to Printed Documents

The system allows for printed documents to have an associated electronic presence. Conventionally publishers often ship a CD-ROM with a book that contains further digital information, tutorial movies and other multimedia data, sample code or documents, or further reference materials. In addition, some publishers maintain web sites associated with particular publications which provide such materials, as well as information which may be updated after the time of publishing, such as errata, further comments, updated reference materials, bibliographies and further sources of relevant data, and translations into other languages. Online forums allow readers to contribute their comments about the publication.

The described system allows such materials to be much more closely tied to the rendered document than ever before, and allows the discovery of and interaction with them to be much easier for the user. By capturing a portion of text from the document, the system can automatically connect the user to digital materials associated with the document, and more particularly associated with that specific part of the document. Similarly, the user can be connected to online communities that discuss that section of the text, or to annotations and commentaries by other readers. In the past, such information would typically need to be found by searching for a particular page number or chapter.

An example application of this is in the area of academic textbooks (Section 17.5).

7.2. "Subscriptions" to Printed Documents

Some publishers may have mailing lists to which readers can subscribe if they wish to be notified of new relevant matter or when a new edition of the book is published. With the described system, the user can register an interest in particular documents or parts of documents more easily, in some cases even before the publisher has considered providing any such functionality. The reader's interest can be fed to the publisher, possibly affecting their decision about when and where to provide updates, further information, new editions or even completely new publications on topics that have proved to be of interest in existing books.

7.3. Printed Marks with Special Meaning or Containing Special Data

Many aspects of the system are enabled simply through the use of the text already existing in a document. If the document is produced in the knowledge that it may be used in conjunction with the system, however, extra functionality can be added by printing extra information in the form of special marks, which may be used to identify the text or a required action more closely, or otherwise enhance the document's interaction with the system. The simplest and most important example is an indication to the reader that the document is definitely accessible through the system. A special icon might be used, for example, to indicate that this document has an online discussion forum associated with it.

Such symbols may be intended purely for the reader, or they may be recognized by the system when scanned and used to initiate some action. Sufficient data may be encoded in the symbol to identify more than just the symbol: it may also store information, for example about the document, edition, and location of the symbol, which could be recognized and read by the system.

7.4. Authorization Through Possession of the Paper Document

There are some situations where possession of or access to the printed document would entitle the user to certain privileges, for example, the access to an electronic copy of the document or to additional materials. With the described system, such privileges could be granted simply as a result of the user capturing portions of text from the document, or scanning specially printed symbols. In cases where the system needed to ensure that the user was in possession of the entire document, it might prompt the user to scan particular items or phrases from particular pages, e.g. "the second line of page 46".

7.5. Documents which Expire

If the printed document is a gateway to extra materials and functionality, access to such features can also be time-limited. After the expiry date, a user may be required to pay a fee or obtain a newer version of the document to access the features again. The paper document will, of course, still be usable, but will lose some of its enhanced electronic functionality. This may be desirable, for example, because there is profit for the publisher in receiving fees for access to electronic materials, or in requiring the user to purchase new editions from time to time, or because there are disadvantages associated with outdated versions of the printed document remaining in circulation. Coupons are an example of a type of commercial document that can have an expiration date.

7.6. Popularity Analysis and Publishing Decisions

Section 10.5 discusses the use of the system's statistics to influence compensation of authors and pricing of advertisements.

In some embodiments, the system deduces the popularity of a publication from the activity in the electronic community associated with it as well as from the use of the paper document. These factors may help publishers to make decisions about what they will publish in future. If a chapter in an existing book, for example, turns out to be exceedingly popular, it may be worth expanding into a separate publication.

8. Document Access Services

An important aspect of the described system is the ability to provide to a user who has access to a rendered copy of a document access to an electronic version of that document. In some cases, a document is freely available on a public network or a private network to which the user has access. The system uses the captured text to identify, locate and retrieve the document, in some cases displaying it on the user's screen or depositing it in their email inbox.

In some cases, a document will be available in electronic form, but for a variety of reasons may not be accessible to the user. There may not be sufficient connectivity to retrieve the document, the user may not be entitled to retrieve it, there may be a cost associated with gaining access to it, or the document may have been withdrawn and possibly replaced by a new version, to name just a few possibilities. The system typically provides feedback to the user about these situations.

As mentioned in Section 7.4, the degree or nature of the access granted to a particular user may be different if it is known that the user already has access to a printed copy of the document.

8.1. Authenticated Document Access

Access to the document may be restricted to specific users, or to those meeting particular criteria, or may only be available in certain circumstances, for example when the user is connected to a secure network. Section 6 describes some of the ways in which the credentials of a user and scanner may be established.

8.2. Document Purchase—Copyright-Owner Compensation

Documents that are not freely available to the general public may still be accessible on payment of a fee, often as compensation to the publisher or copyright-holder. The system may implement payment facilities directly or may make use of other payment methods associated with the user, including those described in Section 6.2.

8.3. Document Escrow and Proactive Retrieval

Electronic documents are often transient; the digital source version of a rendered document may be available now but inaccessible in future. The system may retrieve and store the existing version on behalf of the user, even if the user has not requested it, thus guaranteeing its availability should the user request it in future. This also makes it available for the system's use, for example for searching as part of the process of identifying future captures.

In the event that payment is required for access to the document, a trusted "document escrow" service can retrieve the document on behalf of the user, such as upon payment of a modest fee, with the assurance that the copyright holder will be fully compensated in future if the user should ever request the document from the service.

Variations on this theme can be implemented if the document is not available in electronic form at the time of capture. The user can authorize the service to submit a request for or make a payment for the document on his/her behalf if the electronic document should become available at a later date.

8.4. Association with Other Subscriptions and Accounts

Sometimes payment may be waived, reduced or satisfied based on the user's existing association with another account or subscription. Subscribers to the printed version of a newspaper might automatically be entitled to retrieve the electronic version, for example.

In other cases, the association may not be quite so direct: a user may be granted access based on an account established by their employer, or based on their scanning of a printed copy owned by a friend who is a subscriber.

8.5. Replacing Photocopying with Scan-and-Print

The process of capturing text from a paper document, identifying an electronic original, and printing that original, or some portion of that original associated with the capture, forms an alternative to traditional photocopying with many advantages:

the paper document need not be in the same location as the final printout, and in any case need not be there at the same time the wear and damage caused to documents by the photocopying process, especially to old, fragile and valuable documents, can be avoided the quality of the copy is typically be much higher records may be kept about which documents or portions of documents are the most frequently copied payment may be made to the copyright owner as part of the process unauthorized copying may be prohibited

8.6. Locating Valuable Originals from Photocopies

When documents are particularly valuable, as in the case of legal instruments or documents that have historical or other particular significance, people may typically work from copies of those documents, often for many years, while the originals are kept in a safe location.

The described system could be coupled to a database which records the location of an original document, for example in an archiving warehouse, making it easy for somebody with access to a copy to locate the archived original paper document.

9. Text Recognition Technologies

Optical Character Recognition (OCR) technologies have traditionally focused on images that include a large amount of text, for example from a flat-bed scanner capturing a whole page. OCR technologies often need substantial training and correcting by the user to produce useful text. OCR technologies often require substantial processing power on the machine doing the OCR, and, while many systems use a dictionary, they are generally expected to operate on an effectively infinite vocabulary.

All of the above traditional characteristics may be improved upon in the described system.

While this section focuses on OCR, many of the issues discussed map directly onto other recognition technologies, in particular speech recognition. As mentioned in Section 3.1, the process of capturing from paper may be achieved by a user reading the text aloud into a device which captures audio. Those skilled in the art will appreciate that principles discussed here with respect to images, fonts, and text fragments often also apply to audio samples, user speech models and phonemes.

9.1. Optimization for Appropriate Devices

A scanning device for use with the described system will often be small, portable, and low power. The scanning device may capture only a few words at a time, and in some implementations does not even capture a whole character at once, but rather a horizontal slice through the text, many such slices being stitched together to form a recognizable signal from which the text may be deduced. The scanning device may also have very limited processing power or storage so, while in some embodiments it may perform all of the OCR process itself, many embodiments will depend on a connection to a more powerful device, possibly at a later time, to convert the captured signals into text. Lastly, it may have very limited facilities for user interaction, so may need to defer any requests for user input until later, or operate in a "best-guess" mode to a greater degree than is common now.

9.2. "Uncertain" OCR

The primary new characteristic of OCR within the described system is the fact that it will, in general, examine images of text which exists elsewhere and which may be retrieved in digital form. An exact transcription of the text is therefore not always required from the OCR engine. The OCR system may output a set or a matrix of possible matches, in some cases including probability weightings, which can still be used to search for the digital original.

9.3. Iterative OCR—Guess, Disambiguate, Guess . . .

If the device performing the recognition is able to contact the document index at the time of processing, then the OCR process can be informed by the contents of the document corpus as it progresses, potentially offering substantially greater recognition accuracy.

Such a connection will also allow the device to inform the user when sufficient text has been captured to identify the digital source.

9.4. Using Knowledge of Likely Rendering

When the system has knowledge of aspects of the likely printed rendering of a document—such as the font typeface used in printing, or the layout of the page, or which sections are in italics—this too can help in the recognition process. (Section 4.1.1)

9.5. Font Caching—Determine Font on Host, Download to Client

As candidate source texts in the document corpus are identified, the font, or a rendering of it, may be downloaded to the device to help with the recognition.

9.6. Autocorrelation and Character Offsets

While component characters of a text fragment may be the most recognized way to represent a fragment of text that may be used as a document signature, other representations of the text may work sufficiently well that the actual text of a text fragment need not be used when attempting to locate the text fragment in a digital document and/or database, or when disambiguating the representation of a text fragment into a readable form. Other representations of text fragments may provide benefits that actual text representations lack. For example, optical character recognition of text fragments is often prone to errors, unlike other representations of captured text fragments that may be used to search for and/or recreate a text fragment without resorting to optical character recognition for the entire fragment. Such methods may be more appropriate for some devices used with the current system.

Those of ordinary skill in the art and others will appreciate that there are many ways of describing the appearance of text fragments. Such characterizations of text fragments may include, but are not limited to, word lengths, relative word lengths, character heights, character widths, character shapes, character frequencies, token frequencies, and the like. In some embodiments, the offsets between matching text tokens (i.e., the number of intervening tokens plus one) are used to characterize fragments of text.

Conventional OCR uses knowledge about fonts, letter structure and shape to attempt to determine characters in scanned text. Embodiments of the present invention are different; they employ a variety of methods that use the rendered text itself to assist in the recognition process. These embodiments use characters (or tokens) to "recognize each other." One way to refer to such self-recognition is "template matching," and is similar to "convolution." To perform such self-recognition, the system slides a copy of the text horizontally over itself and notes matching regions of the text images. Prior template matching and convolution techniques encompass a variety of related techniques. These techniques to tokenize and/or recognize characters/tokens will be collectively referred to herein as "autocorrelation," as the text is used to correlate with its own component parts when matching characters/tokens.

When autocorrelating, complete connected regions that match are of interest. This occurs when characters (or groups of characters) overlay other instances of the same character (or group). Complete connected regions that match automatically provide tokenizing of the text into component tokens. As the two copies of the text are slid past each other, the regions where perfect matching occurs (i.e., all pixels in a vertical slice are matched) are noted. When a character/token matches itself, the horizontal extent of this matching (e.g., the connected matching portion of the text) also matches.

Note that at this stage there is no need to determine the actual identity of each token (i.e., the particular letter, digit or symbol, or group of these, that corresponds to the token image), only the offset to the next occurrence of the same token in the scanned text. The offset number is the distance (number of tokens) to the next occurrence of the same token. If the token is unique within the text string, the offset is zero (0). The sequence of token offsets thus generated is a signature that can be used to identify the scanned text.

In some embodiments, the token offsets determined for a string of scanned tokens are compared to an index that indexes a corpus of electronic documents based upon the token offsets of their contents (Section 4.1.2). In other embodiments, the token offsets determined for a string of scanned tokens are converted to text, and compared to a more conventional index that indexes a corpus of electronic documents based upon their contents As has been noted earlier, a similar token-correlation process may be applied to speech fragments when the capture process consists of audio samples of spoken words.

9.7. Font/Character "Self-Recognition"

Conventional template-matching OCR compares scanned images to a library of character images. In essence, the alphabet is stored for each font and newly scanned images are compared to the stored images to find matching characters. The process generally has an initial delay until the correct font has been identified. After that, the OCR process is relatively quick because most documents use the same font throughout. Subsequent images can therefore be converted to text by comparison with the most recently identified font library.

The shapes of characters in most commonly used fonts are related. For example, in most fonts, the letter "c" and the letter "e" are visually related—as are "t" and "f", etc. The OCR process is enhanced by use of this relationship to construct templates for letters that have not been scanned yet. For example, where a reader scans a short string of text from a paper document in a previously unencountered font such that the system does not have a set of image templates with which to compare the scanned images, the system can leverage the probable relationship between certain characters to construct the font template library even though it has not yet encountered all of the letters in the alphabet. The system can then use the constructed font template library to recognize subsequent scanned text and to further refine the constructed font library.

9.8. Send Anything Unrecognized (Including Graphics) to Server

When images cannot be machine-transcribed into a form suitable for use in a search process, the images themselves can be saved for later use by the user, for possible manual transcription, or for processing at a later date when different resources may be available to the system.

10. P-Commerce

Many of the actions made possible by the system result in some commercial transaction taking place. The phrase p-commerce is used herein to describe commercial activities initiated from paper via the system.

10.1. Sales of Documents from their Physical Printed Copies.

When a user captures text from a document, the user may be offered that document for purchase either in paper or electronic form. The user may also be offered related documents, such as those quoted or otherwise referred to in the paper document, or those on a similar subject, or those by the same author.

10.2. Sales of Anything Else Initiated or Aided by Paper

The capture of text may be linked to other commercial activities in a variety of ways. The captured text may be in a catalog that is explicitly designed to sell items, in which case the text will be associated fairly directly with the purchase of an item (Section 18.2). The text may also be part of an advertisement, in which case a sale of the item being advertised may ensue.

In other cases, the user captures other text from which their potential interest in a commercial transaction may be deduced. A reader of a novel set in a particular country, for example, might be interested in a holiday there. Someone reading a review of a new car might be considering purchasing it. The user may capture a particular fragment of text knowing that some commercial opportunity will be presented to them as a result, or it may be a side-effect of their capture activities.

10.3. Capture of Labels, Icons, Serial Numbers, Barcodes on an Item Resulting in a Sale Sometimes text or symbols are actually printed on an item or its packaging. An example is the serial number or product id often found on a label on the back or underside of a piece of electronic equipment. The system can offer the user a convenient way to purchase one or more of the same items by capturing that text. They may also be offered manuals, support or repair services.

10.4. Contextual Advertisements

In addition to the direct capture of text from an advertisement, the system allows for a new kind of advertising which is not necessarily explicitly in the rendered document, but is nonetheless based on what people are reading.

10.4.1. Advertising Based on Scan Context and History

In a traditional paper publication, advertisements generally consume a large amount of space relative to the text of a newspaper article, and a limited number of them can be placed around a particular article. In the described system, advertising can be associated with individual words or phrases, and can selected according to the particular interest the user has shown by capturing that text and possibly taking into account their history of past scans.

With the described system, it is possible for a purchase to be tied to a particular printed document and for an advertiser to get significantly more feedback about the effectiveness of their advertising in particular print publications.

10.4.2. Advertising Based on User Context and History

The system may gather a large amount of information about other aspects of a user's context for its own use (Section 13); estimates of the geographical location of the user are a good example. Such data can also be used to tailor the advertising presented to a user of the system.

10.5. Models of Compensation

The system enables some new models of compensation for advertisers and marketers. The publisher of a printed document containing advertisements may receive some income from a purchase that originated from their document. This may be true whether or not the advertisement existed in the original printed form; it may have been added electronically either by the publisher, the advertiser or some third party, and the sources of such advertising may have been subscribed to by the user.

10.5.1. Popularity-Based Compensation

Analysis of the statistics generated by the system can reveal the popularity of certain parts of a publication (Section 14.2). In a newspaper, for example, it might reveal the amount of time readers spend looking at a particular page or article, or the popularity of a particular columnist. In some circumstances, it may be appropriate for an author or publisher to receive compensation based on the activities of the readers rather than on more traditional metrics such as words written or number of copies distributed. An author whose work becomes a frequently read authority on a subject might be considered differently in future contracts from one whose books have sold the same number of copies but are rarely opened. (See also Section 7.6)

10.5.2. Popularity-Based Advertising

Decisions about advertising in a document may also be based on statistics about the readership. The advertising space around the most popular columnists may be sold at a premium rate. Advertisers might even be charged or compensated some time after the document is published based on knowledge about how it was received.

10.6. Marketing Based on Life Library

The "Life Library" or scan history described in Sections 6.1 and 16.1 can be an extremely valuable source of information about the interests and habits of a user. Subject to the appropriate consent and privacy issues, such data can inform offers of goods or services to the user. Even in an anonymous form, the statistics gathered can be exceedingly useful.

10.7. Sale/Information at Later Date (when Available)

Advertising and other opportunities for commercial transactions may not be presented to the user immediately at the time of text capture. For example, the opportunity to purchase a sequel to a novel may not be available at the time the user is reading the novel, but the system may present them with that opportunity when the sequel is published.

A user may capture data that relates to a purchase or other commercial transaction, but may choose not to initiate and/or complete the transaction at the time the capture is made. In some embodiments, data related to captures is stored in a user's Life Library, and these Life Library entries can remain "active" (i.e., capable of subsequent interactions similar to those available at the time the capture was made). Thus a user may review a capture at some later time, and optionally complete a transaction based on that capture. Because the system can keep track of when and where the original capture occurred, all parties involved in the transaction can be properly compensated. For example, the author who wrote the story—and the publisher who published the story—that appeared next to the advertisement from which the user captured data can be compensated when, six months later, the user visits their Life Library, selects that particular capture from the history, and chooses "Purchase this item at Amazon" from the pop-up menu (which can be similar or identical to the menu optionally presented at the time of the capture).

11. Operating System and Application Integration

Modern Operating Systems (OSs) and other software packages have many characteristics that can be advantageously exploited for use with the described system, and may also be modified in various ways to provide an even better platform for its use.

11.1. Incorporation of Scan and Print-Related Information in Metadata and Indexing New and upcoming file systems and their associated databases often have the ability to store a variety of metadata associated with each file. Traditionally, this metadata has included such things as the ID of the user who created the file, the dates of creation, last modification, and last use. Newer file systems allow such extra information as keywords, image characteristics, document sources and user comments to be stored, and in some systems this metadata can be arbitrarily extended. File systems can therefore be used to store information that would be useful in implementing the current system. For example, the date when a given document was last printed can be stored by the file system, as can details about which text from it has been captured from paper using the described system, and when and by whom.

Operating systems are also starting to incorporate search engine facilities that allow users to find local files more easily. These facilities can be advantageously used by the system. It means that many of the search-related concepts discussed in Sections 3 and 4 apply not just to today's Internet-based and similar search engines, but also to every personal computer.

In some cases specific software applications will also include support for the system above and beyond the facilities provided by the OS.

11.2. OS Support for Capture Devices

As the use of capture devices such as pen scanners becomes increasingly common, it will become desirable to build support for them into the operating system, in much the same way as support is provided for mice and printers, since the applicability of capture devices extends beyond a single software application. The same will be true for other aspects of the system's operation. Some examples are discussed below. In some embodiments, the entire described system, or the core of it, is provided by the OS. In some embodiments, support for the system is provided by Application Programming Interfaces (APIs) that can be used by other software packages, including those directly implementing aspects of the system.

11.2.1. Support for OCR and Other Recognition Technologies

Most of the methods of capturing text from a rendered document require some recognition software to interpret the source data, typically a scanned image or some spoken words, as text suitable for use in the system. Some OSs include support for speech or handwriting recognition, though it is less common for OSs to include support for OCR, since in the past the use of OCR has typically been limited to a small range of applications.

As recognition components become part of the OS, they can take better advantage of other facilities provided by the OS. Many systems include spelling dictionaries, grammar analysis tools, internationalization and localization facilities, for example, all of which can be advantageously employed by the described system for its recognition process, especially since they may have been customized for the particular user to include words and phrases that he/she would commonly encounter.

If the operating system includes full-text indexing facilities, then these can also be used to inform the recognition process, as described in Section 9.3.

11.2.2. Action to be Taken on Scans

If an optical scan or other capture occurs and is presented to the OS, it may have a default action to be taken under those circumstances in the event that no other subsystem claims ownership of the capture. An example of a default action is presenting the user with a choice of alternatives, or submitting the captured text to the OS's built-in search facilities.

11.2.3. OS has Default Action for Particular Documents or Document Types

If the digital source of the rendered document is found, the OS may have a standard action that it will take when that particular document, or a document of that class, is scanned. Applications and other subsystems may register with the OS as potential handlers of particular types of capture, in a similar manner to the announcement by applications of their ability to handle certain file types.

Markup data associated with a rendered document, or with a capture from a document, can include instructions to the operating system to launch specific applications, pass applications arguments, parameters, or data, etc.

11.2.4. Interpretation of Gestures and Mapping into Standard Actions

In Section 12.1.3 the use of "gestures" is discussed, particularly in the case of optical scanning, where particular movements made with a handheld scanner might represent standard actions such as marking the start and end of a region of text.

This is analogous to actions such as pressing the shift key on a keyboard while using the cursor keys to select a region of text, or using the wheel on a mouse to scroll a document. Such actions by the user are sufficiently standard that they are interpreted in a system-wide way by the OS, thus ensuring consistent behavior. The same is desirable for scanner gestures and other scanner-related actions.

11.2.5. Set Response to Standard (and Non-Standard) Iconic/Text Printed Menu Items In a similar way, certain items of text or other symbols may, when scanned, cause standard actions to occur, and the OS may provide a selection of these. An example might be that scanning the text "[print]" in any document would cause the OS to retrieve and print a copy of that document. The OS may also provide a way to register such actions and associate them with particular scans.

11.3. Support in System GUI Components for Typical Scan-Initiated Activities Most software applications are based substantially on standard Graphical User Interface components provided by the OS.

Use of these components by developers helps to ensure consistent behavior across multiple packages, for example that pressing the left-cursor key in any text-editing context should move the cursor to the left, without every programmer having to implement the same functionality independently.

A similar consistency in these components is desirable when the activities are initiated by text-capture or other aspects of the described system. Some examples are given below.

11.3.1. Interface to Find Particular Text Content

A typical use of the system may be for the user to scan an area of a paper document, and for the system to open the electronic counterpart in a software package that is able to display or edit it, and cause that package to scroll to and highlight the scanned text (Section 12.2.1). The first part of this process, finding and opening the electronic document, is typically provided by the OS and is standard across software packages. The second part, however—locating a particular piece of text within a document and causing the package to scroll to it and highlight it—is not yet standardized and is often implemented differently by each package. The availability of a standard API for this functionality could greatly enhance the operation of this aspect of the system.

11.3.2. Text Interactions

Once a piece of text has been located within a document, the system may wish to perform a variety of operations upon that text. As an example, the system may request the surrounding text, so that the user's capture of a few words could result in the system accessing the entire sentence or paragraph containing them. Again, this functionality can be usefully provided by the OS rather than being implemented in every piece of software that handles text.

11.3.3. Contextual (Popup) Menus

Some of the operations that are enabled by the system will require user feedback, and this may be optimally requested within the context of the application handling the data. In some embodiments, the system uses the application pop-up menus traditionally associated with clicking the right mouse button on some text. The system inserts extra options into such menus, and causes them to be displayed as a result of activities such as scanning a paper document.

11.4. Web/Network Interfaces

In today's increasingly networked world, much of the functionality available on individual machines can also be accessed over a network, and the functionality associated with the described system is no exception. As an example, in an office environment, many paper documents received by a user may have been printed by other users' machines on the same corporate network. The system on one computer, in response to a capture, may be able to query those other machines for documents which may correspond to that capture, subject to the appropriate permission controls.

11.5. Printing of Document Causes Saving

An important factor in the integration of paper and digital documents is maintaining as much information as possible about the transitions between the two. In some embodiments, the OS keeps a simple record of when any document was printed and by whom. In some embodiments, the OS takes one or more further actions that would make it better suited for use with the system. Examples include:

- Saving the digital rendered version of every document printed along with information about the source from which it was printed
- Saving a subset of useful information about the printed version—for example, the fonts used and where the line breaks occur—which might aid future scan interpretation
- Saving the version of the source document associated with any printed copy
- Indexing the document automatically at the time of printing and storing the results for future searching

11.6. My (Printed/Scanned) Documents

An OS often maintains certain categories of folders or files that have particular significance. A user's documents may, by convention or design, be found in a "My Documents" folder, for example. Standard file-opening dialogs may automatically include a list of recently opened documents.

On an OS optimized for use with the described system, such categories may be enhanced or augmented in ways that take into account a user's interaction with paper versions of the stored files. Categories such as "My Printed Documents" or "My Recently-Read Documents" might usefully be identified and incorporated in its operations.

11.7. OS-Level Markup Hierarchies

Since important aspects of the system are typically provided using the "markup" concepts discussed in Section 5, it would clearly be advantageous to have support for such markup provided by the OS in a way that was accessible to multiple applications as well as to the OS itself. In addition, layers of markup may be provided by the OS, based on its own knowledge of documents under its control and the facilities it is able to provide.

11.8. Use of OS DRM Facilities

An increasing number of operating systems support some form of "Digital Rights Management": the ability to control the use of particular data according to the rights granted to a particular user, software entity or machine. It may inhibit unauthorized copying or distribution of a particular document, for example.

12. User Interface

The user interface of the system may be entirely on a PC, if the capture device is relatively dumb and is connected to it by a cable, or entirely on the device, if it is sophisticated and with significant processing power of its own. In some cases, some functionality resides in each component. Part, or indeed all, of the system's functionality may also be implemented on other devices such as mobile phones or PDAs.

The descriptions in the following sections are therefore indications of what may be desirable in certain implementations, but they are not necessarily appropriate for all and may be modified in several ways.

12.1. On the Capture Device

With all capture devices, but particularly in the case of an optical scanner, the user's attention will generally be on the device and the paper at the time of scanning. It is very desirable, then, that any input and feedback needed as part of the process of scanning do not require the user's attention to be elsewhere, for example on the screen of a computer, more than is necessary.

12.1.1. Feedback on Scanner

A handheld scanner may have a variety of ways of providing feedback to the user about particular conditions. Some types are direct visual, where the scanner incorporates indicator lights or even a full display, and auditory, where the scanner can make beeps, clicks or other sounds. Important alternatives include tactile feedback, where the scanner can vibrate, buzz, or otherwise stimulate the user's sense of touch, and projected feedback, where it indicates a status by projecting onto the paper anything from a colored spot of light to a sophisticated display.

Important immediate feedback that may be provided on the device includes:

- feedback on the scanning process—user scanning too fast, at too great an angle, or drifting too high or low on a particular line
- sufficient content—enough has been scanned to be pretty certain of finding a match if one exists—important for disconnected operation
- context known—a source of the text has been located
- unique context known—one unique source of the text has been located
- availability of content—indication of whether the content is freely available to the user, or at a cost Many of the user interactions normally associated with the later stages of the system may also take place on the capture device if it has sufficient abilities, for example, to display part or all of a document.

12.1.2. Controls on Scanner

The device may provide a variety of ways for the user to provide input in addition to basic text capture. Even when the device is in close association with a host machine that has input options such as keyboards and mice, it can be disruptive for the user to switch back and forth between manipulating the scanner and using a mouse, for example.

The handheld scanner may have buttons, scroll/jog-wheels, touch-sensitive surfaces, and/or accelerometers for detecting the movement of the device. Some of these allow a richer set of interactions while still holding the scanner.

For example, in response to scanning some text, the system presents the user with a set of several possible matching documents. The user uses a scroll-wheel on the side of the scanner is to select one from the list, and clicks a button to confirm the selection.

12.1.3. Gestures

The primary reason for moving a scanner across the paper is to capture text, but some movements may be detected by the device and used to indicate other user intentions. Such movements are referred to herein as "gestures".

As an example, the user can indicate a large region of text by scanning the first few words in conventional left-to-right order, and the last few in reverse order, i.e. right to left. The user can also indicate the vertical extent of the text of interest by moving the scanner down the page over several lines. A backwards scan might indicate cancellation of the previous scan operation.

12.1.4. Online/Offline Behavior

Many aspects of the system may depend on network connectivity, either between components of the system such as a scanner and a host laptop, or with the outside world in the form of a connection to corporate databases and Internet search. This connectivity may not be present all the time, however, and so there will be occasions when part or all of the system may be considered to be "offline". It is desirable to allow the system to continue to function usefully in those circumstances.

The device may be used to capture text when it is out of contact with other parts of the system. A very simple device may simply be able to store the image or audio data associated with the capture, ideally with a timestamp indicating when it was captured. The various captures may be uploaded to the rest of the system when the device is next in contact with it, and handled then. The device may also upload other data associated with the captures, for example voice annotations associated with optical scans, or location information.

More sophisticated devices may be able to perform some or all of the system operations themselves despite being disconnected. Various techniques for improving their ability to do so are discussed in Section 15.3. Often it will be the case that some, but not all, of the desired actions can be performed while offline. For example, the text may be recognized, but identification of the source may depend on a connection to an Internet-based search engine. In some embodiments, the device therefore stores sufficient information about how far each operation has progressed for the rest of the system to proceed efficiently when connectivity is restored.

The operation of the system will, in general, benefit from immediately available connectivity, but there are some situations in which performing several captures and then processing them as a batch can have advantages. For example, as discussed in Section 13 below, the identification of the source of a particular capture may be greatly enhanced by examining other captures made by the user at approximately the same time. In a fully connected system where live feedback is being provided to the user, the system is only able to use past captures when processing the current one. If the capture is one of a batch stored by the device when offline, however, the system will be able to take into account any data available from later captures as well as earlier ones when doing its analysis.

12.2. On a Host Device

A scanner will often communicate with some other device, such as a PC, PDA, phone or digital camera to perform many of the functions of the system, including more detailed interactions with the user.

12.2.1. Activities Performed in Response to a Capture

When the host device receives a capture, it may initiate a variety of activities. An incomplete list of possible activities performed by the system after locating and electronic counterpart document associated with the capture and a location within that document follows.

- The details of the capture may be stored in the user's history. (Section 6.1)
- The document may be retrieved from local storage or a remote location. (Section 8)
- The operating system's metadata and other records associated with the document may be updated. (Section 11.1)

Markup associated with the document may be examined to determine the next relevant operations. (Section 5)

A software application may be started to edit, view or otherwise operate on the document. The choice of application may depend on the source document, or on the contents of the scan, or on some other aspect of the capture. (Section 11.2.2, 11.2.3)

The application may scroll to, highlight, move the insertion point to, or otherwise indicate the location of the capture. (Section 11.3)

The precise bounds of the captured text may be modified, for example to select whole words, sentences or paragraphs around the captured text. (Section 11.3.2)

The user may be given the option to copy the capture text to the clipboard or perform other standard operating system or application-specific operations upon it.

Annotations may be associated with the document or the captured text. These may come from immediate user input, or may have been captured earlier, for example in the case of voice annotations associated with an optical scan. (Section 19.4)

Markup may be examined to determine a set of further possible operations for the user to select.

12.2.2. Contextual Popup Menus

Sometimes the appropriate action to be taken by the system will be easily deduced, but sometimes it will require a choice to be made by the user. One good way to do this is through the use of "popup menus" or, in cases where the content is also being displayed on a screen, with so-called "contextual menus" that appear close to the content. (See Section 11.3.3). In some embodiments, the scanner device projects a popup menu onto the paper document. A user may select from such menus using traditional methods such as a keyboard and mouse, or by using controls on the capture device (Section 12.1.2), gestures (Section 12.1.3), or by interacting with the computer display using the scanner (Section 12.2.4). In some embodiments, the popup menus which can appear as a result of a capture include default items representing actions which occur if the user does not respond—for example, if the user ignores the menu and makes another capture.

12.2.3. Feedback on Disambiguation

When a user starts capturing text, there will initially be several documents or other text locations that it could match. As more text is captured, and other factors are taken into account (Section 13), the number of candidate locations will decrease until the actual location is identified, or further disambiguation is not possible without user input. In some embodiments, the system provides a real-time display of the documents or the locations found, for example in list, thumbnail-image or text-segment form, and for the number of elements in that display to reduce in number as capture continues. In some embodiments, the system displays thumbnails of all candidate documents, where the size or position of the thumbnail is dependent on the probability of it being the correct match.

When a capture is unambiguously identified, this fact may be emphasized to the user, for example using audio feedback.

Sometimes the text captured will occur in many documents and will be recognized to be a quotation. The system may indicate this on the screen, for example by grouping documents containing a quoted reference around the original source document.

12.2.4. Scanning from Screen

Some optical scanners may be able to capture text displayed on a screen as well as on paper. Accordingly, the term rendered document is used herein to indicate that printing onto paper is not the only form of rendering, and that the capture of text or symbols for use by the system may be equally valuable when that text is displayed on an electronic display.

The user of the described system may be required to interact with a computer screen for a variety of other reasons, such as to select from a list of options. It can be inconvenient for the user to put down the scanner and start using the mouse or keyboard. Other sections have described physical controls on the scanner (Section 12.1.2) or gestures (Section 12.1.3) as methods of input which do not require this change of tool, but using the scanner on the screen itself to scan some text or symbol is an important alternative provided by the system.

In some embodiments, the optics of the scanner allow it to be used in a similar manner to a light-pen, directly sensing its position on the screen without the need for actual scanning of text, possibly with the aid of special hardware or software on the computer.

13. Context Interpretation

An important aspect of the described system is the use of other factors, beyond the simple capture of a string of text, to help identify the document in use. A capture of a modest amount of text may often identify the document uniquely, but in many situations it will identify a few candidate documents. One solution is to prompt the user to confirm the document being scanned, but a preferable alternative is to make use of other factors to narrow down the possibilities automatically. Such supplemental information can dramatically reduce the amount of text that needs to be captured and/or increase the reliability and speed with which the location in the electronic counterpart can be identified. This extra material is referred to as "context", and it was discussed briefly in Section 4.2.2. We now consider it in more depth.

13.1. System and Capture Context

Perhaps the most important example of such information is the user's capture history.

It is highly probable that any given capture comes from the same document as the previous one, or from an associated document, especially if the previous capture took place in the last few minutes (Section 6.1.2). Conversely, if the system detects that the font has changed between two scans, it is more likely that they are from different documents.

Also useful are the user's longer-term capture history and reading habits. These can also be used to develop a model of the user's interests and associations.

13.2. User's Real-World Context

Another example of useful context is the user's geographical location. A user in Paris is much more likely to be reading Le Monde than the Seattle Times, for example. The timing, size and geographical distribution of printed versions of the documents can therefore be important, and can to some degree be deduced from the operation of the system.

The time of day may also be relevant, for example in the case of a user who always reads one type of publication on the way to work, and a different one at lunchtime or on the train going home.

13.3. Related Digital Context

The user's recent use of electronic documents, including those searched for or retrieved by more conventional means, can also be a helpful indicator.

In some cases, such as on a corporate network, other factors may be usefully considered:

Which documents have been printed recently?
Which documents have been modified recently on the corporate file server?
Which documents have been emailed recently?

All of these examples might suggest that a user was more likely to be reading a paper version of those documents. In contrast, if the repository in which a document resides can affirm that the document has never been printed or sent anywhere where it might have been printed, then it can be safely eliminated in any searches originating from paper.

13.4. Other Statistics—the Global Context

Section 14 covers the analysis of the data stream resulting from paper-based searches, but it should be noted here that statistics about the popularity of documents with other readers, about the timing of that popularity, and about the parts of documents most frequently scanned are all examples of further factors which can be beneficial in the search process. The system brings the possibility of Google-type page-ranking to the world of paper.

See also Section 4.2.2 for some other implications of the use of context for search engines.

14. Data-Stream Analysis

The use of the system generates an exceedingly valuable data-stream as a side effect. This stream is a record of what users are reading and when, and is in many cases a record of what they find particularly valuable in the things they read. Such data has never really been available before for paper documents.

Some ways in which this data can be useful for the system, and for the user of the system, are described in Section 6.1. This section concentrates on its use for others. There are, of course, substantial privacy issues to be considered with any distribution of data about what people are reading, but such issues as preserving the anonymity of data are well known to those of skill in the art.

14.1. Document Tracking

When the system knows which documents any given user is reading, it can also deduce who is reading any given document. This allows the tracking of a document through an organization, to allow analysis, for example, of who is reading it and when, how widely it was distributed, how long that distribution took, and who has seen current versions while others are still working from out-of-date copies.

For published documents that have a wider distribution, the tracking of individual copies is more difficult, but the analysis of the distribution of readership is still possible.

14.2. Read Ranking—Popularity of Documents and Sub-Regions

In situations where users are capturing text or other data that is of particular interest to them, the system can deduce the popularity of certain documents and of particular sub-regions of those documents. This forms a valuable input to the system itself (Section 4.2.2) and an important source of information for authors, publishers and advertisers (Section 7.6, Section 10.5). This data is also useful when integrated in search engines and search indices—for example, to assist in ranking search results for queries coming from rendered documents, and/or to assist in ranking conventional queries typed into a web browser.

14.3. Analysis of Users—Building Profiles

Knowledge of what a user is reading enables the system to create a quite detailed model of the user's interests and activities. This can be useful on an abstract statistical basis—"35% of users who buy this newspaper also read the latest book by that author"—but it can also allow other interactions with the individual user, as discussed below.

14.3.1. Social Networking

One example is connecting one user with others who have related interests. These may be people already known to the user. The system may ask a university professor, "Did you know that your colleague at XYZ University has also just read this paper?" The system may ask a user, "Do you want to be linked up with other people in your neighborhood who are also how reading Jane Eyre?" Such links may be the basis for the automatic formation of book clubs and similar social structures, either in the physical world or online.

14.3.2. Marketing

Section 10.6 has already mentioned the idea of offering products and services to an individual user based on their interactions with the system. Current online booksellers, for example, often make recommendations to a user based on their previous interactions with the bookseller. Such recommendations become much more useful when they are based on interactions with the actual books.

14.4. Marketing Based on Other Aspects of the Data-Stream

We have discussed some of the ways in which the system may influence those publishing documents, those advertising through them, and other sales initiated from paper (Section 10). Some commercial activities may have no direct interaction with the paper documents at all and yet may be influenced by them. For example, the knowledge that people in one community spend more time reading the sports section of the newspaper than they do the financial section might be of interest to somebody setting up a health club.

14.5. Types of Data that May be Captured

In addition to the statistics discussed, such as who is reading which bits of which documents, and when and where, it can be of interest to examine the actual contents of the text captured, regardless of whether or not the document has been located.

In many situations, the user will also not just be capturing some text, but will be causing some action to occur as a result. It might be emailing a reference to the document to an acquaintance, for example. Even in the absence of information about the identity of the user or the recipient of the email, the knowledge that somebody considered the document worth emailing is very useful.

In addition to the various methods discussed for deducing the value of a particular document or piece of text, in some circumstances the user will explicitly indicate the value by assigning it a rating.

Lastly, when a particular set of users are known to form a group, for example when they are known to be employees of a particular company, the aggregated statistics of that group can be used to deduce the importance of a particular document to that group.

15. Device Features and Functions

A capture device for use with the system needs little more than a way of capturing text from a rendered version of the document. As described earlier (Section 1.2), this capture may be achieved through a variety of methods including taking a photograph of part of the document or typing some words into a mobile phone keypad. This capture may be achieved using a small hand-held optical scanner capable of recording a line or two of text at a time, or an audio capture device such as a voice-recorder into which the user is reading text from the document. The device used may be a combination of these—an optical scanner which could also record voice annotations, for example—and the capturing functionality may be built into some other device such as a mobile phone, PDA, digital camera or portable music player.

15.1. Input and Output

Many of the possibly beneficial additional input and output facilities for such a device have been described in Section 12.1. They include buttons, scroll-wheels and touch-pads for input, and displays, indicator lights, audio and tactile transducers for output. Sometimes the device will incorporate many of these, sometimes very few. Sometimes the capture device will be able to communicate with another device that already has them (Section 15.6), for example using a wireless link, and sometimes the capture functionality will be incorporated into such other device (Section 15.7).

15.2. Connectivity

In some embodiments, the device implements the majority of the system itself. In some embodiments, however, it often communicates with a PC or other computing device and with the wider world using communications facilities. Often these communications facilities are in the form of a general-purpose data network such as Ethernet, 802.11 or UWB or a standard peripheral-connecting network such as USB, IEEE-1394 (Firewire), Bluetooth™ or infra-red. When a wired connection such as Firewire or USB is used, the device may receive electrical power though the same connection. In some circumstances, the capture device may appear to a connected machine to be a conventional peripheral such as a USB storage device.

Lastly, the device may in some circumstances "dock" with another device, either to be used in conjunction with that device or for convenient storage.

15.3. Caching and Other Online/Offline Functionality

Sections 3.5 and 12.1.4 have raised the topic of disconnected operation. When a capture device has a limited subset of the total system's functionality, and is not in communication with the other parts of the system, the device can still be useful, though the functionality available will sometimes be reduced. At the simplest level, the device can record the raw image or audio data being captured and this can be processed later. For the user's benefit, however, it can be important to give feedback where possible about whether the data captured is likely to be sufficient for the task in hand, whether it can be recognized or is likely to be recognizable, and whether the source of the data can be identified or is likely to be identifiable later. The user will then know whether their capturing activity is worthwhile. Even when all of the above are unknown, the raw data can still be stored so that, at the very least, the user can refer to them later. The user may be presented with the image of a scan, for example, when the scan cannot be recognized by the OCR process.

To illustrate some of the range of options available, both a rather minimal optical scanning device and then a much more full-featured one are described below. Many devices occupy a middle ground between the two.

15.3.1. The Simplescanner—a Low-End Offline Example

The SimpleScanner has a scanning head able to read pixels from the page as it is moved along the length of a line of text. It can detect its movement along the page and record the pixels with some information about the movement. It also has a clock, which allows each scan to be time-stamped. The clock is synchronized with a host device when the SimpleScanner has connectivity. The clock may not represent the actual time of day, but relative times may be determined from it so that the host can deduce the actual time of a scan, or at worst the elapsed time between scans.

The SimpleScanner does not have sufficient processing power to perform any OCR itself, but it does have some basic knowledge about typical word-lengths, word-spacings, and their relationship to font size. It has some basic indicator lights which tell the user whether the scan is likely to be readable, whether the head is being moved too fast, too slowly or too inaccurately across the paper, and when it determines that sufficient words of a given size are likely to have been scanned for the document to be identified.

The SimpleScanner has a USB connector and can be plugged into the USB port on a computer, where it will be recharged. To the computer it appears to be a USB storage device on which time-stamped data files have been recorded, and the rest of the system software takes over from this point.

15.3.2. The Superscanner—a High-End Offline Example

The SuperScanner also depends on connectivity for its full operation, but it has a significant amount of on-board storage and processing which can help it make better judgments about the data captured while offline.

As it moves along the line of text, the captured pixels are stitched together and passed to an OCR engine that attempts to recognize the text. A number of fonts, including those from the user's most-read publications, have been downloaded to it to help perform this task, as has a dictionary that is synchronized with the user's spelling-checker dictionary on their PC and so contains many of the words they frequently encounter. Also stored on the scanner is a list of words and phrases with the typical frequency of their use—this may be combined with the dictionary. The scanner can use the frequency statistics both to help with the recognition process and also to inform its judgment about when a sufficient quantity of text has been captured; more frequently used phrases are less likely to be useful as the basis for a search query.

In addition, the full index for the articles in the recent issues of the newspapers and periodicals most commonly read by the user are stored on the device, as are the indices for the books the user has recently purchased from an online bookseller, or from which the user has scanned anything within the last few months. Lastly, the titles of several thousand of the most popular publications which have data available for the system are stored so that, in the absence of other information the user can scan the title and have a good idea as to whether or not captures from a particular work are likely to be retrievable in electronic form later.

During the scanning process, the system informs user that the captured data has been of sufficient quality and of a sufficient nature to make it probable that the electronic copy can be retrieved when connectivity is restored. Often the system indicates to the user that the scan is known to have been successful and that the context has been recognized in one of the on-board indices, or that the publication concerned is known to be making its data available to the system, so the later retrieval ought to be successful.

The SuperScanner docks in a cradle connected to a PC's Firewire or USB port, at which point, in addition to the upload of captured data, its various onboard indices and other databases are updated based on recent user activity and new publications. It also has the facility to connect to wireless public networks or to communicate via Bluetooth to a mobile phone and thence with the public network when such facilities are available.

15.4. Features for Optical Scanning

We now consider some of the features that may be particularly desirable in an optical scanner device.

15.4.1. Flexible Positioning and Convenient Optics

One of the reasons for the continuing popularity of paper is the ease of its use in a wide variety of situations where a computer, for example, would be impractical or inconvenient. A device intended to capture a substantial part of a user's interaction with paper should therefore be similarly convenient in use. This has not been the case for scanners in the past; even the smallest hand-held devices have been somewhat unwieldy. Those designed to be in contact with the page have to be held at a precise angle to the paper and moved very carefully along the length of the text to be scanned. This is acceptable when scanning a business report on an office desk, but may be impractical when scanning a phrase from a novel while waiting for a train. Scanners based on camera-type optics that operate at a distance from the paper may similarly be useful in some circumstances.

Some embodiments of the system use a scanner that scans in contact with the paper, and which, instead of lenses, uses an image conduit a bundle of optical fibers to transmit the image from the page to the optical sensor device. Such a device can be shaped to allow it to be held in a natural position; for example, in some embodiments, the part in contact with the page is wedge-shaped, allowing the user's hand to move more naturally over the page in a movement similar to the use of a highlighter pen. The conduit is either in direct contact with the paper or in close proximity to it, and may have a replaceable transparent tip that can protect the image conduit from possible damage. As has been mentioned in Section 12.2.4, the scanner may be used to scan from a screen as well as from paper, and the material of the tip can be chosen to reduce the likelihood of damage to such displays.

Lastly, some embodiments of the device will provide feedback to the user during the scanning process which will indicate through the use of light, sound or tactile feedback when the user is scanning too fast, too slow, too unevenly or is drifting too high or low on the scanned line.

15.5. Security, Identity, Authentication, Personalization and Billing

As described in Section 6, the capture device may form an important part of identification and authorization for secure transactions, purchases, and a variety of other operations. It may therefore incorporate, in addition to the circuitry and software required for such a role, various hardware features that can make it more secure, such as a smartcard reader, RFID, or a keypad on which to type a PIN.

It may also include various biometric sensors to help identify the user. In the case of an optical scanner, for example, the scanning head may also be able to read a fingerprint. For a voice recorder, the voice pattern of the user may be used.

15.6. Device Associations

In some embodiments, the device is able to form an association with other nearby devices to increase either its own or their functionality. In some embodiments, for example, it uses the display of a nearby PC or phone to give more detailed feedback about its operation, or uses their network connectivity. The device may, on the other hand, operate in its role as a security and identification device to authenticate operations performed by the other device. Or it may simply form an association in order to function as a peripheral to that device.

An interesting aspect of such associations is that they may be initiated and authenticated using the capture facilities of the device. For example, a user wishing to identify themselves securely to a public computer terminal may use the scanning facilities of the device to scan a code or symbol displayed on a particular area of the terminal's screen and so effect a key transfer. An analogous process may be performed using audio signals picked up by a voice-recording device.

15.7. Integration with Other Devices

In some embodiments, the functionality of the capture device is integrated into some other device that is already in use. The integrated devices may be able to share a power supply, data capture and storage capabilities, and network interfaces. Such integration may be done simply for convenience, to reduce cost, or to enable functionality that would not otherwise be available.

Some examples of devices into which the capture functionality can be integrated include:

- an existing peripheral such as a mouse, a stylus, a USB "webcam" camera, a Bluetooth™ headset or a remote control;
- another processing/storage device, such as a PDA, a portable media player, a voice recorder, a digital camera, or a mobile phone;
- other often-carried items, just for convenience—a watch, a piece of jewelry, a pen, a car key fob, or a pair of eyeglasses.

15.7.1. Mobile Phone Integration

As an example of the benefits of integration, we consider the use of a modified mobile phone as the capture device.

In some embodiments, the phone hardware is not modified to support the system, such as where the text capture can be adequately done through voice recognition, where they can either be processed by the phone itself, or handled by a system at the other end of a telephone call, or stored in the phone's memory for future processing. Many modern phones have the ability to download software that could implement some parts of the system. Such voice capture is likely to be suboptimal in many situations, however, for example when there is substantial background noise, and accurate voice recognition is a difficult task at the best of times. The audio facilities may best be used to capture voice annotations.

In some embodiments, the camera built into many mobile phones is used to capture an image of the text. The phone display, which would normally act as a viewfinder for the camera, may overlay on the live camera image information about the quality of the image and its suitability for OCR, which segments of text are being captured, and even a transcription of the text if the OCR can be performed on the phone.

In some embodiments, the phone is modified to add dedicated capture facilities, or to provide such functionality in a clip-on adaptor or a separate Bluetooth-connected peripheral in communication with the phone. Whatever the nature of the capture mechanism, the integration with a modern cellphone has many other advantages. The phone has connectivity with the wider world, which means that queries can be submitted to remote search engines or other parts of the system, and copies of documents may be retrieved for immediate storage or viewing. A phone typically has sufficient processing power for many of the functions of the system to be performed locally, and sufficient storage to capture a reasonable amount of data. The amount of storage can also often be expanded by the user. Phones have reasonably good displays and audio facilities to provide user feedback, and often a vibrate function for tactile feedback. They also have good power supplies.

Most significantly of all, they are a device that most users are already carrying.

Part III—Example Applications of the System

This section lists example uses of the system and applications that may be built on it. This list is intended to be purely illustrative and in no sense exhaustive.

16. Personal Applications

16.1. Life Library

The Life Library (see also Section 6.1.1) is a digital archive of any important documents that the subscriber wishes to save and is a set of embodiments of services of this system. Important books, magazine articles, newspaper clippings, etc., can all be saved in digital form in the Life Library. Additionally, the subscriber's annotations, comments, and notes can be saved with the documents. The Life Library can be accessed via the Internet and World Wide Web.

The system creates and manages the Life Library document archive for subscribers. The subscriber indicates which documents the subscriber wishes to have saved in his life library by scanning information from the document or by otherwise indicating to the system that the particular document is to be added to the subscriber's Life Library. The scanned information is typically text from the document but can also be a barcode or other code identifying the document. The system accepts the code and uses it to identify the source document. After the document is identified the system can store either a copy of the document in the user's Life Library or a link to a source where the document may be obtained.

One embodiment of the Life Library system can check whether the subscriber is authorized to obtain the electronic copy. For example, if a reader scans text or an identifier from a copy of an article in the New York Times (NYT) so that the article will be added to the reader's Life Library, the Life Library system will verify with the NYT whether the reader is subscribed to the online version of the NYT; if so, the reader gets a copy of the article stored in his Life Library account; if not, information identifying the document and how to order it is stored in his Life Library account.

In some embodiments, the system maintains a subscriber profile for each subscriber that includes access privilege information. Document access information can be compiled in several ways, two of which are: 1) the subscriber supplies the document access information to the Life Library system, along with his account names and passwords, etc., or 2) the Life Library service provider queries the publisher with the subscriber's information and the publisher responds by providing access to an electronic copy if the Life Library subscriber is authorized to access the material. If the Life Library subscriber is not authorized to have an electronic copy of the document, the publisher provides a price to the Life Library service provider, which then provides the customer with the option to purchase the electronic document. If so, the Life Library service provider either pays the publisher directly and bills the Life Library customer later or the Life Library service provider immediately bills the customer's credit card for the purchase. The Life Library service provider would get a percentage of the purchase price or a small fixed fee for facilitating the transaction.

The system can archive the document in the subscriber's personal library and/or any other library to which the subscriber has archival privileges. For example, as a user scans text from a printed document, the Life Library system can identify the rendered document and its electronic counterpart. After the source document is identified, the Life Library system might record information about the source document in the user's personal library and in a group library to which the subscriber has archival privileges. Group libraries are collaborative archives such as a document repository for: a group working together on a project, a group of academic researchers, a group web log, etc.

The life library can be organized in many ways: chronologically, by topic, by level of the subscriber's interest, by type of publication (newspaper, book, magazine, technical paper, etc.), where read, when read, by ISBN or by Dewey decimal, etc. In one alternative, the system can learn classifications based on how other subscribers have classified the same document. The system can suggest classifications to the user or automatically classify the document for the user.

In various embodiments, annotations may be inserted directly into the document or may be maintained in a separate file. For example, when a subscriber scans text from a newspaper article, the article is archived in his Life Library with the scanned text highlighted. Alternatively, the article is archived in his Life Library along with an associated annotation file (thus leaving the archived document unmodified). Embodiments of the system can keep a copy of the source document in each subscriber's library, a copy in a master library that many subscribers can access, or link to a copy held by the publisher.

In some embodiments, the Life Library stores only the user's modifications to the document (e.g., highlights, etc.) and a link to an online version of the document (stored elsewhere). The system or the subscriber merges the changes with the document when the subscriber subsequently retrieves the document.

If the annotations are kept in a separate file, the source document and the annotation file are provided to the subscriber and the subscriber combines them to create a modified document. Alternatively, the system combines the two files prior to presenting them to the subscriber. In another alternative, the annotation file is an overlay to the document file and can be overlaid on the document by software in the subscriber's computer.

Subscribers to the Life Library service pay a monthly fee to have the system maintain the subscriber's archive. Alternatively, the subscriber pays a small amount (e.g., a micropayment) for each document stored in the archive. Alternatively, the subscriber pays to access the subscriber's archive on a per-access fee. Alternatively, subscribers can compile libraries and allow others to access the materials/annotations on a revenue share model with the Life Library service provider and copyright holders. Alternatively, the Life Library service provider receives a payment from the publisher when the Life Library subscriber orders a document (a revenue share model with the publisher, where the Life Library service provider gets a share of the publisher's revenue).

In some embodiments, the Life Library service provider acts as an intermediary between the subscriber and the copyright holder (or copyright holder's agent, such as the Copyright Clearance Center, a.k.a. CCC) to facilitate billing and payment for copyrighted materials. The Life Library service provider uses the subscriber's billing information and other user account information to provide this intermediation service. Essentially, the Life Library service provider leverages the pre-existing relationship with the subscriber to enable purchase of copyrighted materials on behalf of the subscriber.

In some embodiments, the Life Library system can store excerpts from documents. For example, when a subscriber scans text from a paper document, the regions around the scanned text are excerpted and placed in the Life Library, rather than the entire document being archived in the life library. This is especially advantageous when the document is long because preserving the circumstances of the original scan prevents the subscriber from re-reading the document to find the interesting portions. Of course, a hyperlink to the entire electronic counterpart of the paper document can be included with the excerpt materials.

In some embodiments, the system also stores information about the document in the Life Library, such as author, publication title, publication date, publisher, copyright holder (or copyright holder's licensing agent), ISBN, links to public annotations of the document, readrank, etc. Some of this additional information about the document is a form of paper document metadata. Third parties may create public annotation files for access by persons other than themselves, such the general public. Linking to a third party's commentary on a document is advantageous because reading annotation files of other users enhances the subscriber's understanding of the document.

In some embodiments, the system archives materials by class. This feature allows a Life Library subscriber to quickly store electronic counterparts to an entire class of paper documents without access to each paper document. For example, when the subscriber scans some text from a copy of National Geographic magazine, the system provides the subscriber with the option to archive all back issues of the National Geographic. If the subscriber elects to archive all back issues, the Life Library service provider would then verify with the National Geographic Society whether the subscriber is authorized to do so. If not, the Life Library service provider can mediate the purchase of the right to archive the National Geographic magazine collection.

16.2. Life Saver

Figure 12:
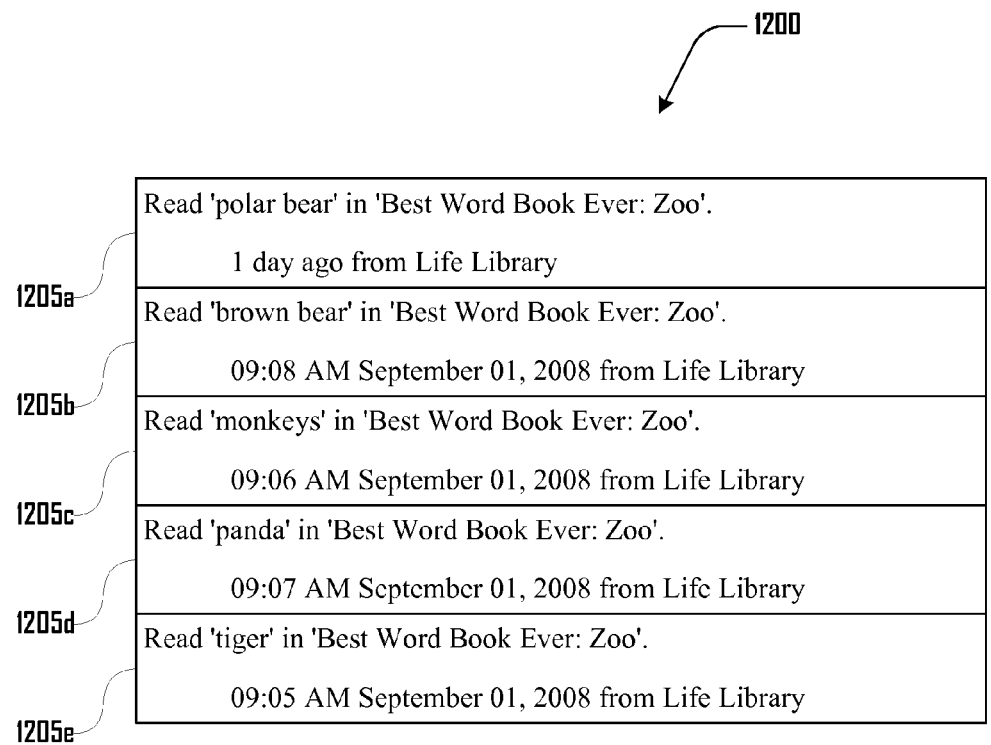
FIG. 12 illustrates a list of updates published by the system in accordance with one embodiment.

A variation on, or enhancement of, the Life Library concept is the "Life Saver", where the system uses the text captured by a user to deduce more about their other activities. The scanning of a menu from a particular restaurant, a program from a particular theater performance, a timetable at a particular railway station, or an article from a local newspaper allows the system to make deductions about the user's location and social activities, and could construct an automatic diary for them, for example as a website. In one embodiment, the system may construct an automatic entry, update, post, or other entry to one or more of a wiki, weblog, and the like. The system may also automatically construct and publish an entry to a micro-blog. For example, the system may construct and publish micro-blog entry such as a "tweet" to Twitter (operated by Twitter, Inc. of San Francisco Calif.); a message to Pownce (operated by Megatechtronium, Inc. of San Francisco Calif.); a status update to a social networking service (e.g., Facebook of Palo Alto, Calif.; MySpace of Beverly Hills, Calif.; LinkedIn of Mountain View, Calif.); and the like. FIG. 12 illustrates an exemplary set of updates 1205a-e, such as may have been posted by the system to a micro-blog. The system may also publish an entry to a photo-stream or photo-blog (e.g., Flickr, operated by Yahoo! Inc. of Sunnyvale, Calif.; Picasa Web Albums, operated by Google Inc. of Mountain View, Calif.; and the like). The system may also generate and publish a web feed or news feed (e.g., an RSS feed or an Atom feed) in conjunction with such an automatic diary. The user would be able to edit and modify the diary, add additional materials such as photographs and, of course, look again at the items scanned. The user may also be able to control access to the diary. For example, the user may make the diary publicly available, or the user may restrict access to a distinguished group.

17. Academic Applications

Portable scanners supported by the described system have many compelling uses in the academic setting. They can enhance student/teacher interaction and augment the learning experience. Among other uses, students can annotate study materials to suit their unique needs; teachers can monitor classroom performance; and teachers can automatically verify source materials cited in student assignments.

17.1. Children's Books

A child's interaction with a paper document, such as a book, is monitored by a literacy acquisition system that employs a specific set of embodiments of this system. The child uses a portable scanner that communicates with other elements of the literacy acquisition system. In addition to the portable scanner, the literacy acquisition system includes a computer having a display and speakers, and a database accessible by the computer. The scanner is coupled with the computer (hardwired, short range RF, etc.). When the child sees an unknown word in the book, the child scans it with the scanner. In one embodiment, the literacy acquisition system compares the scanned text with the resources in its database to identify the word. The database includes a dictionary, thesaurus, and/or multimedia files (e.g., sound, graphics, etc.). After the word has been identified, the system uses the computer speakers to pronounce the word and its definition to the child. In another embodiment, the word and its definition are displayed by the literacy acquisition system on the computer's monitor. Multimedia files about the scanned word can also be played through the computer's monitor and speakers. For example, if a child reading "Goldilocks and the Three Bears" scanned the word "bear", the system might pronounce the word "bear" and play a short video about bears on the computer's monitor. In this way, the child learns to pronounce the written word and is visually taught what the word means via the multimedia presentation.

The literacy acquisition system provides immediate auditory and/or visual information to enhance the learning process. The child uses this supplementary information to quickly acquire a deeper understanding of the written material. The system can be used to teach beginning readers to read, to help children acquire a larger vocabulary, etc. This system provides the child with information about words with which the child is unfamiliar or about which the child wants more information.

17.2. Literacy Acquisition

In some embodiments, the system compiles personal dictionaries. If the reader sees a word that is new, interesting, or particularly useful or troublesome, the reader saves it (along with its definition) to a computer file. This computer file becomes the reader's personalized dictionary. This dictionary is generally smaller in size than a general dictionary so can be downloaded to a mobile station or associated device and thus be available even when the system isn't immediately accessible. In some embodiments, the personal dictionary entries include audio files to assist with proper word pronunciation and information identifying the paper document from which the word was scanned.

In some embodiments, the system creates customized spelling and vocabulary tests for students. For example, as a student reads an assignment, the student may scan unfamiliar words with the portable scanner. The system stores a list of all the words that the student has scanned. Later, the system administers a customized spelling/vocabulary test to the student on an associated monitor (or prints such a test on an associated printer).

17.3. Music Teaching

The arrangement of notes on a musical staff is similar to the arrangement of letters in a line of text. The same scanning device discussed for capturing text in this system can be used to capture music notation, and an analogous process of constructing a search against databases of known musical pieces would allow the piece from which the capture occurred to be identified which can then be retrieved, played, or be the basis for some further action.

17.4. Detecting Plagiarism

Teachers can use the system to detect plagiarism or to verify sources by scanning text from student papers and submitting the scanned text to the system. For example, a teacher who wishes to verify that a quote in a student paper came from the source that the student cited can scan a portion of the quote and compare the title of the document identified by the system with the title of the document cited by the student. Likewise, the system can use scans of text from assignments submitted as the student's original work to reveal if the text was instead copied.

17.5. Enhanced Textbook

In some embodiments, capturing text from an academic textbook links students or staff to more detailed explanations, further exercises, student and staff discussions about the material, related example past exam questions, further reading on the subject, recordings of the lectures on the subject, and so forth. (See also Section 7.1.)

17.6. Language Learning

In some embodiments, the system is used to teach foreign languages. Scanning a Spanish word, for example, might cause the word to be read aloud in Spanish along with its definition in English.

The system provides immediate auditory and/or visual information to enhance the new language acquisition process. The reader uses this supplementary information to acquire quickly a deeper understanding of the material. The system can be used to teach beginning students to read foreign languages, to help students acquire a larger vocabulary, etc. The system provides information about foreign words with which the reader is unfamiliar or for which the reader wants more information.

Reader interaction with a paper document, such as a newspaper or book, is monitored by a language skills system. The reader has a portable scanner that communicates with the language skills system. In some embodiments, the language skills system includes a computer having a display and speakers, and a database accessible by the computer. The scanner communicates with the computer (hardwired, short range RF, etc.). When the reader sees an unknown word in an article, the reader scans it with the scanner. The database includes a foreign language dictionary, thesaurus, and/or multimedia files (sound, graphics, etc.). In one embodiment, the system compares the scanned text with the resources in its database to identify the scanned word. After the word has been identified, the system uses the computer speakers to pronounce the word and its definition to the reader. In some embodiments, the word and its definition are both displayed on the computer's monitor. Multimedia files about grammar tips related to the scanned word can also be played through the computer's monitor and speakers. For example, if the words "to speak" are scanned, the system might pronounce the word "hablar," play a short audio clip that demonstrates the proper Spanish pronunciation, and display a complete list of the various conjugations of "hablar". In this way, the student learns to pronounce the written word, is visually taught the spelling of the word via the multimedia presentation, and learns how to conjugate the verb. The system can also present grammar tips about the proper usage of "hablar" along with common phrases.

In some embodiments, the user scans a word or short phrase from a rendered document in a language other than the user's native language (or some other language that the user knows reasonably well). In some embodiments, the system maintains a prioritized list of the user's "preferred" languages. The system identifies the electronic counterpart of the rendered document, and determines the location of the scan within the document. The system also identifies a second electronic counterpart of the document that has been translated into one of the user's preferred languages, and determines the location in the translated document corresponding to the location of the scan in the original document. When the corresponding location is not known precisely, the system identifies a small region (e.g., a paragraph) that includes the corresponding location of the scanned location. The corresponding translated location is then presented to the user. This provides the user with a precise translation of the particular usage at the scanned location, including any slang or other idiomatic usage that is often difficult to accurately translate on a word-by-word basis.

17.7. Gathering Research Materials

A user researching a particular topic may encounter all sorts of material, both in print and on screen, which they might wish to record as relevant to the topic in some personal archive. The system would enable this process to be automatic as a result of scanning a short phrase in any piece of material, and could also create a bibliography suitable for insertion into a publication on the subject.

18. Commercial Applications

Obviously, almost any process discussed herein could support commercial activities, but here we concentrate on a few distinct revenue streams.

18.1. Fee-Based Searching and Indexing

Conventional Internet search engines typically provide free search of electronic documents, and also make no charge to the content providers for including their content in the index. In some embodiments, the system provides for charges to users and/or payments to search engines and/or content providers in connection with the operation and use of the system.

In some embodiments, subscribers to the system's services pay a fee for searches originating from scans of paper documents. For example, a stockbroker may be reading a Wall Street Journal article about a new product offered by Company X. By scanning the Company X name from the paper document and agreeing to pay the necessary fees, the stockbroker uses the system to search special or proprietary databases to obtain premium information about the company, such as analyst's reports. The system can also make arrangements to have priority indexing of the documents most likely to be read in paper form, for example by making sure all of the newspapers published on a particular day are indexed and available by the time they hit the streets.

Content providers may pay a fee to be associated with certain terms in search queries submitted from paper documents. For example, in one embodiment, the system chooses a most preferred content provider based on additional context about the provider (the context being, in this case, that the content provider has paid a fee to be moved up the results list). In essence, the search provider is adjusting paper document search results based on pre-existing financial arrangements with a content provider. See also the description of keywords and key phrases in Section 5.2.

Where access to particular content is to be restricted to certain groups of people (such as clients or employees), such content may be protected by a firewall and thus not generally indexable by third parties. The content provider may nonetheless wish to provide an index to the protected content. In such a case, the content provider can pay a service provider to provide the content provider's index to system subscribers. For example, a law firm may index all of a client's documents. The documents are stored behind the law firm's firewall. However, the law firm wants its employees and the client to have access to the documents through the portable scanner so it provides the index (or a pointer to the index) to the service provider, which in turn searches the law firm's index when employees or clients of the law firm submit paper-scanned search terms via their portable scanners. The law firm can provide a list of employees and/or clients to the service provider's system to enable this function or the system can verify access rights by querying the law firm prior to searching the law firm's index. Note that in the preceding example, the index provided by the law firm is only of that client's documents, not an index of all documents at the law firm. Thus, the service provider can only grant the law firm's clients access to the documents that the law firm indexed for the client.

There are at least two separate revenue streams that can result from searches originating from paper documents: one revenue stream from the search function, and another from the content delivery function. The search function revenue can be generated from paid subscriptions from the scanner users, but can also be generated on a per-search charge. The content delivery revenue can be shared with the content provider or copyright holder (the service provider can take a percentage of the sale or a fixed fee, such as a micropayment, for each delivery), but also can be generated by a "referral" model in which the system gets a fee or percentage for every item that the subscriber orders from the online catalog and that the system has delivered or contributed to, regardless of whether the service provider intermediates the transaction. In some embodiments, the system service provider receives revenue for all purchases that the subscriber made from the content provider, either for some predetermined period of time or at any subsequent time when a purchase of an identified product is made.

18.2. Catalogs

Consumers may use the portable scanner to make purchases from paper catalogs. The subscriber scans information from the catalog that identifies the catalog. This information is text from the catalog, a bar code, or another identifier of the catalog. The subscriber scans information identifying the products that s/he wishes to purchase. The catalog mailing label may contain a customer identification number that identifies the customer to the catalog vendor. If so, the subscriber can also scan this customer identification number. The system acts as an intermediary between the subscriber and the vendor to facilitate the catalog purchase by providing the customer's selection and customer identification number to the vendor.

18.3. Coupons

A consumer scans paper coupons and saves an electronic copy of the coupon in the scanner, or in a remote device such as a computer, for later retrieval and use. An advantage of electronic storage is that the consumer is freed from the burden of carrying paper coupons. A further advantage is that the electronic coupons may be retrieved from any location. In some embodiments, the system can track coupon expiration dates, alert the consumer about coupons that will expire soon, and/or delete expired coupons from storage. An advantage for the issuer of the coupons is the possibility of receiving more feedback about who is using the coupons and when and where they are captured and used.

19. General Applications

19.1. Forms

The system may be used to auto-populate an electronic document that corresponds to a paper form. A user scans in some text or a barcode that uniquely identifies the paper form. The scanner communicates the identity of the form and information identifying the user to a nearby computer. The nearby computer has an Internet connection. The nearby computer can access a first database of forms and a second database having information about the user of the scanner (such as a service provider's subscriber information database). The nearby computer accesses an electronic version of the paper form from the first database and auto-populates the fields of the form from the user's information obtained from the second database. The nearby computer then emails the completed form to the intended recipient. Alternatively, the computer could print the completed form on a nearby printer.

Rather than access an external database, in some embodiments, the system has a portable scanner that contains the user's information, such as in an identity module, SIM, or security card. The scanner provides information identifying the form to the nearby PC. The nearby PC accesses the electronic form and queries the scanner for any necessary information to fill out the form.

19.2. Business Cards

The system can be used to automatically populate electronic address books or other contact lists from paper documents. For example, upon receiving a new acquaintance's business card, a user can capture an image of the card with his/her cellular phone. The system will locate an electronic copy of the card, which can be used to update the cellular phone's onboard address book with the new acquaintance's contact information. The electronic copy may contain more information about the new acquaintance than can be squeezed onto a business card. Further, the onboard address book may also store a link to the electronic copy such that any changes to the electronic copy will be automatically updated in the cell phone's address book. In this example, the business card optionally includes a symbol or text that indicates the existence of an electronic copy. If no electronic copy exists, the cellular phone can use OCR and knowledge of standard business card formats to fill out an entry in the address book for the new acquaintance. Symbols may also aid in the process of extracting information directly from the image. For example, a phone icon next to the phone number on the business card can be recognized to determine the location of the phone number.

19.3. Proofreading/Editing

The system can enhance the proofreading and editing process. One way the system can enhance the editing process is by linking the editor's interactions with a paper document to its electronic counterpart. As an editor reads a paper document and scans various parts of the document, the system will make the appropriate annotations or edits to an electronic counterpart of the paper document. For example, if the editor scans a portion of text and makes the "new paragraph" control gesture with the scanner, a computer in communication with the scanner would insert a "new paragraph" break at the location of the scanned text in the electronic copy of the document.

19.4. Voice Annotation

A user can make voice annotations to a document by scanning a portion of text from the document and then making a voice recording that is associated with the scanned text. In some embodiments, the scanner has a microphone to record the user's verbal annotations. After the verbal annotations are recorded, the system identifies the document from which the text was scanned, locates the scanned text within the document, and attaches the voice annotation at that point. In some embodiments, the system converts the speech to text and attaches the annotation as a textual comment.

In some embodiments, the system keeps annotations separate from the document, with only a reference to the annotation kept with the document. The annotations then become an annotation markup layer to the document for a specific subscriber or group of users.

In some embodiments, for each capture and associated annotation, the system identifies the document, opens it using a software package, scrolls to the location of the scan and plays the voice annotation. The user can then interact with a document while referring to voice annotations, suggested changes or other comments recorded either by themselves or by somebody else.

19.5. Help in Text

The described system can be used to enhance paper documents with electronic help menus. In some embodiments, a markup layer associated with a paper document contains help menu information for the document. For example, when a user scans text from a certain portion of the document, the system checks the markup associated with the document and presents a help menu to the user. The help menu is presented on a display on the scanner or on an associated nearby display.

19.6. Use with Displays

In some situations, it is advantageous to be able to scan information from a television, computer monitor, or other similar display. In some embodiments, the portable scanner is used to scan information from computer monitors and televisions. In some embodiments, the portable optical scanner has an illumination sensor that is optimized to work with traditional cathode ray tube (CRT) display techniques such as rasterizing, screen blanking, etc.

A voice capture device which operates by capturing audio of the user reading text from a document will typically work regardless of whether that document is on paper, on a display, or on some other medium.

19.6.1. Public Kiosks and Dynamic Session Ids

One use of the direct scanning of displays is the association of devices as described in Section 15.6. For example, in some embodiments, a public kiosk displays a dynamic session ID on its monitor. The kiosk is connected to a communication network such as the Internet or a corporate intranet. The session ID changes periodically but at least every time that the kiosk is used so that a new session ID is displayed to every user. To use the kiosk, the subscriber scans in the session ID displayed on the kiosk; by scanning the session ID, the user tells the system that he wishes to temporarily associate the kiosk with his scanner for the delivery of content resulting from scans of printed documents or from the kiosk screen itself. The scanner may communicate the Session ID and other information authenticating the scanner (such as a serial number, account number, or other identifying information) directly to the system. For example, the scanner can communicate directly (where "directly" means without passing the message through the kiosk) with the system by sending the session initiation message through the user's cell phone (which is paired with the user's scanner via Bluetooth™). Alternatively, the scanner can establish a wireless link with the kiosk and use the kiosk's communication link by transferring the session initiation information to the kiosk (perhaps via short range RF such as Bluetooth™, etc.); in response, the kiosk sends the session initiation information to the system via its Internet connection.

The system can prevent others from using a device that is already associated with a scanner during the period (or session) in which the device is associated with the scanner. This feature is useful to prevent others from using a public kiosk before another person's session has ended. As an example of this concept related to use of a computer at an Internet café, the user scans a barcode on a monitor of a PC which s/he desires to use; in response, the system sends a session ID to the monitor that it displays; the user initiates the session by scanning the session ID from the monitor (or entering it via a keypad or touch screen or microphone on the portable scanner); and the system associates in its databases the session ID with the serial number (or other identifier that uniquely identifies the user's scanner) of his/her scanner so another scanner cannot scan the session ID and use the monitor during his/her session. The scanner is in communication (through wireless link such as Bluetooth™, a hardwired link such as a docking station, etc.) with a PC associated with the monitor or is in direct (i.e., w/o going through the PC) communication with the system via another means such as a cellular phone, etc.

Part IV—System Details

A system is described that allows a reader to capture, with minimal effort and maximum utility, information in a document that interests the reader.

Figure 4:
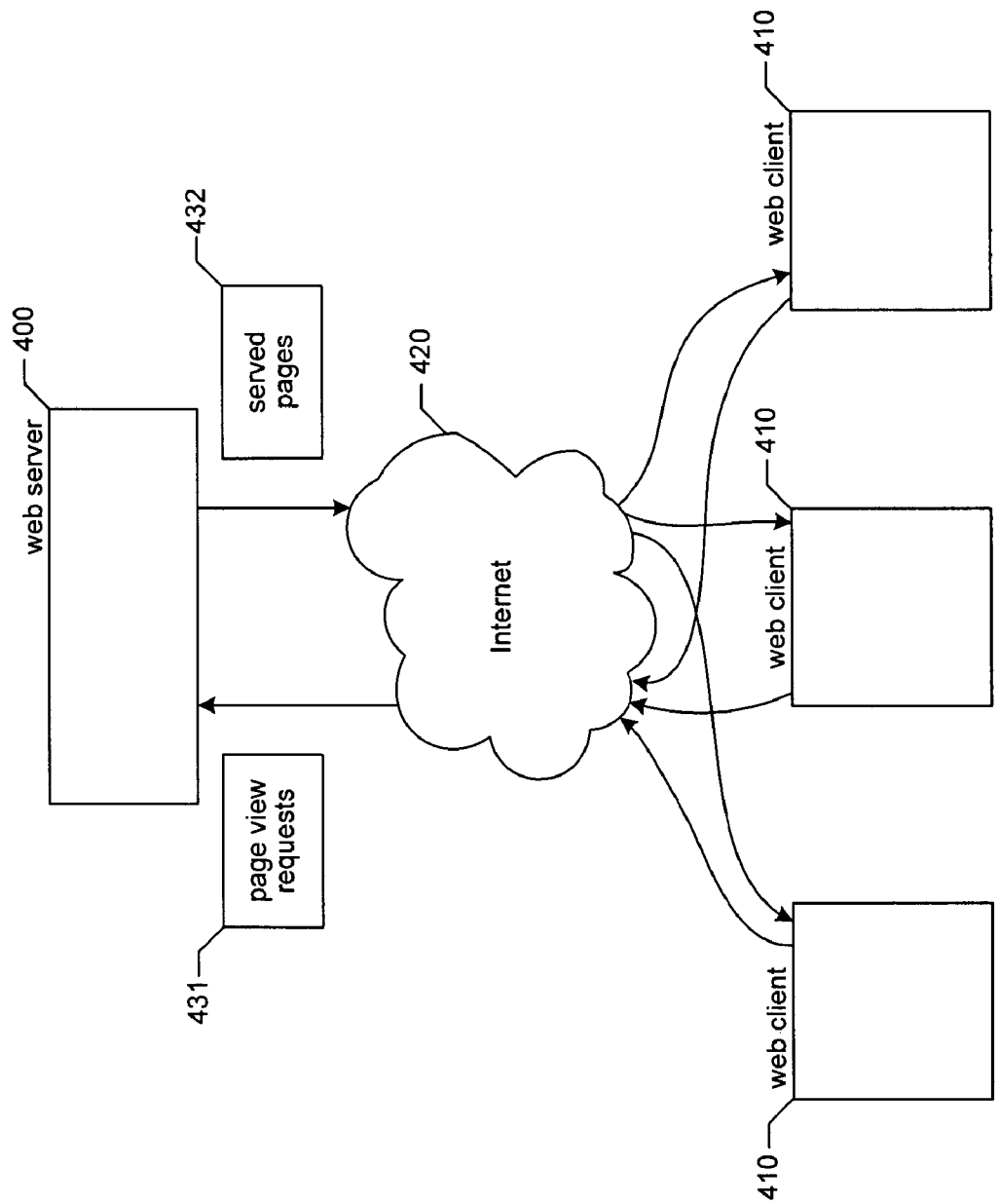
FIG. 4 is a high-level data flow diagram showing data flow within a typical arrangement of components used to provide the system.

FIG. 4 is a high-level data flow diagram showing data flow within a typical arrangement of components used to provide the system. A number of web client computer systems 410 that are under user control generate and send page view requests 431 to a logical web server 400 via a network such as the Internet 420. These requests typically include page view requests for Life Library pages provided by the system. Within the web server, these requests may either all be routed to a single web server computer system, or may be loaded-balanced among a number of web server computer systems. The web server typically replies to each with a served page 432.

While various embodiments are described in terms of the environment described above, those skilled in the art will appreciate that the system may be implemented in a variety of other environments including a single, monolithic computer system, as well as various other combinations of computer systems or similar devices connected in various ways.

Figure 5:
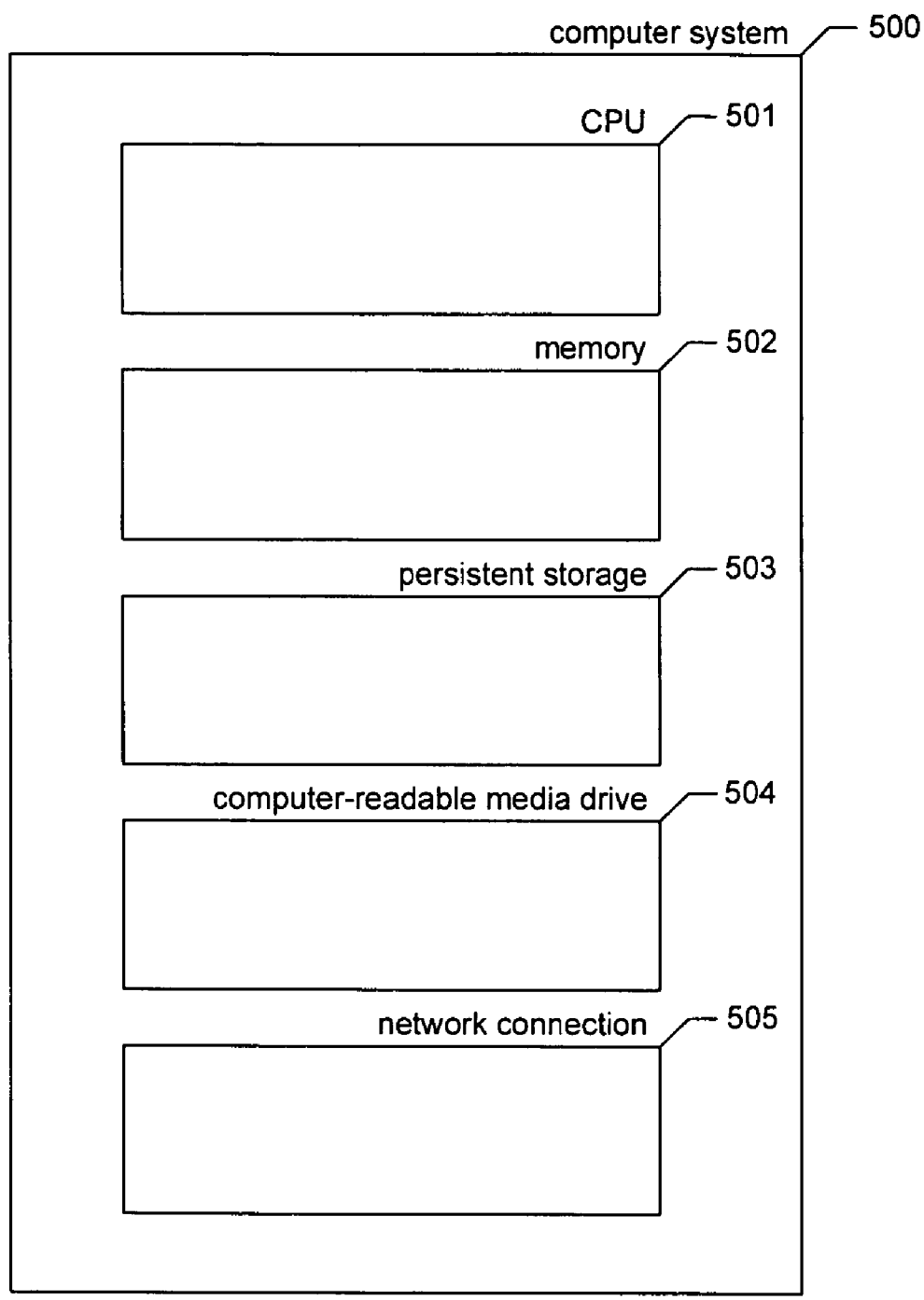
FIG. 5 is a block diagram showing some of the components typically incorporated in at least some of the computer systems and other devices used by the system.

FIG. 5 is a block diagram showing some of the components typically incorporated in at least some of the computer systems and other devices used by the system. These computer systems and devices 500 may include one or more central processing units ("CPUs") 501 for executing computer programs; a computer memory 502 for storing programs and data while they are being used; a persistent storage device 503, such as a hard drive for persistently storing programs and data; a computer-readable media drive 504, such as a CD-ROM drive, for reading programs and data stored on a computer-readable medium; and a network connection 505 for connecting the computer system to other computer systems, such as via the Internet. While computer systems configured as described above are typically used to support the operation of the system, those skilled in the art will appreciate that the facility may be implemented using devices of various types and configurations, and having various components.

The Basic Process

In some embodiments, the system begins by capturing text from a rendered document, either through the use of an optical capture device which records an image of part of the rendered document, or through an audio capture device which records the user's speech as he reads from the document.

The system then optionally uses captured data to identify an electronic counterpart of the rendered document using the methods described elsewhere herein. In some embodiments, the system also identifies the precise matching location or locations in the document corresponding to the capture.

The system stores this identification information in an archive on behalf of the user, often with a copy of the electronic counterpart of the document or some portion of it, and with further information relating to the capture, such as the raw image or audio data, the time at which the capture was made, and other such contextual information as may be available. (See section 13.) The user and/or the system may view, edit and otherwise manipulate the archive data in a variety of ways. We refer to this archive as a 'Life Library'.

Figure 6:
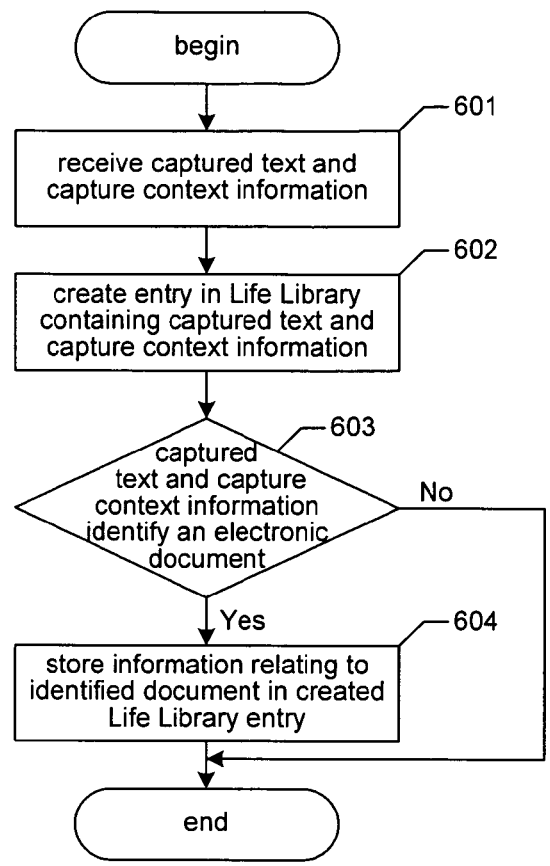
FIG. 6 is a flow diagram showing steps typically performed by the system in response to the capture of text from a rendered document by a user.

FIG. 6 is a flow diagram showing steps typically performed by the system in response to the capture of text from a rendered document by a user. In step 601, the system receives text captured by the user, as well as context information relating to the capture. In step 602, the system creates a new entry in the Life Library that contains the captured text and capture context information received in step 601. In step 603, if the captured text and capture context information received in step 601 identifies a single electronic document, then the system continues in step 604, else these steps conclude. In step 604, the system stores in the Life Library entry created in step 602 information relating to the document identified by the captured text and capture context information received in step 601, such as an identifier of the document, a full or partial copy of the document, etc. After 604, these steps conclude.

Flexibility in the Process

While one or more processes for processing captured data are discussed herein, in some embodiments, the system performs the stages of the processes in different order than described, defers some stages for a period of time, or completely omits one or more stages. In some circumstances, for example, the electronic counterpart may not be identifiable immediately, for example because it is does not exist in electronic form or because, for any of a variety of reasons, it is not accessible to the user at the time of capture. Despite this, the information associated with the capture can be recorded and optionally used to identify the document later, possibly many years after the actual capture. See also the earlier discussions about online/offline operation in section 15.3.

Presentation of the Archive

The aim of the Life Library is to capture the fact that a certain area of a document was of interest to the user, in such a way that the user, or others, may return to this information later and make use of it. Some possible presentations of the data are described; which one is most appropriate will depend on factors such as the delivery platform, the preferences of the user, and the use to which the archival data is being put. A single archive may, of course, expose its data in a number of different ways.

Figure 7:
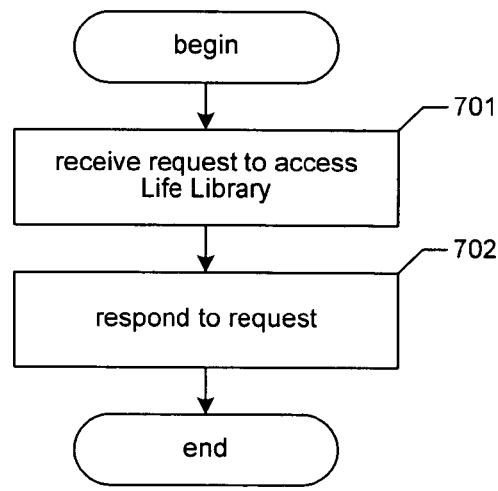
FIG. 7 is a flow diagram showing steps typically performed by the facility in order to present the Life Library archive.

FIG. 7 is a flow diagram showing steps typically performed by the facility in order to present the Life Library archive. In step 701, the system receives a request to access the Life Library archive. In step 702, the facility responds to the request. After step 702, these steps conclude.

In some embodiments, the system enables the user to select an order in which to display the entries of the Life Library, including forward chronological order of capture, backward chronological order of capture, forward chronological order of publishing and reverse chronological order of publishing.

Web Site

A web site is a natural way to present the information contained in the Life Library, particularly if the Life Library service is provided by an internet-based supplier. Presenting the information contained in the Life Library via a web site also enables its owner to share the Life Library with others, access it from multiple locations or from multiple different platforms, and avoid installing too much software or storing too much data on a local machine. The web is also a natural medium for an application such as this that may involve the linking to or retrieval of information from other network sites.

In one embodiment, the primary view of the Life Library is similar to that typically used by weblogs: a list of the entries in reverse chronological order, such that the most recent entries are at the top of the main page. Other pages show older entries, different views of the Life Library or more details on individual entries. A search facility allows for quick discovery of particular entries.

In a typical embodiment, the Life Library presents the entries in the form of a list of the text elements that were captured by the user, which will typically be quite short elements, optionally shown highlighted in the context of a small amount of surrounding text, for example the sentence or paragraph in which the capture occurred. By clicking on a link (typically the captured text itself), the user is able to see the captured section highlighted in its original context in the document. Other captures from the same document may also be displayed highlighted in this view, and hyperlinks associated with them allow the user quickly to locate their entries in the Life Library. In one view of the User's Life Library, the actual images captured may also be displayed.

Making the Life Library available as a web site also has the advantage of making it available to others if the user so desires. In some embodiments, the Life Library is available for writing as well as reading by a certain group of users—thus Life Libraries can be created which reflect the activities and interests of a group. As an example, in a legal practice, attorneys may each create a Life Library of the documents and sections of documents they've consulted which were relevant to particular cases.

Other representations of the Life Library data may also be made available from a web site. An important example is a machine-readable feed of what has been updated recently in the Life Library, similar to the RSS format used by weblogs and other news feeds. This allows other users to 'subscribe' to the site using a piece of software which makes use of the feed to inform its user of changes to the site, so saving them from repeatedly visiting every site of interest to see if there are any changes.

In some embodiments a user's Life Library is stored using encryption to protect the user's privacy.

Email Mailbox

In some embodiments, the system makes the Life Library available in the form of an email mailbox, to which new entries are added as new captures are submitted to the Life Library. This allows the user to examine the Life Library using a standard email-reading tool and to organize, search, file, delete and otherwise manipulate entries without having to learn any new software tools. It also facilitates the forwarding of Life Library entries to other users who may not be familiar with the Life Library system.

Local Application

In some embodiments, the system creates and manages the Life Library using a software application running on the user's computer or other device, such as a mobile phone, PDA, digital camera or media player. Such an application may use the user interface facilities of the device for the creation of and interaction with the Life Library, but it may also create website pages or email messages as described above. The application may store the Life Library on the device on which it is running, and/or in a database or other store available via a network.

Merging with the OS and Other Applications

As mentioned in section 11, computer operating systems and applications typically track historical information about the user's activities, including maintaining various lists of electronic documents with which a user has interacted on a computer (e.g., a 'history list' associated with a web browser or a list of 'Most recently used' documents maintained by the OS and by applications). In some embodiments, the system also records the documents from which text is captured in these lists or in similar parallel lists so that paper documents with which the user has interacted are known to the operating system and its associated components and applications, so that they are readily available as electronic documents. Thus, for example, the file system, search components, backup processes, and other elements associated with an operating system can be aware of documents the user has read in paper.

Viewing, Organizing and Finding the Data

In many situations, the Life Library facilitates access by the user to written material they have deemed important in the past. In various embodiments, the system provides a variety of means of accessing the data to allow the user to retrieve information in the manner most appropriate for his situation.

Various embodiments allow the data to be viewed, searched or sorted based on a variety of criteria, including:
  the time and date of capture
  the author of the document
  the source or publisher of the document
  the type of publication (hardback book, paperback book, magazine, loose leaf document, newspaper, packaging, comic book, etc.)

the topics, content, or semantic classification of the document—as determined by this user, other users, or the system itself the date of publication the genre of the publication (non fiction, fiction, mystery, romance, fantasy, science fiction, business, self help, etc.)

the Dewey classification of the document the ISBN number of the document the contents of the capture or of related text (including proximate text and/or semantically indicated text)

keywords and other annotations or categorizations added by the user or the system the popularity of the document amongst other users the user (in the case of an Life Library used by a group)

In some embodiments, the system also categorizes the documents on the user's behalf using such techniques as term vector similarity or semantic clustering, or based on the categorization of the documents by other users.

In some embodiments, the system exposes the classification of documents by other users, such as by indicating for any given capture which other documents have been classified in a similar way by others. The user may be able to 'subscribe' to the classification process of others, for which those others may receive some compensation. In this way, users may be rewarded for their expertise in certain areas and their transfer of that expertise into the system.

In some circumstances, the user may simply wish to base his classification of documents on the classification used by others, for example to improve compatibility with the Life Libraries of others in a group to which he belongs.

User Markup & Annotation

Users examining their Life Libraries may add annotations, keywords, notes and further information, in addition to any information incorporated at the time of capture. Annotations may be stored separately from the document to which they apply, and subsequently merged with the document, or viewed or applied as an overlay on the document. Individual annotations can be anchored to the specific fragments of data content in captures with which they are associated, so that even though the document is changed or rearranged, the annotations remain correctly associated with the original captured fragments.

In some embodiments, one user's Life Library may be annotated or in other ways updated or modified by other users, or may take into account the material in other users' Life Libraries. For example, a student capturing a passage in a textbook may be able to view the annotations made by other users to the same passage.

FIGS. 8-11 are display diagrams showing typical displays presented by the system when a user accesses his or her Life Library. FIG. 8 shows an initial display 800. This display includes entries 810, 820 and 830, each corresponding to a text capture made by this user from a rendered document. Although only three entries are shown, those skilled in the art will appreciate that a single user can perform a much larger number of captures. In some embodiments, the system provides additional controls for organizing (e.g., sorting and classifying); searching; and/or navigating the entries contained in the Life Library (not shown). Each of the entries contains "indications" of text capture operations. In this context, an "indication" of a text capture operation refers to information about, derived from, or associated with the capture to which it corresponds. For example, entry 810 contains the following indications relating to the capture to which it corresponds: indications 811 and 812 that the capture was performed at 8:10 in the morning on Mar. 26, 2005; an indication 813 of the textual content of the capture; an indication 814 of the number of documents that match the capture; and, for the one document that matches the capture, an indication 815 of the document's author, an indication 816 of the document's title, and an indication 817 of the page of the document on which the captured text occurs.

When display 800 is presented to the user, the user may interact with the display using a variety of user interface techniques. For example, the user may left-click or right-click on various portions of an entry to perform certain interactions with respect to it; may select various controls displayed in conjunction with an entry; etc.

Figure 11:
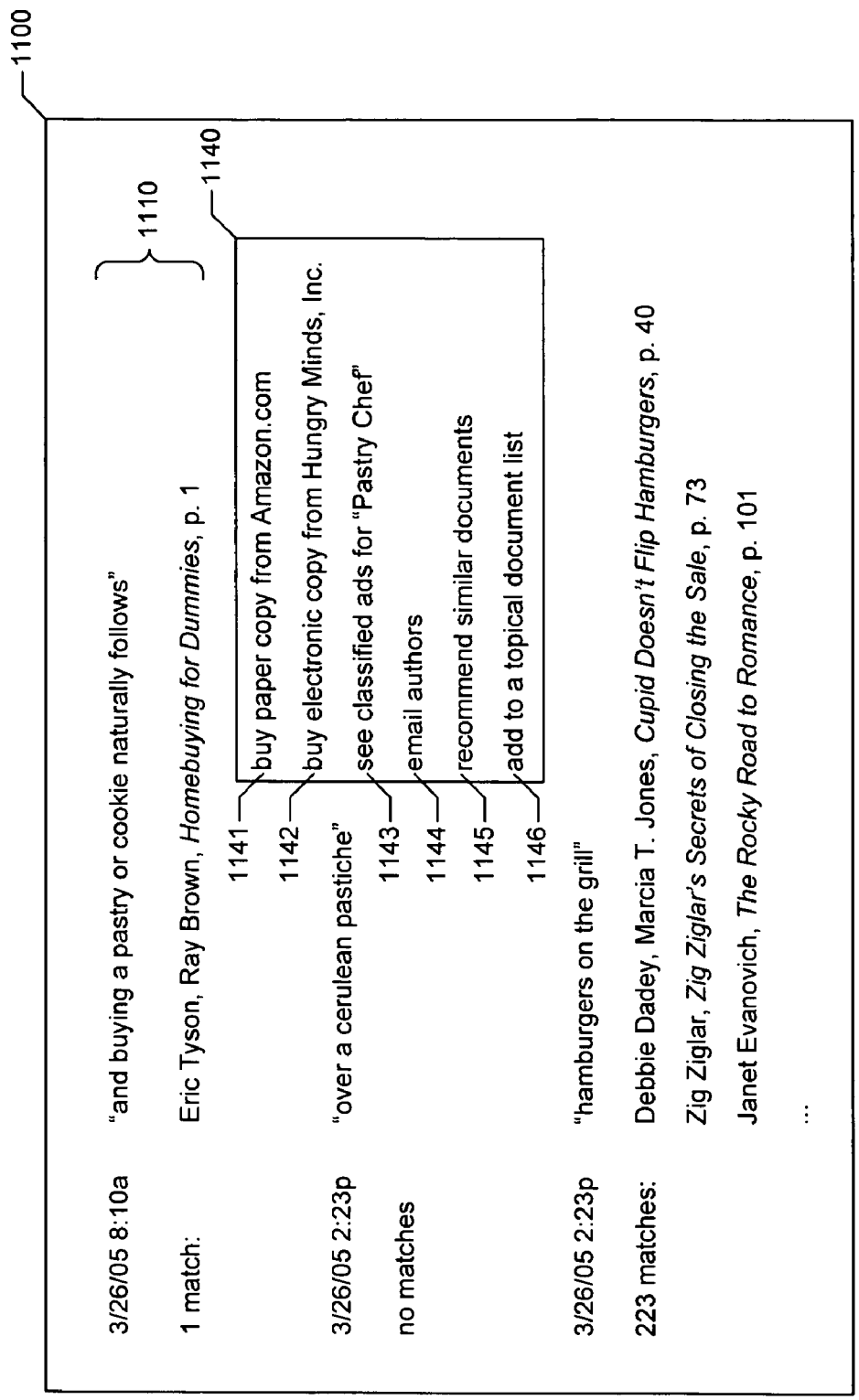

FIGS. 9-11 show subsequent displays presented by the system in response to user interactions with entry 810. FIG. 9 shows display 900, which reflects the user's interaction with entry 810 to display an image of the captured text. It can be seen that entry 910 in display 900 includes an image 940 of text visually captured from the rendered document by the user. In some embodiments, the system enables a user who detects an inconsistency between the recognized captured text and the captured text image to correct the recognized text in the Life Library. If the user does so, the system typically revises other parts of the entry in accordance with the revised recognized text. In some embodiments, when the captured text was captured via an audio capture, the system plays a copy of the captured audio (not shown).

FIG. 10 shows a subsequent display 1000 produced when the user interacts with entry 810 to request the display of the contextual passage of the document containing the captured text. It can be seen that entry 1010 includes contextual passage 1040 in which the captured text 1041 is visually identified. In some embodiments, the user can control the size of the contextual passage. In some cases, the system displays an image of the entire page of the document containing the captured text.

FIG. 11 shows a subsequent display 1100 produced by the system when the user interacts with entry 810 to display a context menu for the capture. It can be seen that, proximate to entry 1110, the system has displayed a context menu 1140 of actions that the user can take with respect to the capture. In some embodiments, the actions on this context menu were available to the user at the time the user performed the capture. In some embodiments, actions on the context menu diverge from those that were available to the user at the time of the capture. Here, it can be seen that the context menu contains actions 1141-1146, each relating to the capture to which entry 1110 corresponds.

Those skilled in the art will appreciate that the system can be straightforwardly extended to support other kinds of interactions with the entries of the Life Library.

Notification of Changes, Updates, Imminent Deletion

By capturing text from a document, a user expresses an interest in that document which may last well beyond the immediate capture. The system may periodically query the sources of the documents that Life Library references to discover any changes in the documents' status. Alternatively, it may register with the sources, requesting any information to be sent to it when such changes occur.

In some embodiments, the system is thus able to present the user with information pertinent to either the rendered or the electronic copy of the document. For example, the user may be informed that a new edition of a previously-read book has been published, that a sequel or a new work by the author is now available, that a commentary on a document is available or that a newly-published paper includes a citation to one in the Life Library. In the electronic world, the user may also be informed that a website containing referenced documents is shortly to be closed or that certain documents are to be moved to a new location.

Bibliographies

For many users, an important aspect of capturing information from, and references to, particular documents is that the user may wish to refer to them in documents of their own. The Life Library can therefore facilitate the automatic creation of bibliographies, glossaries, tables of authorities, citations and similar reference materials (collectively, "bibliographic entries"). In one embodiment, the Life Library may further facilitate the proper formatting of bibliographic entries. For example, the Life Library may be able to format a bibliographic entry according to a citation style, such as those defined by the following publications: Publication Manual of the American Psychological Association (APA); A Manual for Writers of Term Papers, Theses, and Dissertations (Turabian); Modern Language Association (MLA) Handbook for Writers of Research Papers; The Chicago Manual of Style; American Medical Association Manual of Style; The Bluebook; and the like. In some embodiments, the Life Library may allow the user to select or otherwise specify a citation style for a bibliographic entry. In some embodiments, the Life Library may also automatically choose a citation style based on past user preference, document type, or other factors. For example, if a user captures information from a court opinion or legal treatise, the Life Library may automatically format a bibliographic entry according to The Bluebook.

Document Access

In some embodiments, when adding a new entry to the Life Library, the system retrieves the document, or a part of the document, from which the capture was made and stores it in the Life Library. This ensures that the user will always be able to refer back to the original text that inspired the capture. This section considers some of the issues associated with access to documents. For further discussion of this topic see section 8.

Continued Access to Documents

A large number of documents are now freely available on the public internet, and can be retrieved at will. The fact that a document is available today, however, does not guarantee its availability tomorrow. Similarly, many documents not currently on-line may be made available in the future. In many circumstances, online documents are updated periodically, and it can be important for the user and the system to have access to the version that was actually read by the user. A useful feature of the Life Library, therefore, is its ability to capture a copy of a document when it is available, periodically to check for documents that were not available earlier, and to inform the user of changes in status to any documents in which he may be interested.

Preservation of Referenced Documents

In this section the term 'publisher' will be used to refer to the person, company or other entity responsible for making a document available to a user. This will typically be the author, creator, publisher, copyright holder, website owner, librarian or other distributor of the document. In situations where the documents are referenced from the Life Library, rather than or in addition to being downloaded, the system informs the publishers of these documents, in some cases periodically, that the documents are being referenced.

This allows the publisher to be aware of the outside interest in a particular document. For example, the publisher may decide not to delete any documents which are referenced in Life Libraries, or to modify the fee for accessing a document in future based on its popularity, or to charge advertisers whose content appears on the page a fee based on the popularity of the page as measured by its incorporation in users' Life Libraries.

Authorization and Payment for Document Access

Many documents, despite existing in electronic form, are not freely available to the general public. This may be because their distribution is restricted, for example to employees of a particular company, or it may be because the publisher charges a fee for access to the document. In some cases, a publisher simply wishes a user to register with their service, so that they can gather statistics about their readership.

Identification, Registration, Authorization

In some embodiments, the system transmits certain information about the user to the publisher. It may prompt the user for confirmation, or to enter a password, before doing this, or may be authorized to do so of its own accord. In some embodiments, the system performs this transaction over a secure connection. In some embodiments, the system directs the user to a web site to complete an identification, registration, or authorization process. This transmission of information may simply be for the publisher's information, but it may establish the credentials of the user in a way that enables the retrieval of a document. The identification and any associated authorization may operate for a single transaction only or for all transactions in a particular session of Life Library use, or for a limited time, or indefinitely. Further discussion on the use of the scanner for such transactions may be found in sections 6.2 and 15.5.

Examples of criteria that entitle the user, or the user's Life Library, to retrieve a document in various embodiments include:

registration with the publisher
a willingness to pay a fee
ownership of the paper publication
a subscription to a paper-based publication
a subscription to an electronic service
association with another account, for example a mobile phone account, which may also be used for payment
establishment of credentials, for example by knowing a password or possessing some token Document Escrow In some circumstances, the user may not wish to pay for access to the electronic document at the time of adding it to their Life Library but may wish to ensure that the document is available to them at a later date. The Life Library, or a third party, may therefore provide a trusted 'document escrow' service, wherein the document is obtained from the publisher and stored on behalf of the user, optionally for a modest, optionally recurring, fee, thus guaranteeing its continued availability. The user's access to the document in future may also be contingent upon payment of a fee which will result in a payment to the publisher. In an exemplary embodiment, the document escrow service may retain only a single copy of each escrowed document, maintaining a use count for each retained copy.

See also section 8.3.

Retrospective Action

As discussed above, in various embodiments, the system provides a wide variety of facilities to users of a system that captures text from rendered documents and associates it with an electronic counterpart. These facilities include the ability to initiate commercial transactions by capturing text, to find further related or reference material, to invoke translation and other services and to participate in online communities, to name but a few.

In some embodiments, these facilities are just as available to those using the Life Library and dealing with past captures as they are to those making captures in the immediate present. In addition, as mentioned earlier, an advantage of capturing the user's activities for later reference is that facilities that only become available at a later date may be brought to bear on the Life Library archive material, either automatically or at the user's request. Some examples are discussed below.

New & Improved Recognition or Search Services

As technologies improve, computing power and storage increases, and new algorithms are developed, the tools that will be available in the future for the analysis and maintenance of a Life Library may be superior to those available today. As an example, optical captures or audio data that today's OCR and speech recognition engines find challenging may be more accurately interpreted in future. Similarly, the field of Information Retrieval is one of continual development, with new data gathering, document analysis, search and retrieval techniques becoming available all the time. By capturing each stage of the process in the Life Library archive, the system or the user can return later and apply new technologies to these early stages to improve the quality of the Life Library archive and experience, for example to recognize previously unrecognized captures, or to locate previously unfound documents.

Documents Newly-Available to the System

In some situations the user will capture data from a document only to discover that the document is not available in electronic form. As more documents become available online, however, documents not available at the time of capture may well become so at a later date. In some embodiments, the system informs the user of new materials which have become available and which are relevant to past capture activity.

Subscriptions to New Markup Services

Much of the functionality of the later stages of the system and many aspects of the presentation of the Life Library to the user are implemented in connection with the 'markup' services described in section 5. Such markup may be implemented by the Life Library and associated systems or may be sourced from elsewhere. Often, the user will subscribe to markup services that perform particular functions. Using the Life Library, a user may apply these services to previous captures. As an example, a user who often captures text from Shakespeare may discover a useful source of literary markup providing commentary on the text. By subscribing to this markup source, all of his past captures from Shakespeare can be augmented with notes from the commentary.

New Information from Document's Original Publisher

The publisher may make new information available after the time of capture. This may be, for example, simple metadata describing the document, or it may be markup that adds extra functionality or content, or it may be a link to an online presence associated with the document (see section 7.1). For example, after imaging article was published, the publisher discovered that an author's name was omitted. In response, they add author's name to metadata.

The system can find this updated information and incorporate it into the Life Library automatically, or at the prompting of the user.

New Deductions Based on the User's Archive

As the Life Library grows, it forms an ever more useful picture of the user's interests and reading habits. In some embodiments, the system uses the data in the Life Library to improve the operation of other parts of the system. For example, locating documents associated with new or old captures may be simplified by examining the sources of existing entries in the Life Library and considering documents from the same or similar sources to be more likely candidates in the case of any ambiguity.

In some embodiments, the system uses the data in the Life Library to improve the presentation of the Life Library to the user. For example, the system may inform a user examining one entry of other relevant entries on similar topics or from a similar source. The system may categorize documents in the Life Library automatically using standard clustering techniques and presented to the user in a manner based on this classification.

Beneficial Auxiliary Features

The Portable, Sharable Library

As the data storage capacity of portable devices such as phones, PDAs and media players increases, users can have an increasing amount of data in portable form. In some embodiments, as has been mentioned, the entire Life Library system may be implemented on a portable device such as a mobile phone. In other embodiments, the Life Library may be implemented on a capture device, such as a dedicated capture device or a multipurpose device, such as a mobile phone, PDA, and the like) but even where that is not the case, the data or some subset of the data may be made available to the user in some readily transportable form. A user may then carry in his pocket information corresponding to everything he has read in his life that was of interest to him.

In some embodiments, the user carries a USB flash drive or similar storage device that may be plugged into an electronic book reader device, so allowing him to refer to the contents of his library.

In some embodiments, the user carries on his PDA, mobile phone, or other mobile device an application that gives a compact view of the most recent state of his main web-based Life Library. If he meets an acquaintance who may be interested in something the user has recently read, the user can transfer to the acquaintance a reference to the Life Library item, for example by 'beaming' it to the acquaintance's portable device using an infrared or radio transmission.

In some embodiments, the user carries a device capable of creating a rendered form of a reference to the Life Library item and the acquaintance carries a device able to capture that reference from the rendered form. For example, the user's device may have a screen on which the reference is displayed, and the acquaintance can scan the reference from the screen using the same device he might use to capture a new item of his own. Similarly, if the acquaintance typically captures from documents using speech recorded as audio, the user's device may be able to emit audio that can be captured and decoded by the acquaintance's device. In this manner, the transfer of a capture from one use to another can be accomplished using the same mechanisms as are used to capture from a rendered document in the first place.

Statistical Analysis of the Life Library Data

As mentioned in section 14, the data resulting from the system can form a valuable input both to the system itself and to other analyses. A convenient way to gather this data is through the Life Library system, both by examining the archives of individuals and by aggregating the information contained in many Life Libraries. One important application of this analysis is to determine the popularity of particular rendered documents and of sections of rendered documents. This can, for example, be used to influence the results of conventional Web-based search engines.

Marketing to People and Groups of People Based on Life Library

The data stored in a user's Life Library can also be exceedingly valuable for those wishing to market products or services to targeted potential customers. Subject to the appropriate permissions and privacy considerations, in some embodiments, the system uses the data in this way, in some cases in anonymous or aggregated form. For example, the system may analyze a collection of Life Library data to determine specific users or groups of users who have indicated, directly or indirectly, an interest or potential interest in a product or service, and those identified users can be contacted with product information, purchase opportunities, etc. (See section 10.6.)

Social Networking

In some embodiments, the system uses the information captured in a user's Life Library to determine some characteristics of the user and their interests, and correlate this with the same analysis of other users. One example of such a process is the automatic creation of social groups as described in section 14.3.1. In some embodiments, the system offers a user the chance to make contact with other users with similar interests.

The Life Saver

An enhancement of the Life Library concept is the 'Life Saver', where the system uses the data captured by a user to deduce more about their other activities. (See section 16.2.) The scanning of a menu from a particular restaurant, a program from a particular theater performance, a timetable at a particular railway station, or an article from a local newspaper allows the system to make deductions about the user's location and social activities, and could construct an automatic diary for them, for example as a website. The system enables the user to edit and modify the diary, add additional materials such as photographs and, of course, look again at the items scanned. The system can create the Life Saver alongside, and based upon, an existing Life Library.

Example Implementation

In this section, an example implementation of a simple Life Library system is presented. It will be understood from the earlier sections of this document that a wide variety of possible implementations of every stage of the process are possible and that the following description is illustrative of just one combination of these.

In the example implementation, the user carries a small pen-shaped scanning device that is capable of scanning a line of text from a document, capturing the image of the scan and performing some basic OCR to convert it to text. Such devices are readily available. He uses this scanner to capture fragments of text that he wishes to add to his Life Library.

When the user is next at his PC, he plugs the scanner into a USB port on the computer. The PC recognizes the device and starts the local Life Library software application. This reads the scanned images, associated timestamps, the OCR-ed text and any other information associated with each capture from the scanner device and stores them on the PC's hard disk. The PC may have more sophisticated image analysis and OCR facilities than the scanner, and may use these to create a more reliable transcription of the captured text.

The PC constructs a search query based on the captured text and submits it to a local search engine that maintains an index of the documents on the user's PC. In this manner the system can determine whether the capture comes from a document for which the user already has the electronic copy, for example because it was a printout of one of his word-processor documents.

This example implementation is a substantially network-based one, and most of the remaining stages are carried out by network-based services. The PC software therefore connects to a Life Library Service using the internet, the telephone network, or some similar public or private network. It transmits the data it has gathered so far to the Life Library service. This may be as simple as a scanned image and a timestamp, or it may consist of several images, timestamps, associated OCR output, and information about any matches found on the local hard disk.

The Life Library Service (LLS) receives this data and stores it in the archive associated with the user. It then constructs search queries of its own appropriate to the various search engines and data sources with which it is able to communicate. Some of these may be selected according to the user concerned, for example because the user is known to be a subscriber to a particular organization's paper publications. The queries may incorporate other information (see section 3) such as contextual information, which may help identify the source document. It then submits these queries to the various search engines and data sources, and gathers the results. It processes the results to remove duplicates, filters them using contextual information and other knowledge about the activities and habits of the user, and so produces a list of possible candidate source documents for the capture. In some cases, this candidate list will consist of a single item; in others, there will be ambiguity and multiple documents will be in the list. In other cases, no documents will have been found.

Interactions with the user described henceforth may be through the medium of the software on the PC, which is either maintaining a connection to the LLS or will re-establish one in the future, or through some other medium, most typically a web interface provided by the LLS which may be accessed immediately by the user or at a later date. For the purposes of illustration, this description will concentrate on the web interface, but it should be remembered that multiple different interfaces are possible to the same Life Library.

If there are multiple candidate documents, the system in some embodiments prompts the user to identify the source. Often, further information, which will help to disambiguate the documents, will be available later, for example in the form of further scans by the user from the same document. At any time, if the user observes that the system has incorrectly identified a source document, he may ask for the search to be repeated or may correct the analysis by hand.

If there are no candidate documents, the system stores such information as it has about the capture in its archive. This situation may also arise simply because the OCR process was not completely successful. In this case, the system may, for example, store the raw image data and present it to the user to be transcribed by hand, or it may store the OCR text output and offer the user the chance to make any corrections. When the system has reasonable text transcriptions from the capture, it may periodically repeat the query process, in case the document becomes available in digital form at a later date.

Through these and other processes, the system builds up in the Life Library an archive of the user's capture activity and locates the electronic counterparts to the documents from which the capture occurred. Depending on the user's credentials, preferences and the accessibility of the documents, the system may also download them and store them in the Life Library archive. If multiple users of the system reference the same document, the LLS may only need to download and store a single copy.

The user gains access to their Life Library by connecting to the service using a web browser. He may be prompted to log in, after which the system displays the archive. The system displays the contents of the archive in any of the ways described earlier, and can supplement it with a variety of other information, including reminders for activities that need to be completed such as disambiguation of candidate documents for past captures, or authorization of payments for the retrieval of documents.

In addition, the interface provides a way for the user to subscribe to particular markup services, and to examine any extra information or invoke any functionality resulting from the markup processes.

One example implementation of subscription to a simple remote markup process is as follows:

The markup service is associated with a URL

The user wishes to make use of the markup service, and copies the URL into an appropriate form on the Life Library web page.

The LLS contacts the URL and receives an XML description of the information that the markup service would need about any given capture in order to complete its operation, which may be as little as the captured image or text and may be as much as the complete text of the electronic document and a history of all the user's interactions with it. More typically, the service might require the captured text, the URL of the electronic counterpart, information about where in the electronic counterpart the capture was found and some identity information about the user.

The LLS presents the user with information about the requirements of the service, any associated charges, any license agreements. It prompts the user to confirm acceptance of these and gives the option to choose when any captures should be fed to the service—at the time of the capture, at the time of viewing, or only on the user's request.

When the time comes to make use of the markup service, the LLS packages up the information required from a particular capture or captures and sends it to the service. The response from the markup service is then used to modify the presentation of the data to the user and the options available to him in association with the captures.

Data representing recent additions to the Life Library is also made available in the form of an RSS-style or email feed so that the user (and anyone else allowed to access the information) can easily be kept up to date with the new material added to the archive and any new developments associated with old material. Similarly, recent additions to the Life Library could be published as posts to a blog or micro-blog, status updates, and the like (see FIG. 12 and section 16.2).

CONCLUSION

It will be appreciated by those skilled in the art that the above-described system may be straightforwardly adapted or extended in various ways. While the foregoing description makes reference to particular embodiments, the scope of the invention is defined solely by the claims that following and the elements recited therein.

We claim:

1. A computer-implemented method, comprising:
receiving text capture indications corresponding to text capture operations from a rendered document, each operation capturing less than a whole page of text;
selecting a text capture indication from among the received text capture indications;
providing a capture of text from the rendered document for the selected text capture indication;
identifying, via one of said text capture indications, an electronic document related to the text capture operation corresponding to the selected text capture indication;
determining whether access to said electronic document is authorized;
in response to determining that access to the electronic document is not authorized, facilitating a transaction to authorize access to said electronic document; and
providing access to said electronic document.

2. The method of claim 1, wherein determining whether access to the electronic document is authorized comprises determining whether access to said electronic document is authorized based on access privilege information.

3. The method of claim 2, wherein determining whether access to the electronic document is authorized comprises performing a query, the query comprising the access privilege information.

4. The method of claim 2, further comprising maintaining a user profile including the access privilege information.

5. The method of claim 1, wherein determining whether access to the electronic document is authorized comprises determining whether access to the electronic document is authorized using a scanner containing identification information.

6. The method of claim 5, wherein said scanner comprises a SIM card.

7. The method of claim 1, wherein said rendered document is a paper publication, and wherein said determining whether access to the electronic document is authorized comprises determining ownership of said paper publication.

8. The method of claim 1, wherein said rendered document is a paper publication, and wherein said determining whether access to the electronic document is authorized comprises determining subscription to said paper publication.

9. The method of claim 1, wherein said determining whether access to the electronic document is authorized comprises determining an association with a mobile phone account.

10. The method of claim 9, wherein said transaction is facilitated via said mobile phone account.

11. The method of claim 1, wherein facilitating the transaction to authorize access to said electronic document comprises facilitating a transaction with a publisher of said electronic document.

12. The method of claim 1, wherein facilitating the transaction to authorize access to said electronic document comprises facilitating a transaction with a copyright holder of said electronic document.

13. The method of claim 1, further comprising receiving an electronic payment for facilitating said transaction.

14. The method of claim 13, wherein said electronic payment is received from a third-party.

15. The method of claim 13, wherein said electronic payment is received from a user.

16. The method of claim 1, wherein at least one of said text capture operations comprises capturing an audio clip related to said less than a whole page of text.

17. The method of claim 1, wherein said rendered document comprises an e-book.

18. A non-transitory computer-readable medium having stored thereon instructions that, when executed, implement the method of claim 1.

19. A computer apparatus having a processor and a memory containing computer executable instructions that, when executed by the processor, perform the method of claim 1.

20. A computer-implemented method, comprising:
receiving, at a capture device, text capture indications corresponding to text capture operations from a rendered document, each text capture operation capturing less than a whole page of text;

the capture device identifying at least one of goods and services using text from at least one of the text capture operations; and the capture device facilitating a transaction related to said at least one of goods and services.

21. The method of claim 20, further comprising the capture device making an electronic payment.

22. The method of claim 21, further comprising the capture device making the electronic payment on behalf of a user.

23. The method of claim 20, wherein said at least one of goods and services comprises a publication.

24. The method of claim 23, wherein said publication was published after said text capture operation.

25. The method of claim 20, wherein said transaction comprises purchasing said at least one of goods and services.

26. The method of claim 20, wherein said at least one of goods and services comprise an advertised product.

27. The method of claim 20, wherein at least one of said text capture operations comprises capturing an audio clip related to said less than a whole page of text.

28. The method of claim 20, wherein said rendered document comprises an e-book.

29. A non-transitory computer-readable medium having stored thereon instructions that, when executed, implement the method of claim 20.

30. A computer apparatus having a processor and a memory containing computer executable instructions that, when executed by the processor, perform the method of claim 20.

31. A computer-implemented method, comprising:
receiving, at an information-capturing system, a text capture indication corresponding to a text capture operation performed on a rendered document that captured less than a whole page of text;
the information-capturing system generating a text entry based upon said text capture indication, wherein the text entry specifies a number of documents matching text of the text capture operation; and
the information-capturing system publishing the text entry.

32. The method of claim 31, further comprising storing said text capture indication.

33. The method of claim 31, further comprising:
the information-capturing system, enabling interaction with the text entry; and
in response to the interaction, the information-capturing system providing a menu of actions for the text entry.

34. The method of claim 31, wherein publishing the text entry comprises posting at least part of the text entry to at least one of a weblog, wiki, micro-blog, news feed, photo-stream, and a website.

35. The method of claim 34, further comprising enabling selective access to said published text entry.

36. The method of claim 34, further comprising enabling public access to said published text entry.

37. The method of claim 31, wherein said publishing the text entry comprises generating a bibliographic entry.

38. The method of claim 37, further comprising formatting said bibliographic entry according to a citation style.

39. The method of claim 31, further comprising identifying a capture context for said text capture indication, and wherein the text entry includes at least a portion of said capture context.

40. The method of claim 39, wherein said capture context comprises text proximate to the text capture operation in said rendered document.

41. The method of claim 31, further comprising identifying a source document corresponding to said rendered document, and wherein the text entry includes a citation to said source document.

42. The method of claim 31, wherein the text capture operation comprises capturing an audio clip related to said less than a whole page of text.

43. The method of claim 31, wherein said rendered document comprises an e-book.

44. A non-transitory computer-readable medium having stored thereon instructions that, when executed, implement the method of claim 31.

45. A computer apparatus having a processor and a memory containing computer executable instructions that, when executed by the processor, perform the method of claim 31.

46. A computer-implemented method, comprising:
for each individual entity of a plurality of entities, receiving, at an information-capturing system, a plurality of text capture operations from rendered documents, each indicated text capture operation designating less than a whole page of text as captured;
for each individual entity of the plurality of entities, the information-capturing system analyzing the plurality of text capture operations received from the individual entity to determine a likely interest of the individual entity;
the information-capturing system identifying a plurality of entities determined to have the likely interest; and
the information-capturing system presenting to a first entity of the identified plurality of entities an indication that another entity of the identified plurality of entities shares the likely interest.

47. A computer-implemented method, comprising:
displaying an indication of each of at least some of a plurality of text capture operations from one or more rendered documents using an information-capturing system, each indicated text capture operation designating less than a whole page of text as captured;
the information-capturing system receiving input with respect to a distinguished one of the displayed indications; the information-capturing system displaying a menu of actions relating to the distinguished indication;
the information-capturing system receiving a selection from the menu of actions; and
the information-capturing system performing an action based on the captured text indicated by the distinguished indication and the selection from the menu of actions.

48. The method of claim 47, wherein displaying the indication of each of the at least some of the plurality of text capture operations comprises displaying the indication of each of the at least some of the plurality of text capture operations using a mobile phone.

49. The method of claim 47, wherein performing the action relative to the text capture operation comprises performing the action relative to the text capture operation using a mobile phone.

50. The method of claim 47, wherein displaying the indication of each of the at least some of the plurality of text capture operations comprises displaying the indication of each of the at least some of the plurality of text capture operations using a selected one of an RSS client application and a micro-blog client application.

51. The method of claim 47, wherein performing said action comprises filling out a form in accordance with said received input.

52. The method of claim 51, further comprising electronically submitting said form.

53. The method of claim 47, wherein performing said action comprises generating a notification of a change in a status of a document related to at least one of said text capture operations.

54. The method of claim 47, wherein performing said action comprises associating materials with the text capture operation.

55. A computer-implemented method, comprising:
- receiving indications at an information-capturing system, each indication indicating a text capture operation performed from a rendered document designating less than a whole page of text as captured;
- the information-capturing system storing the received indications;
- the information-capturing system generating a display based upon the stored indications; and
- the information-capturing system sending electronic payment authorizing access to an electronic document comprising text captured by at least one of the performed text capture operations.

56. A computer-implemented method, comprising:
- receiving, at an information-capturing system, text capture indications corresponding to text capture operations from one or more rendered documents, each text capture operation capturing less than a whole page of text;
- the information-capturing system storing the received text capture indications;
- the information-capturing system identifying at least one source document corresponding to at least one of said rendered documents; and
- the information-capturing system displaying a list of text capture entries based upon the stored indications, at least one entry including an indication of said at least one source document for text of a text capture operation and a number of documents matching the text.

57. A computer-implemented method, comprising:
- receiving, at an information-capturing system, a plurality of text capture operations from one or more rendered documents, each indicated text capture operation designating less than a whole page of text as captured;
- the information-capturing system analyzing the plurality of text capture operations to identify a product or service of likely interest; and
- the information-capturing system presenting information related to said identified product or service.

58. The method of claim 57, further comprising facilitating a transaction for purchase of said product or service.

* * * * *